(12) United States Patent
Ohwada et al.

(10) Patent No.: US 7,635,944 B2
(45) Date of Patent: Dec. 22, 2009

(54) ELECTRON-EMITTING DEVICE AND METHOD FOR MANUFACTURING SAME

(75) Inventors: Iwao Ohwada, Nagoya (JP); Masao Takahashi, Kuwana (JP); Takayoshi Akao, Nagoya (JP); Shuichi Ozawa, Nagoya (JP); Kei Kosaka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 452 days.

(21) Appl. No.: 11/289,012

(22) Filed: Nov. 29, 2005

(65) Prior Publication Data

US 2006/0113608 A1    Jun. 1, 2006

Related U.S. Application Data

(60) Provisional application No. 60/665,557, filed on Mar. 25, 2005, provisional application No. 60/713,993, filed on Sep. 2, 2005.

(30) Foreign Application Priority Data

Nov. 30, 2004    (JP)    ............... 2004-347909

(51) Int. Cl.
  *H01J 1/46*    (2006.01)
(52) U.S. Cl. ...................... 313/293; 313/306
(58) Field of Classification Search ......... 313/495–512, 313/306, 309–311, 346, 351, 355, 293–304, 313/346 R; 315/169.1, 169.3; 428/690–691, 428/917; 438/26–29, 34, 82; 257/40, 72, 257/98–100, 642–643, 759; 427/66, 532–535, 427/539
See application file for complete search history.

(56) References Cited

U.S. PATENT DOCUMENTS 5,874,802 A * 2/1999 Choi et al. .................. 313/495
6,841,794 B2 * 1/2005 Chen et al. .................... 257/10

(Continued)

FOREIGN PATENT DOCUMENTS

EP    1 463 022    9/2004

OTHER PUBLICATIONS

Yasuoka and Ishii, "Pulsed electron sources using a ferroelectric cathode," Oyo Butsuri (Applied Physics), vol. 68, No. 5, pp. 546-550 (1999).

V.F. Puchkarev, G.A. Mesyats "On the mechanism of emission from the ferroelectric ceramic cathode," *J. Appl. Phys.*, vol. 78, No. 9, Nov. 1, 1995, pp. 5633-5637.

(Continued)

*Primary Examiner*—Peter J Macchiarolo
*Assistant Examiner*—Donald L Raleigh
(74) *Attorney, Agent, or Firm*—Burr & Brown

(57) ABSTRACT

An electron-emitting device includes an emitter section composed of a dielectric material, a lower electrode disposed on the lower side of the emitter section, and an upper electrode disposed on the upper side of the emitter section so as to be opposed to the lower electrode with the emitter section therebetween, electrons being emitted from the emitter section through the upper electrode by the application of a drive voltage between the lower electrode and the upper electrode, wherein the upper electrode is provided with a plurality of through-holes which expose the emitter section and which have an average diameter of 10 nm or more and less than 100 nm, and a peripheral portion of each through-hole facing the emitter section is separated at a predetermined distance from the emitter section.

8 Claims, 39 Drawing Sheets

U.S. PATENT DOCUMENTS 6,885,138 B1 * 4/2005 Yoo ..................... 313/346 R
2003/0089900 A1 5/2003 Chen et al.
2005/0073232 A1 * 4/2005 Takeuchi et al. ............ 313/311

OTHER PUBLICATIONS

H. Riege "Electron emission ferroelectrics- a review," *Nucl. Instr. and Mech.*, A340, pp. 80-89, 1994.

\* cited by examiner

MANUFACTURING METHOD EXAMPLE 1
(SINGLE PHASE)

Pt : Ir = 97 : 3
TEMPERATURE RISE RATE: 47°C/min
MAINTAINED AT 700°C FOR 30 MINUTES

COMPARATIVE EXAMPLE

Pt ONLY
TEMPERATURE RISE RATE: 47°C/min
MAINTAINED AT 700°C FOR 30 MINUTES

MANUFACTURING METHOD EXAMPLE 2
(MIXED PHASE)

Pt : Au = 95 : 5
TEMPERATURE RISE RATE: 43°C/min
MAINTAINED AT 650°C FOR 30 MINUTES MANUFACTURING METHOD EXAMPLE 3
(FIRST MANUFACTURING METHOD OF USING
THREE OR MORE METALS)

Pt : Au : Ir = 93 : 4.5 : 2.5
TEMPERATURE RISE RATE: 47°C/min
MAINTAINED AT 700°C FOR 30 MINUTES FIG.26
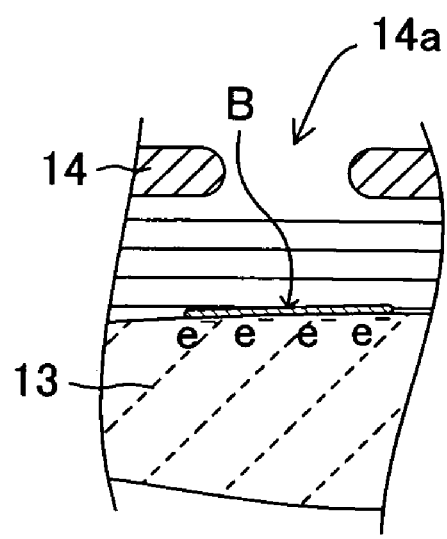
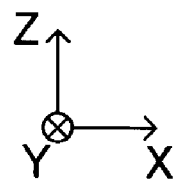

HOLE DIAMETER = 10r

OUTER CIRCUMFERENCE = $10\pi r$

HOLE DIAMETER = r

OUTER CIRCUMFERENCE = $64\pi r$

MANUFACTURING METHOD EXAMPLE 4
(SECOND MANUFACTURING METHOD OF
USING THREE OR MORE METALS)

Pt : Au : Ir = 93 : 4.5 : 2.5
TEMPERATURE RISE RATE: 1,400°C/min
MAINTAINED AT 700°C FOR 30 MINUTES CASE IN WHICH THE TEMPERATURE RISE
RATE OF MANUFACTURING METHOD
EXAMPLE 1 IS INCREASED Pt : Ir = 97 : 3
TEMPERATURE RISE RATE 1,400°C/min
MAINTAINED AT 700°C FOR 30 MINUTES

MANUFACTURING METHOD EXAMPLE 5

Pt ONLY
TEMPERATURE RISE RATE: 1,200°C/min
MAINTAINED AT 600°C FOR 30 MINUTES

□ ··· Pt : Ir = 97 : 3,
  TEMPERATURE RISE RATE: 1,400°C/min (Fig. 33)

▲ ··· Pt : Au : Ir = 93 : 4.5 : 2.5,
  TEMPERATURE RISE RATE: 47°C/min (Fig. 24)

$\bar{d} = d1 > d2$ $\bar{d} = d2 < d1$

ELECTRON-EMITTING DEVICE AND METHOD FOR MANUFACTURING SAME

BACKGROUND OF THE INVENTION

1. Field of the Invention

The present invention relates to an electron-emitting device including an emitter section composed of a dielectric material, a lower electrode disposed on the lower side of the emitter section, and an upper electrode disposed on the upper side of the emitter section so as to be opposed to the lower electrode with the emitter section therebetween.

2. Description of the Related Art

With respect to the emission of electrons from an emitter section composed of a dielectric material, various theories have been presented in the following non-patent documents: Yasuoka and Ishii, "Pulsed electron source using a ferroelectric cathode", Oyo Butsuri (Applied Physics), Vol. 68, No. 5, p. 546-550 (1999) [Non-patent Document 1]; V. F. Puchkarev, G. A. Mesyats, "On the mechanism of emission from the ferroelectric ceramic cathode", J. Appl. Phys., Vol. 78, No. 9, 1 Nov. 1995, p. 5633-5637 [Non-patent Document 2]; and H. Riege, "Electron emission ferroelectrics—a review", Nucl. Instr. and Meth. A340, p. 80-89 (1994) [Non-patent Document 3].

The present applicant has made various proposals on such an electron-emitting device including an emitter section composed of a dielectric material. Namely, an electron-emitting device that has been proposed by the present applicant includes an emitter section composed of a dielectric material, a lower electrode disposed on the lower side of the emitter section, and an upper electrode disposed on the upper side of the emitter section so as to be opposed to the lower electrode with the emitter section sandwiched therebetween. In this electron-emitting device, a drive voltage is applied between the lower electrode and the upper electrode. Thereby, the polarization of the dielectric material is reversed, and electrons are emitted from fine through-holes provided in the upper electrode.

More specifically, as shown in FIGS. 45 to 48, an electron-emitting device 200 includes an upper electrode 204 and a lower electrode 206 respectively disposed on the upper surface and the lower surface of an emitter section 202. Through-holes 204a are provided in the upper electrode 204. The surface of a peripheral portion of each of the through-holes 204a facing the emitter section 202 is separated at a predetermined distance from the emitter section 202.

First, as shown in FIG. 45, the electron-emitting device 200 is in an initial state in which electrons are not accumulated on the upper side (upper surface) of the emitter section 202. Subsequently, as shown in FIG. 46, when a drive voltage is applied such that the potential of the upper electrode 204 is negative with respect to the lower electrode 206, the polarization of the emitter section 202 is reversed. Due to the polarization reversal, electrons are supplied from the upper electrode 204 toward the emitter section 202 beneath the peripheral portion of the through-holes 204a of the upper electrode 204. As a result, electrons are accumulated on the upper side of the emitter section 202 beneath the peripheral portion of the through-holes 204a.

Subsequently, as shown in FIG. 47, when a drive voltage is applied such that the potential of the upper electrode 204 is positive with respect to the lower electrode 206, the polarization of the emitter section 202 is reversed again. If such a state continues, as shown in FIG. 48, the electrons accumulated on the upper side of the emitter section 202 are emitted upward (in the positive Z-axis direction) by Coulomb repulsion through the through-holes 204a.

In the electron-emitting device that has been proposed so far, the diameter of the through-hole 204a is, for example, 100 nm or more because it is generally difficult to form a through-hole 204a that has an extremely fine diameter in the upper electrode 204 and because it has been assumed that if the diameter of the through-hole 204a is extremely fine, the amount of electrons that can be supplied to the upper side of the emitter section 202 from the peripheral portion of the through-holes 204a is decreased, and for other reasons.

In order to increase the amount of electron emission per unit area of the upper surface of the electron-emitting device 200, intense studies have been conducted, for example, the diameter of the through-hole 204a has been changed in a range above 100 nm or the number of through-holes 204a has been increased. However, there has been a limit to the amount of electron emission.

The reason for the fact that the amount of electron emission cannot be increased is assumed that, as understood from equipotential lines shown in FIG. 49, the equipotential lines bulge outward from the through-hole 204a, and thereby electrons are easily supplied from the peripheral portion of the through-hole 204a, but are not easily accumulated in the vicinity of a region beneath the center of the through-hole 204a where the intensity of the electric field is weak.

SUMMARY OF THE INVENTION

It is an object of the present invention to provide an electron-emitting device in which a large amount of electron emission (electrons emitted) is achieved by overcoming the problem described above. In one aspect of the present invention, an electron-emitting device includes an emitter section composed of a dielectric material, a lower electrode disposed on the lower side of the emitter section, and an upper electrode disposed on the upper side of the emitter section so as to be opposed to the lower electrode with the emitter section sandwiched therebetween, electrons being emitted from the emitter section through the upper electrode by the application of a drive voltage between the lower electrode and the upper electrode, wherein the upper electrode is provided with a plurality of through-holes which expose the emitter section and which have an average diameter of 10 nm or more and less than 100 nm, and a peripheral portion of each through-hole facing the emitter section is separated at a predetermined distance from the emitter section.

Here, if the shape of the through-hole is circular, the average diameter of the through-hole is equal to the diameter of the circle. If the shape of the through-hole is not circular, the average diameter of the through-hole is defined as the average of the lengths of a plurality of different line segments passing through the center of the through-hole. The shape of the through-hole is not necessarily circular and may be, for example, triangular, elliptical, oblong, or narrow groove-like (slit-like), etc. When the through-hole has a narrow groove-like shape, the average diameter of the portions that can be considered as the substantially independent through-holes can be treated as the average diameter of the through-holes. When the width of the groove is substantially constant, the average width can be treated as the average diameter of the through-holes.

In the electron-emitting device, as understood from equipotential lines shown in FIG. 26, since the diameter of a through-hole 14a of an upper electrode 14 is less than 100 nm, the electric field for accumulating electrons does not easily bulge out of the through-hole 14a. Consequently, as indicated by symbol B in FIG. 26, since the intensity of the electric field becomes stronger and uniform in a wider range on the upper surface of an emitter section 13 beneath the through-hole 14a, electrons can be accumulated in a wider range on the upper surface of the emitter section 13. As a result, the amount of electrons that can be emitted per unit area from one through-hole 14a can be increased. Furthermore, since the diameter of the through-hole 14a is small, the number of through-holes 14a that can be formed per unit area in the upper surface of the electron-emitting device can be increased. Thus, the amount of electron emission from the entire electron-emitting device can be further increased.

On the other hand, in the electron-emitting device, the diameter of the through-hole of the upper electrode is 10 nm or more. If the diameter of the through-hole is less than 10 nm, there is a possibility that the amount of electrons emitted may be decreased for the assumed reasons described below.

That is, the region for accumulating electrons on the upper surface of the emitter section becomes excessively small, resulting in a decrease in the amount of electrons accumulated. The electrons that collide with the upper electrode increase in the process of electron emission, and the percentage of electrons that are trapped by the upper electrode increases.

Consequently, in the electron-emitting device of the present invention in which through-holes with a diameter of 10 nm or more and less than 100 nm are provided in the upper electrode, electrons can be emitted at high efficiency.

Furthermore, preferably, the average diameter of the through-holes is smaller than the grain size of the dielectric material of the emitter section.

A through-hole beneath which a grain boundary of the emitter section does not lie (refer to a region indicated by broken circle B in FIG. 4) can emit more electrons than a through-hole beneath which a grain boundary of the emitter section lies (refer to a region indicated by broken circle A and a grain boundary 13a1 in FIG. 4). Consequently, if the average diameter of the through-holes is set smaller than the grain size of the dielectric material constituting the emitter section, the number of through-holes beneath which grain boundaries of the emitter section do not lie increases, and thereby more electrons can be emitted. The diameter of the through-hole is preferably one-fifth or less, more preferably one-tenth or less, and still more preferably one-twentieth or less of the grain size of the dielectric material in order to increase the number of through-holes beneath which grain boundaries of the emitter section do not lie.

Furthermore, preferably, the upper electrode contains a metal, and the through-holes are pores formed by crystal grains of the metal (spaces surrounded with metallic crystal grains bonded to each other during the formation of the metallic crystal grains).

The pores (through-holes) formed by the metallic crystal grains are produced, for example, by a process in which an organometallic compound is applied to or allowed to extend on the upper surface of a material for forming the emitter section by a thick-film formation method, such as screen printing, spray coating, or dip coating, and then firing is performed by heating at a predetermined temperature. The surfaces of such through-holes (the surfaces of the crystal grains of the metal) have higher crystallinity of the metal compared with the surfaces of the through-holes formed by post-machining, such as laser machining. Consequently, it is assumed that electron emission easily occurs. Furthermore, the through-holes having the surfaces of crystal grains of the metal can be obtained by sintering the metal. Consequently, the electron-emitting device provided with such through-holes having the surfaces of crystal grains of the metal does not have damage on the surface of the emitter section, which may be caused when the through-holes are formed by machining, such as laser machining. Another advantage is in that, if the upper electrode is provided with pores (through-holes) formed by the metallic crystal grains, swarf and the like are not generated, which may be generated when the through-holes are formed by machining.

In such a case, preferably, the upper electrode contains two or more metals.

More preferably, the upper electrode contains two or more metals selected from the group consisting of silver (Ag), gold (Au), iridium (Ir), rhodium (Rh), ruthenium (Ru), platinum (Pt), palladium (Pd), aluminum (Al), copper (Cu), nickel (Ni), chromium (Cr), molybdenum (Mo), tungsten (W), and titanium (Ti). Particularly preferably, the upper electrode contains platinum as a base material. Here, the base material is a component which has the largest percent by weight among the metals constituting the upper electrode.

Furthermore, the upper electrode of an electron-emitting device of the present invention has a three-dimensional network structure formed by bonding of metallic grains. In other words, one aspect of the upper electrode of the electron-emitting device of the present invention is characterized in that the electrode is a porous body formed by chemical bonding of two or more metallic grains in the thickness direction.

In general, when a gas is present in a space between an upper electrode and an emitter section, the gas is ionized during electron emission operation, and the ionized gas adsorbs on the upper electrode to inhibit the supply of electrons from the upper electrode to the emitter section and/or to inhibit the emission of the electrons supplied to and accumulated in the emitter section through through-holes of the upper electrode.

In contrast, the upper electrode having a three-dimensional network structure or the porous upper electrode described above is provided with many pores that communicate a space between the upper electrode and the emitter section with a space above the upper electrode. Therefore, when a pressure is decreased so that the space above the upper electrode is brought close to a vacuum, gas molecules remaining in the space between the upper electrode and the emitter section are led to the space above the upper electrode through the pores. Thus, it is possible to decrease the number of gas molecules remaining in the space between the upper electrode and the emitter section. As a result, an electron-emitting device is provided in which, even if the electron emission operation is repeated, the amount of electron emission does not easily decrease.

Furthermore, in the electron-emitting device of the present invention, the upper electrode preferably has an average aperture ratio of 5% to 60%, more preferably 10% to 60%, and still more preferably 20% to 60%.

In another aspect of the present invention, a method for manufacturing such an electron-emitting device includes the step of forming the upper electrode by allowing an organometallic compound containing two or more metals to extend on the upper side of a material for forming the emitter section such that the organometallic compound is in the shape of a film, and subsequently raising the temperature to a predetermined temperature at a predetermined temperature rise rate to fire the organometallic compound. In this specification, the term "temperature rise rate" means a "rate of raising the temperature of the material for forming the upper electrode".

Here, the "organometallic compound containing two or more metals" may be any one of a mixture of two or more organometallic compounds, each containing only one metal;

one organometallic compound containing two or more metals; and a mixture of one organometallic compound containing two or more metals and another organometallic compound.

Furthermore, preferably, the organometallic compound containing two or more metals is a mixed organometallic compound obtained by mixing, at a predetermined ratio, an organometallic compound containing a predetermined metal serving as a base material and an organometallic compound containing a metal having a higher melting point than that of the predetermined metal, and the step of forming the upper electrode is a step in which the mixed organometallic compound is fired such that the two or more metals contained in the mixed organometallic compound are present in a single-phase state.

In such a case, compared with the case in which an organometallic compound containing only one predetermined metal is fired, because of the presence of the metal having the higher melting point, grain growth of two or more metals in a single phase does not easily proceed, and therefore, it is possible to easily form the upper electrode having through-holes with a fine diameter of 10 nm or more and less than 100 nm.

Also preferably, the organometallic compound containing two or more metals is a mixed organometallic compound obtained by mixing, at a predetermined ratio, an organometallic compound containing a first metal serving as a base material and an organometallic compound containing a second metal that is different from the first metal, and the step of forming the upper electrode is a step in which the mixed organometallic compound is fired such that the two or more metals contained in the mixed organometallic compound are present in a mixed-phase state.

In such a case, the first metal serving as the base material and the second metal form two or more different phases by heating, and thereby grain growths of the metals constituting the individual phases are suppressed by each other. As a result, it is possible to form the upper electrode having through-holes with a fine diameter of 10 nm or more and less than 100 nm.

In the method in which firing is performed such that two or more metals are present in a mixed-phase state, more preferably, the second metal has a lower melting point than that of the first metal serving as the base material.

In such a case, the temperature for sintering metal powder can be set to be the same as or lower than the temperature for sintering the metal serving as the base material, and thereby the other sections, such as the emitter section, are not thermally damaged, and the upper electrode does not become brittle.

Furthermore, in the temperature raising step of raising the temperature to a predetermined temperature at a predetermined temperature rise rate after an organometallic compound containing two or more metals is allowed to extend on the upper side of a material for forming the emitter section such that the organometallic compound is in the shape of a film, preferably, the predetermined temperature rise rate is set larger than 10° C./min.

As described above, if the diameter of the through-hole of the upper electrode is small properly, it is possible to increase the amount of electrons that can be emitted per unit area from one through-hole, and more through-holes can be formed per unit area on the upper surface of the electron-emitting device. Consequently, the amount of electron emission from the entire electron-emitting device can be further increased.

According to an experiment, it has been found that if the shape of the upper surface of the emitter section (i.e., the surface of the emitter section on which the upper electrode is disposed) is the same, under predetermined drive conditions, as the flatness of the upper electrode improves, the amount of electron emission can be increased. If the flatness of the upper electrode improves, as shown in FIG. 50, an average value d1 increases, the average value d1 being an average of the individual maximum values d, the maximum value d being the maximum distance between the upper surface of the emitter section 202 and the surface of a peripheral portion of each through-hole 204a (edge of the through-hole) facing the emitter section 202. If the flatness of the upper electrode is not satisfactory, as shown in FIG. 51, the average value d2 of the maximum values d decreases (d1>d2). The actual measurements of the amount of electron emission by the experiment have confirmed that the amount of electron emission of the electron-emitting device shown in FIG. 50 is larger than the amount of electron emission of the electron-emitting device shown in FIG. 51.

On the other hand, it has also been confirmed that if the firing temperature of the material constituting the upper electrode 204 is increased, the flatness of the upper electrode 204 is improved. The reason for this is assumed that grain growths of metals caused by the high firing temperature result in shrinkage of the material constituting the upper electrode 204. However, if the firing temperature is high, with grain growths of metals, the size of through-holes increases and the number of through-holes 204a decreases. As a result, while the flatness of the upper electrode 204 improves, the diameter of the through-hole 204a increases and the number (density) of through-holes 204a decreases. Therefore, the amount of electron emission does not increase.

With above, as a result of various experiments conducted by the present inventors, it has been found that during the firing of the upper electrode, if the temperature rise rate is increased, it is possible to improve the flatness of the upper electrode even if grain growths of metals are not accelerated by increasing the firing temperature. At the same time, it is also possible to increase the number of through-holes.

Then, the present inventors have studied the temperature rise rate in a temperature-raising step suitable for firing the organometallic compound containing two or more metals. As a result, it has been found that it is preferable to set the temperature rise rate higher than 10° C./min (refer to FIG. 32). Thus, it has become possible to manufacture an electron-emitting device having a large amount of electron emission.

Such a temperature-raising step can be said that it includes a decomposition process of the organometallic compound. That is, if the temperature-raising step includes a process of thermal decomposition (decomposition process) of the organometallic compound, both the improvement in the flatness of the upper electrode and the increase in the number of through-holes can be achieved.

The case in which the upper electrode of the electron-emitting device is formed using an organometallic compound containing two or more metals has been described above. In contrast, in the case in which the upper electrode is formed using an organometallic compound containing one metal, it is desirable that a method for manufacturing an electron-emitting device include the steps of allowing the organometallic compound to extend on the upper side of a material for forming the emitter section such that the organometallic compound is in the shape of a film, and then forming the upper electrode by firing of the organometallic compound, the step of forming the upper electrode being a step of raising the temperature to a predetermined temperature at a temperature rise rate that is larger than 100° C./min (refer to FIG. 32).

Thereby, it is also possible to manufacture an electron-emitting device having a large amount of electron emission.

In such a case as well, it is preferable that the temperature-raising step include a process of thermal decomposition of the organometallic compound. If the temperature-raising step includes a process of thermal decomposition of the organometallic compound, both the improvement in the flatness of the upper electrode and the increase in the number of through-holes can be achieved. Furthermore, at the same time, the through-holes can be formed with a finer diameter.

Furthermore, the organometallic compound containing one metal is preferably an organometallic compound of platinum.

It is another object of the present invention to provide an electron-emitting device in which a large amount of electron emission is achieved by having an electron emission-enhancing layer on the upper surface of an emitter section.

More specifically, in another aspect of the present invention, an electron-emitting device includes an emitter section composed of a dielectric material, a lower electrode disposed on the lower side of the emitter section, and an upper electrode disposed on the upper side of the emitter section so as to be opposed to the lower electrode with the emitter section sandwiched therebetween, electrons being emitted from the emitter section through the upper electrode by the application of a drive voltage between the lower electrode and the upper electrode, wherein the upper electrode is provided with a plurality of through-holes which expose the emitter section, a peripheral portion of each through-hole facing the emitter section is separated at a predetermined distance from the emitter section, and an electron emission-enhancing layer to increase the amount of electrons emitted is provided on the upper surface of the emitter section in a region separated at the predetermined distance from the upper electrode and/or on the upper surface of the emitter section in a region exposed to outside through the through-hole.

In such a case, preferably, the electron emission-enhancing layer is composed of a compound containing silicon. Furthermore, preferably, the electron emission-enhancing layer is fibrous.

The electron emission-enhancing layer may be any one of an insulator, a semiconductor, and a conductor, and in each case, the amount of electron emission is increased by the function described below.

(Case in which the Electron Emission-enhancing Layer is Composed of an Insulator)

When electrons are emitted due to the polarization reversal in the emitter section, some electrons on the surface of the emitter section move along an upper portion of the emitter section (a portion of the emitter section in which surface resistance exists) and are recaptured (recovered) by the upper electrode at a portion in which the emitter section and the upper electrode are in contact with each other. If the electron emission-enhancing layer is an insulating layer, the resistivity (hereinafter also referred to as the "surface resistivity") increases in a direction along the upper surface in the vicinity of the upper surface of the emitter section, and therefore, the percentage of the electrons recaptured by the upper electrode is decreased. As a result, the amount of electron emission increases.

Furthermore, if the electron emission-enhancing layer is an insulator and is fibrous, the surface area of the upper surface of the emitter section increases. As a result, the amount of electrons that can be accumulated increases and thus the amount of electron emission increases.

(Case in which the Electron Emission-enhancing Layer is Composed of a Semiconductor or a Conductor)

The affinity between the electron emission-enhancing layer composed of a semiconductor or a conductor and the electrons accumulated in the emitter section is smaller than the affinity between the emitter section in the absence of the electron emission-enhancing layer composed of a semiconductor or a conductor and the electrons accumulated in the emitter section. Consequently, when electrons are emitted due to the polarization reversal of the emitter section, the energy given to the electrons increases. As a result, the percentage of electrons that are recaptured by the upper electrode decreases when the electrons pass through the through-holes, and thus the amount of electron emission increases.

Furthermore, if the electron emission-enhancing layer is composed of a semiconductor or a conductor and is fibrous, the electric field is concentrated at the electron emission-enhancing layer (in particular, at the fiber tips). Consequently, among the electrons accumulated on the upper side of the emitter section, the percentage of electrons emitted due to the polarization reversal increases. As a result, the amount of electron emission increases. In such a case, if the electron emission-enhancing layer is composed of a conductor having a low work function or a semiconductor having a low electron affinity, the amount of electron emission can be effectively increased.

BRIEF DESCRIPTION OF THE DRAWINGS

FIG. 26 is a diagram showing a state of an electric field formed during the accumulation of electrons in the electron-emitting device shown in FIG. 1;

DETAILED DESCRIPTION OF THE INVENTION

The embodiments of an electron-emitting device and a manufacturing method thereof according to the present invention will be described with reference to the drawings. The electron-emitting device can be used for various applications, such as electron irradiation devices, light sources, and electronic component manufacturing equipment. In the following description, the device is applied to a display.

(Structure)

Figure 1:
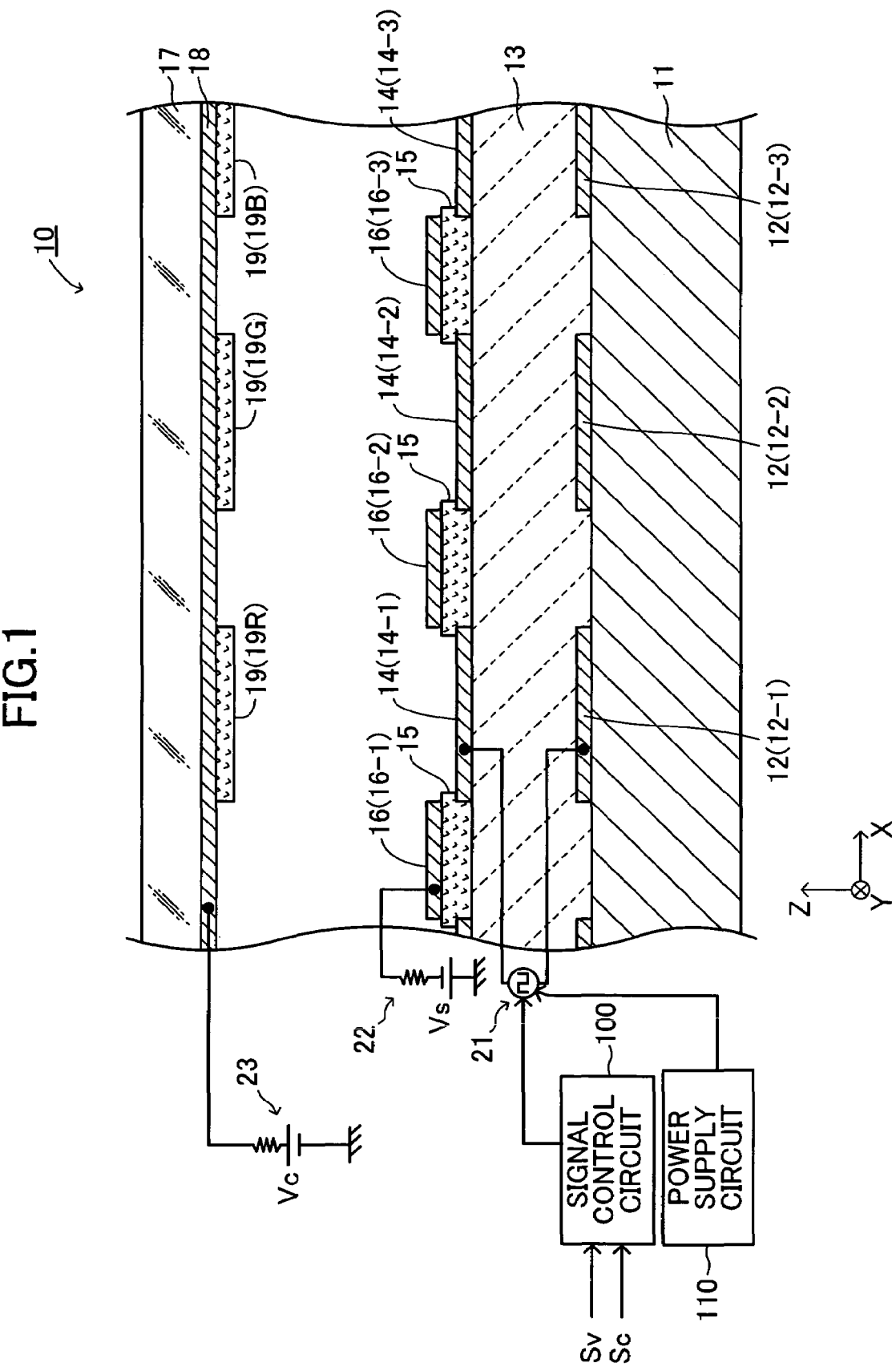
FIG. 1 is a partial cross-sectional view of an electron-emitting device according to an embodiment of the present invention.
Figure 2:
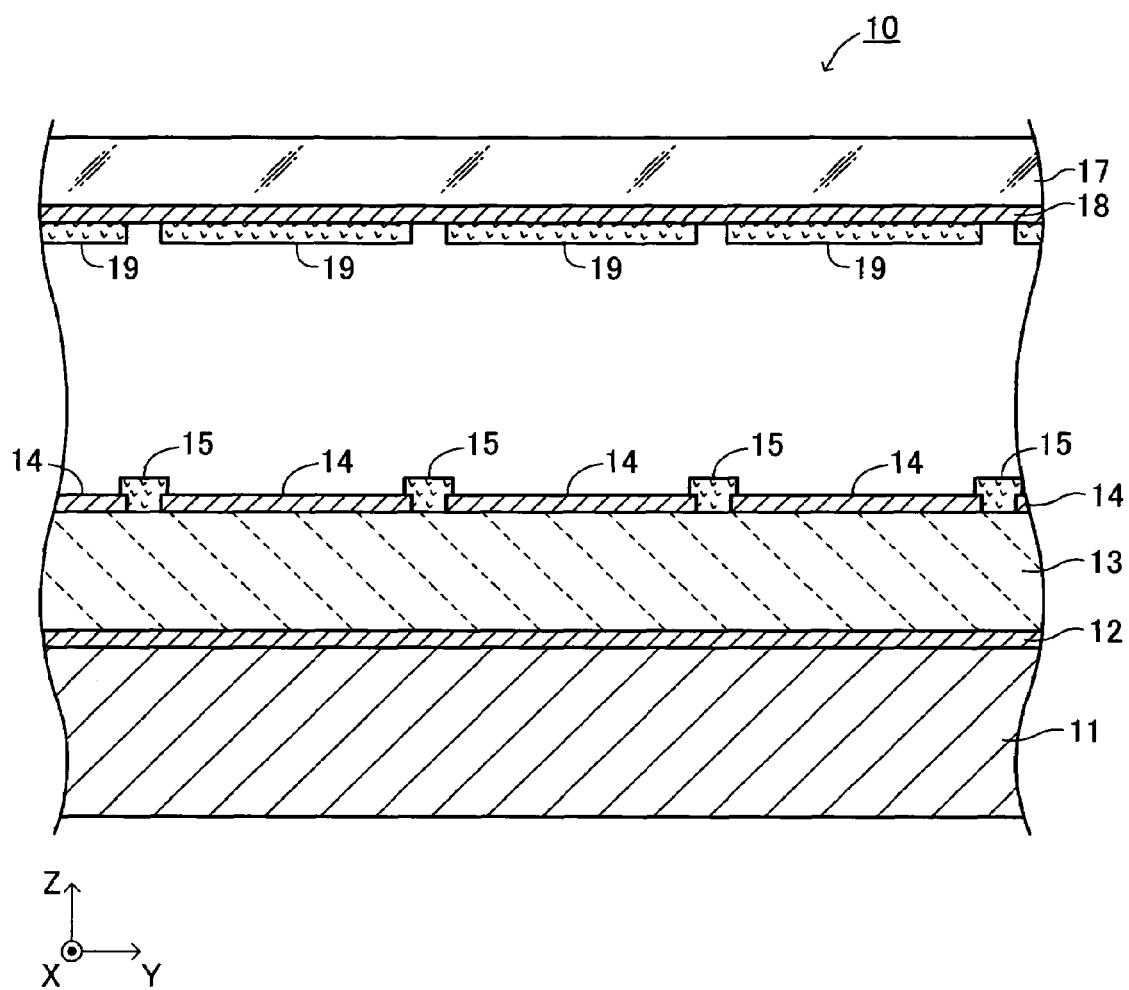
FIG. 2 is a partial cross-sectional view of the electron-emitting device shown in FIG. 1, taken along a plane that is different from that of FIG. 1.
Figure 3:
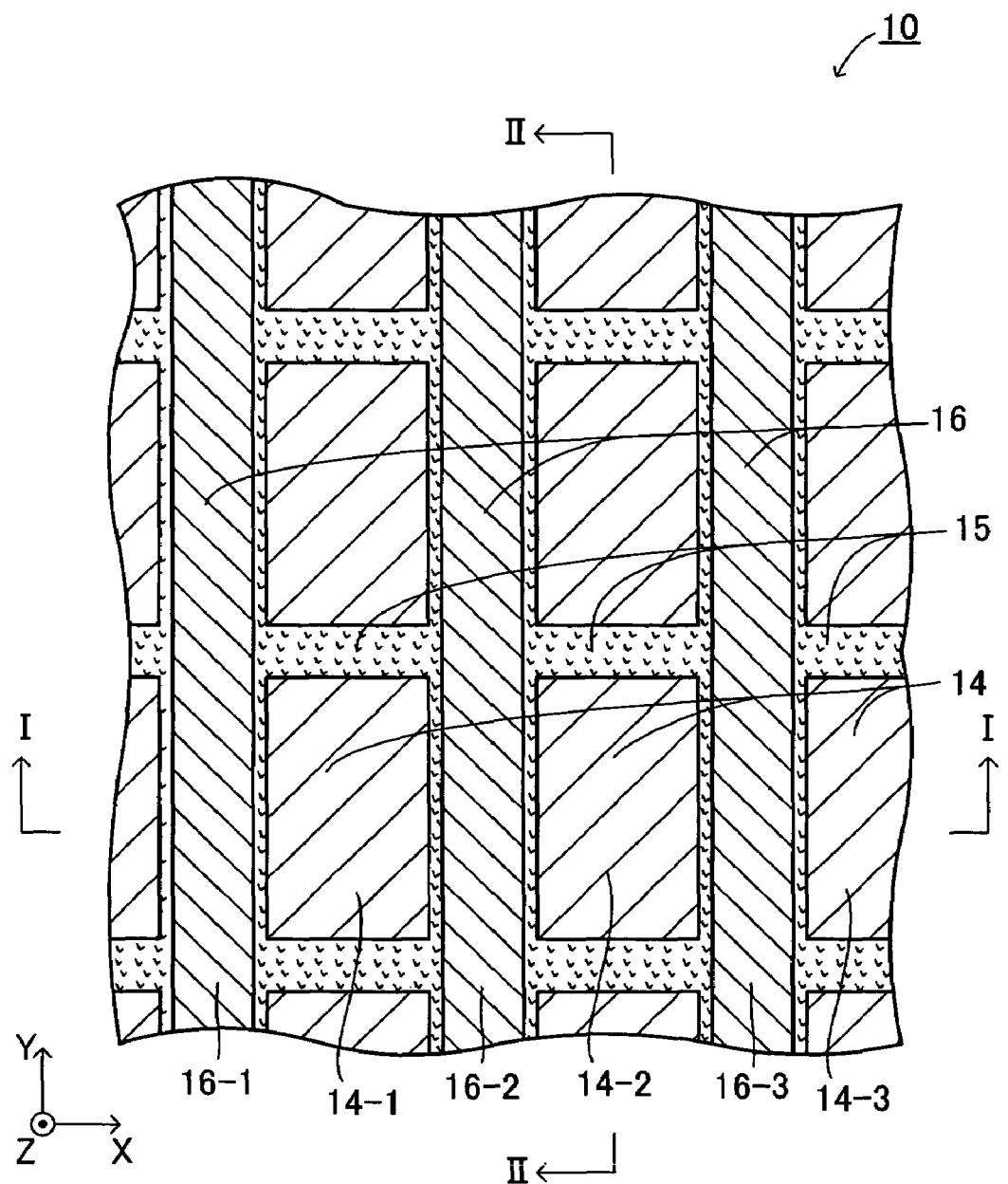
FIG. 3 is a partial plan view of the electron-emitting device shown in FIG. 1.

As shown in FIGS. 1 to 3, an electron-emitting device 10 according to an embodiment of the present invention includes a substrate 11, a plurality of lower electrodes (lower electrode layers) 12, an emitter section 13, a plurality of upper electrodes (upper electrode layers) 14, an insulating layer 15, and a plurality of focusing electrodes (focusing electrode layers) 16. Note that FIG. 1 is a cross-sectional view taken along the line I-I of FIG. 3 which is a partial plan view of the electron-emitting device 10, and FIG. 2 is a cross-sectional view taken along the line II-II of FIG. 3.

The substrate 11 is a plate having an upper surface and a lower surface that are parallel to a plane (X-Y plane) defined by orthogonal X- and Y-axes, the thickness direction of the plate corresponding to the Z-axis direction, the Z-axis being orthogonal to both the X- and Y-axes. The substrate 11 is composed of glass or a ceramic material. Examples of the ceramic material include a material including zirconium oxide as a major component, a material including aluminum oxide as a major component, and a material including, as a major component, a mixture of aluminum oxide and zirconium oxide.

Each of the lower electrodes 12 is composed of an electrically conductive material, which will be described below, and is disposed on the upper surface of the substrate 11 in the form of a layer. In plan view, the shape of each lower electrode 12 is strip-like extending in the Y-axis direction. As shown in FIG. 1, two adjacent lower electrodes 12 are separated with a predetermined distance from each other in the X-axis direction. In FIG. 1, the lower electrodes 12 represented by reference numerals 12-1, 12-2, and 12-3 are respectively referred to as a first lower electrode, a second lower electrode, and a third lower electrode for the sake of convenience.

The emitter section 13 is composed of a dielectric material having a high relative dielectric constant (e.g., a ternary PMN-PT-PZ material including lead magnesium niobate (PMN), lead titanate (PT), and lead zirconate (PZ)), and is disposed on the upper surface of the substrate 11 and the upper surfaces of the lower electrodes 12. The emitter section 13 is a thin plate having an upper surface and a lower surface that are parallel to the X-Y plane, the thickness direction of the thin plate corresponding to the Z-axis direction. Irregularities 13a due to grain boundaries 13a1 of the dielectric material are formed on the upper surface of the emitter section 13.

Each of the upper electrodes 14 is composed of an electrically conductive material, which will be described below, and is disposed on the upper surface of the emitter section 13 in the form of a layer. In plan view, the shape of each upper electrode 14 is rectangular with a short side and a long side extending in the X-axis direction and the Y-axis direction, respectively, as shown in FIG. 3. The plurality of upper electrodes 14 are separated from each other and are arrayed in a matrix.

The upper electrodes 14 are opposed to the respective lower electrodes 12, and in plan view, the upper electrodes 14 are arranged so as to be superposed on the respective lower electrodes 12. In FIGS. 1 and 3, the upper electrodes 14 represented by reference numerals 14-1, 14-2, and 14-3 are respectively referred to as a first upper electrode, a second upper electrode, and a third upper electrode for the sake of convenience. Furthermore, a plurality of upper electrodes 14 arrayed in the X-axis direction are connected by a conductor (not shown) so as to maintain the same electric potential. Additionally, for the purpose of stabilizing the electron emission and protecting the electrodes and the emitter section, a resistor may be disposed adjacent to each upper electrode and the upper electrode may be connected to the conductor through the resistor.

Figure 4:
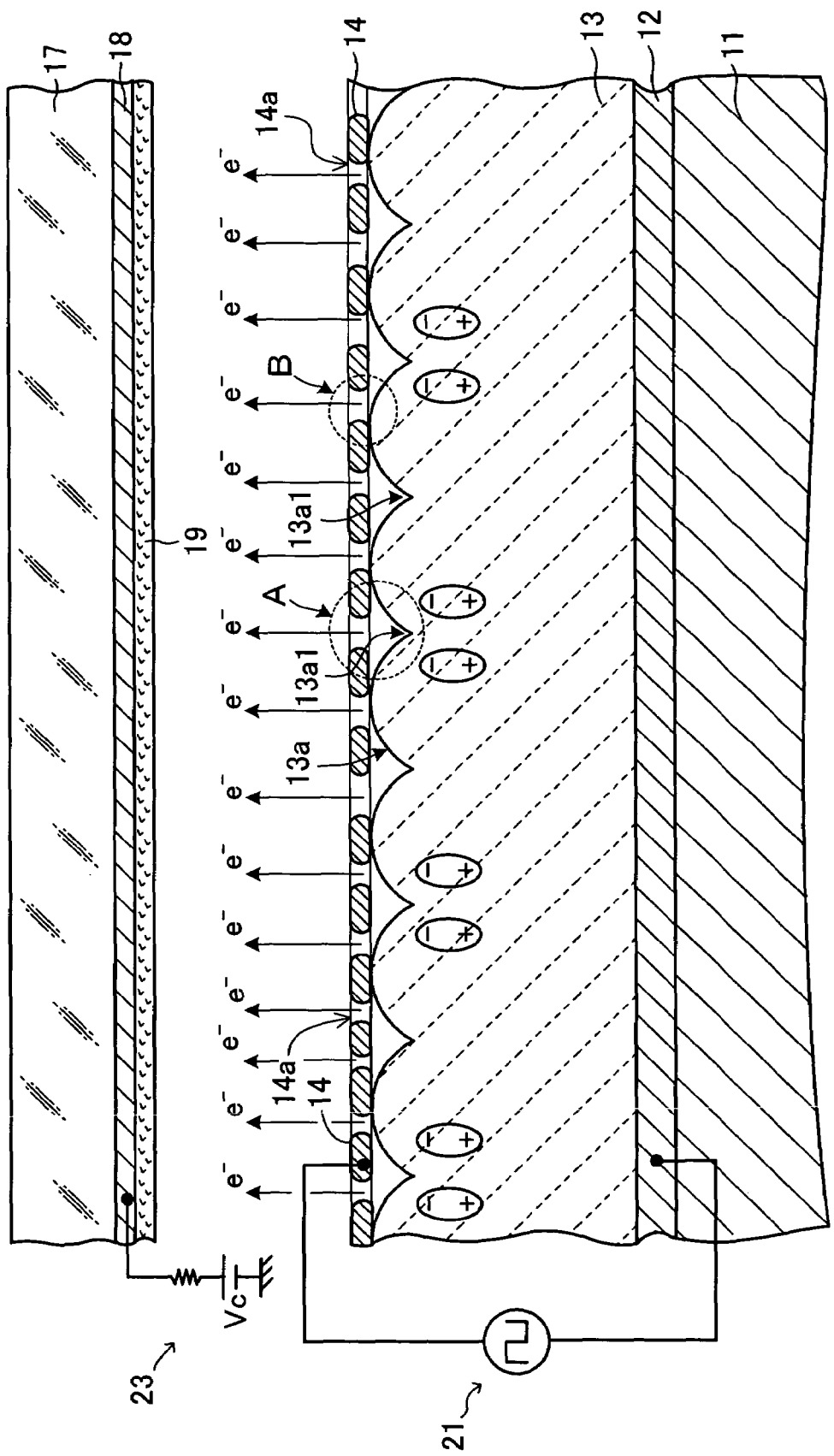
FIG. 4 is an enlarged partial cross-sectional view of the electron-emitting device shown in FIG. 1.
Figure 5:
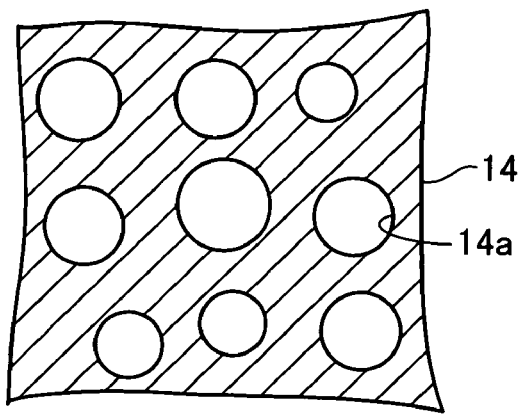
FIG. 5 is an enlarged partial plan view of an upper electrode shown in FIG. 1.
Figure 6:
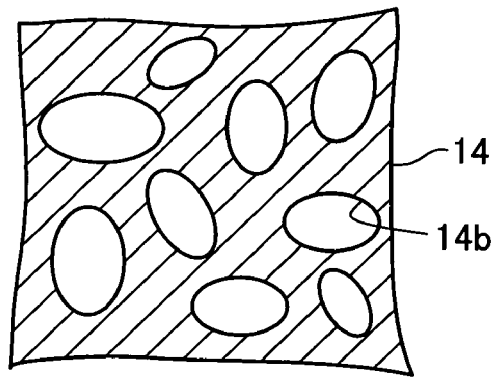
FIG. 6 is a diagram showing another example of through-holes of the upper electrode shown in FIG. 1.
Figure 7:
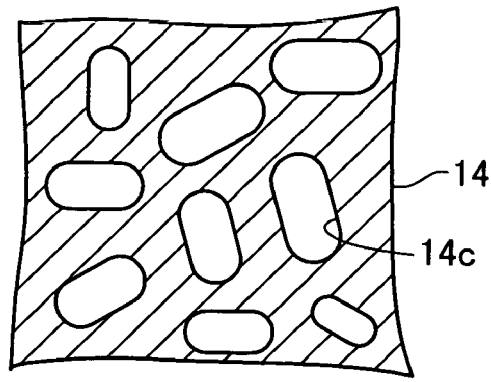
FIG. 7 is a diagram showing another example of through-holes of the upper electrode shown in FIG. 1.
Figure 8:
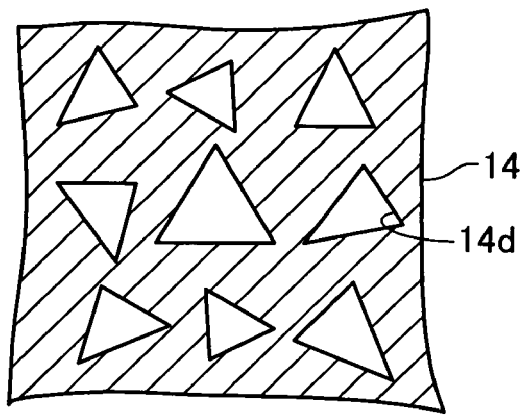
FIG. 8 is a diagram showing another example of through-holes of the upper electrode shown in FIG. 1.
Figure 9:
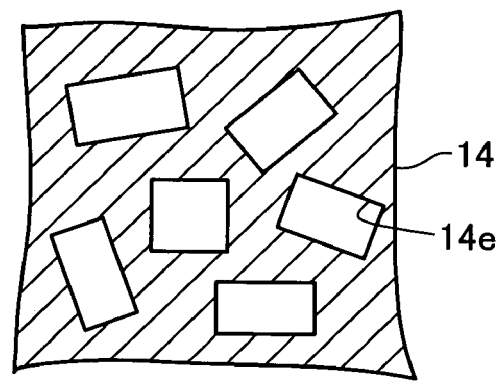
FIG. 9 is a diagram showing another example of through-holes of the upper electrode shown in FIG. 1.

A plurality of fine through-holes 14a are formed in each upper electrode 14 as shown in FIG. 4 and FIG. 5 which is an enlarged partial plan view of the upper electrode 14. In plan view, the shape of the through-holes 14a is substantially circular. The average diameter of the through-holes 14a is 10 nm or more and less than 100 nm.

Here, if the shape of the through-hole is circular, the average diameter of the through-hole is equal to the diameter of the circle. If the shape of the through-hole is not circular, the average diameter of the through-hole is defined as the average of the lengths of a plurality of different line segments passing through the center of the through-hole. The shape of the through-hole is not necessarily circular and may be, for example, triangular, elliptical, oblong, or narrow groove-like (slit-like), etc. When the through-hole has a narrow groove-like shape, the average diameter of the portions that can be considered as the substantially independent through-holes can be treated as the average diameter of the through-holes. When the width of the groove is substantially constant, the average width can be treated as the average diameter of the through-holes. Note that, for example, when the center of gravity of a through-hole in plan view lies inside the through-hole, the center of the though-hole is defined as the center of gravity of the through-hole.

The shape of each through-hole formed in the upper electrode 14 is not limited to the substantially circular shape such as that of the through-hole 14a. As shown in FIGS. 6 to 10, the shape of each through-hole may be a shape mainly composed of curved lines, such as a substantially elliptical shape 14b or a substantially oblong (track-shaped) shape 14c; a shape mainly composed of straight lines, such as a substantially triangular shape 14d or a substantially rectangular shape 14e; or a narrow groove-like (slit-like) shape 14f. A crescent shape, a boomerang shape, or the like is also acceptable.

Figure 10:
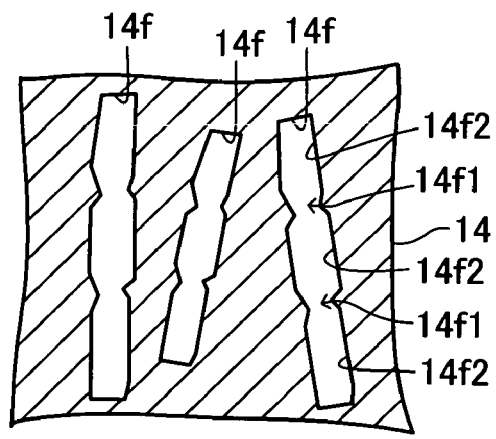
FIG. 10 is a diagram showing another example of through-holes of the upper electrode shown in FIG. 1.

In the case of the narrow groove-like through-hole 14f shown in FIG. 10, constricted parts 14f1 are present. Consequently, the through-hole 14f can be considered as a continuum composed of a plurality of substantially rectangular through-holes 14f2. Therefore, the average diameter of the through-holes 14f is defined to be equal to the average diameter of the rectangular through-holes 14f2. When a narrow groove-like through-hole does not have such constricted parts, the width of the through-hole (slit width) is considered as the average diameter. The particulars applied to the groove-like through-holes are also applied to the case in which the through-holes are curved groove-shaped, such as crescent-shaped or boomerang-shaped.

Preferably, the average diameter of these through-holes (e.g., through-holes 14a) is smaller than the grain size of the dielectric material of the emitter section 13. A through-hole beneath which a grain boundary 13a1 of the emitter section does not lie (refer to a region indicated by broken circle B in FIG. 4) can emit more electrons than a through-hole beneath which a grain boundary 13a1 of the emitter section lies (refer to a region indicated by broken circle A). Consequently, if the average diameter of the through-holes 14a of the upper electrode 14 is set smaller than the grain size of the dielectric material constituting the emitter section 13, the number of through-holes 14a beneath which grain boundaries of the emitter section 13 do not lie increases, and thereby more electrons can be emitted. The diameter of the through-hole 14a is preferably one-fifth or less, more preferably one-tenth or less, and still more preferably one-twentieth or less of the grain size of the dielectric material in order to increase the number of through-holes beneath which grain boundaries of the emitter section 13 do not lie.

Furthermore, preferably, the through-holes 14a are pores formed by crystal grains of a metal (spaces surrounded with metallic crystal grains bonded to each other during the formation of the metallic crystal grains).

The pores (through-holes 14a) formed by the metallic crystal grains are formed, for example, as will be described below, by a process in which an organometallic compound is applied to or allowed to extend on the upper surface of a material for forming the emitter section by a thick-film formation method, such as screen printing, spray coating, or dip coating, and then firing is performed by heating at a predetermined temperature. The surfaces of such through-holes (the surfaces of the crystal grains of the metal) have higher crystallinity compared with the surfaces of the through-holes formed by post-machining, such as laser machining. Consequently, it is assumed that electron emission easily occurs. Furthermore, the through-holes having the surfaces of crystal grains of the metal can be obtained by sintering the metal. Consequently, the electron-emitting device provided with such through-holes having the surfaces of crystal grains of the metal does not have damage on the surface of the emitter section, which may be caused when the through-holes are formed by machining, such as laser machining. Another advantage is in that, if the upper electrode is provided with pores (through-holes) formed by the metallic crystal grains, swarf and the like are not generated, which may be generated when the through-holes are formed by machining.

Figure 11:
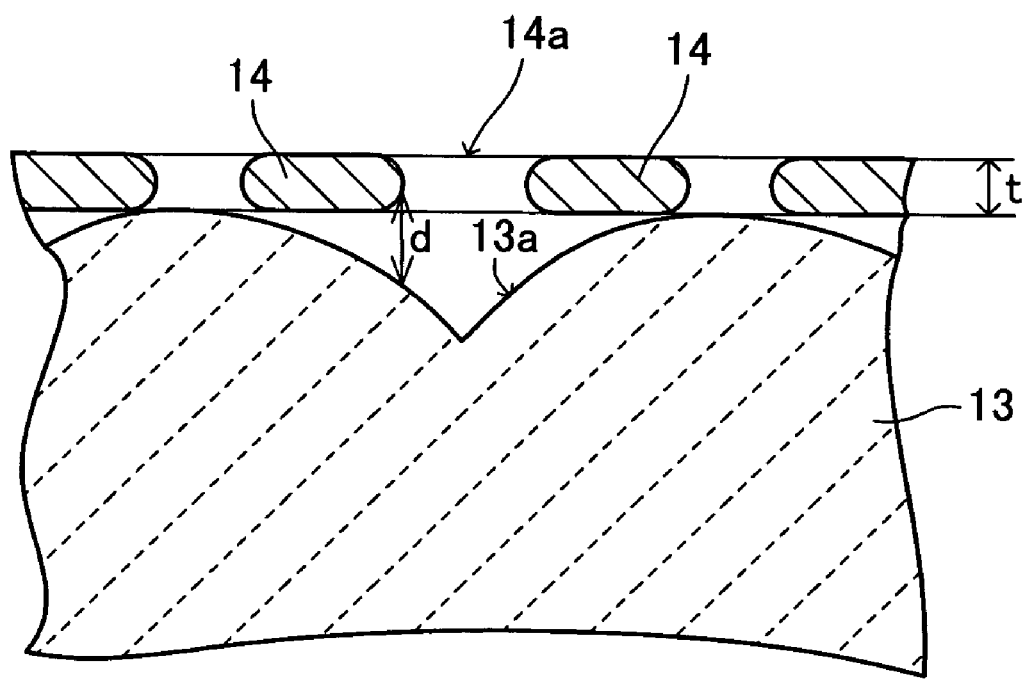
FIG. 11 is an enlarged cross-sectional view of an upper electrode and an emitter section shown in FIG. 1.

As shown in FIG. 11, the thickness t of the upper electrode 14 is 0.01 μm to 10 μm, and preferably 0.05 μm to 1 μm. Furthermore, the maximum distance d between the emitter section 13 (the upper surface of the emitter section 13) and the surface of a peripheral portion of the through-hole 14a (or any one of 14b to 14f) facing the emitter section 13 is more than 0 μm and 10 μm or less, and preferably 0.01 μm to 1 μm.

In plan view, each portion in which the upper electrode 14 and the lower electrode 12 are superposed on each other constitutes an element. For example, in the device shown in FIG. 1, a portion of the emitter section 13 sandwiched between the first lower electrode 12-1 and the first upper electrode 14-1 constitutes a first element. A portion of the emitter section sandwiched between the second lower electrode 12-2 and the second upper electrode 14-2 constitutes a second element. Furthermore, a portion of the emitter section 13 sandwiched between the third lower electrode 12-3 and the third upper electrode 14-3 constitutes a third element. In such a manner, the electron-emitting device 10 is provided with a plurality of independent electron-emitting elements. In other words, the electron-emitting device may be considered as an electron-emitting element.

Referring back to FIGS. 1 to 3, the insulating layer 15 is disposed on the upper surface of the emitter section 13 so as to fill the spaces between the plurality of upper electrodes 14. The thickness (length in the Z-axis direction) of the insulating layer 15 is larger than the thickness (length in the Z-axis direction) of the upper electrode 14. As shown in FIGS. 1 and 2, the ends in the X-axis and Y-axis directions of each insulating layer 15 is disposed on both ends in the X-axis direction and both ends in the Y-axis direction of the upper electrodes 14.

The focusing electrodes 16 are composed of an electrically conductive material (silver, in this embodiment) and are disposed on the insulating layer 15 in the shape of layers. As shown in FIG. 3, in plan view, the shape of each focusing electrode 16 is strip-like extending in the Y-axis direction. In plan view, each focusing electrode 16 is disposed between two adjacent upper electrodes 14 in the X-axis direction (between the upper electrodes of two adjacent elements and obliquely above (hereinafter, "above" corresponds to the positive Z-axis direction) with respect to the upper electrodes 14. That is, the focusing electrodes 16 are disposed slightly separated in the electron emission direction from the upper electrodes 14). All the focusing electrodes 16 are connected to each other by a layer composed of a conductor (not shown) so as to maintain the same electric potential.

In FIGS. 1 and 3, the focusing electrodes 16 represented by reference numerals 16-1, 16-2, and 16-3 are respectively referred to as a first focusing electrode, a second focusing electrode, and a third focusing electrode for the sake of convenience. Thus, the second focusing electrode 16-2 is disposed between the first upper electrode 14-1 of the first element and the second upper electrode 14-2 of the second element and obliquely above with respect to the first upper electrode 14-1 and the second upper electrode 14-2. Similarly, the third focusing electrode 16-3 is disposed between the second upper electrode 14-2 of the second element and the third upper electrode 14-3 of the third element and obliquely above with respect to the second upper electrode 14-2 and the third upper electrode 14-3.

The electron-emitting device 10 further includes a transparent plate 17, a collector electrode (collector electrode layer) 18, and phosphors 19.

The transparent plate 17 is composed of a transparent material (glass or an acrylic material, in this embodiment) and is disposed above (in the positive Z-axis direction) the upper electrodes 14 with a predetermined distance therebetween. The transparent plate 17 is opposed to the substrate 11, and the upper surface and the lower surface of the transparent plate 17 are arranged so as to be parallel (in the X-Y in-plane direction) to the upper surface of the emitter section 13 and the upper surfaces of the upper electrodes 14.

The collector electrode 18 is composed of an electrically conductive material (a transparent conductive film, ITO, in this embodiment), and is disposed over the entire lower surface of the transparent plate 17 in the form of a layer. That is, the collector electrode 18 is arranged so as to be opposed to the individual upper electrodes 14 above the individual upper electrodes 14.

Each of the phosphors 19 is excited by irradiation with electrons to emit light of any one of red, green, and blue. In plan view, each phosphor 19 has substantially the same shape as that of each upper electrode 14 and is arranged to be superposed on each upper electrode 14. In FIG. 1, the phosphors represented by reference numerals 19R, 19G, and 19B respectively emit red light, green light, and blue light. Consequently, in this embodiment, the red phosphor 19R is placed right above (in the positive Z-axis direction) the first upper electrode 14-1, the green phosphor 19G is placed right above the second upper electrode 14-2, and the blue phosphor 19B is placed right above the third upper electrode 14-3. Note that a space surrounded by the emitter section 13, the upper electrodes 14, the insulating layer 15, the focusing electrodes 16, and the transparent plate 17 (collector electrode 18) is maintained to be substantially a vacuum (preferably $10^2$ to $10^{-6}$ Pa, and more preferably $10^{-3}$ to $10^{-5}$ Pa).

In other words, the transparent plate 17 and the collector electrode 18 together with sidewalls (not shown) of the electron-emitting device 10 constitute a space forming member for forming an enclosed space. The enclosed space is maintained to be substantially a vacuum. Consequently, the elements (at least the upper parts of the emitter section 13 and the upper electrodes 14 of the individual elements) of the electron-emitting device 10 are placed in the enclosed space maintained to be substantially a vacuum by the space forming member.

In addition, as shown in FIG. 1, the electron-emitting device 10 also includes a drive voltage applying circuit (drive voltage applying means) 21, a focusing electrode electric potential applying circuit (focusing electrode electric potential applying means) 22, and a collector voltage applying circuit (collector voltage applying means) 23.

The drive voltage applying circuit 21 is connected to a signal control circuit 100 and a power supply circuit 110 and applies a drive voltage Vin between the upper electrode 14 and the lower electrode 12 opposed to each other in each element on the basis of a signal from the signal control circuit 100.

The focusing electrode electric potential applying circuit 22 is connected to the focusing electrodes 16 and applies a predetermined negative potential (voltage) Vs to the focusing electrodes 16. The collector voltage applying circuit 23 applies a predetermined positive voltage (collector voltage) Vc to the collector electrode 18.

(Principle and Operation of Electron Emission)

The operational principle with respect to electron emission of the electron-emitting device 10 having the structure described above will be described below by focusing attention on one element.

Figure 12:
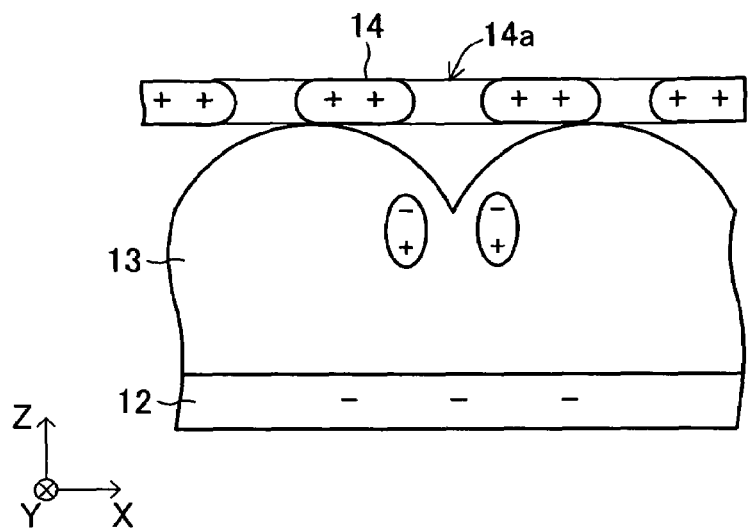
FIG. 12 is a diagram showing the electron-emitting device shown in FIG. 1 in one state.
Figure 13:
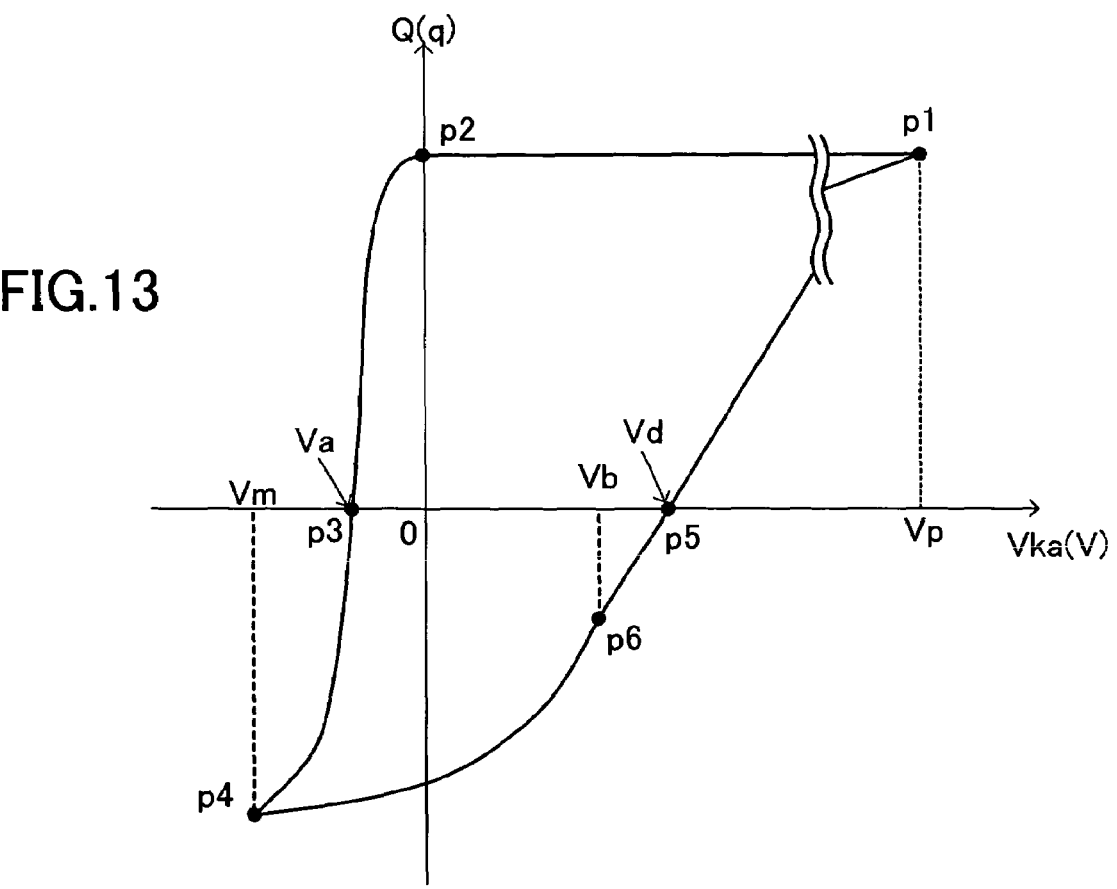
FIG. 13 is a graph showing voltage-polarization characteristics of an emitter section shown in FIG. 1.

First, a description will be made on the state in which the actual potential difference Vka (i.e., element voltage Vka) between the lower electrode 12 and the upper electrode 14 on the basis of the potential of the lower electrode 12 is maintained to be a predetermined positive voltage Vp immediately after all the electrons accumulated on the upper side of the emitter section 13 are emitted, and no electrons are accumulated on the upper side of the emitter section 13, as shown in FIG. 12. In this stage, the negative poles of dipoles of the emitter section 13 are directed toward the upper surface of the emitter section 13 (in the positive Z-axis direction, i.e., toward the upper electrode 14). This state corresponds to the point p1 on the graph shown in FIG. 13. FIG. 13 is a graph showing voltage-polarization characteristics in which the axis of abscissa denotes the element voltage Vka and the axis of ordinate denotes the charge Q accumulated in the element.

Figure 14:
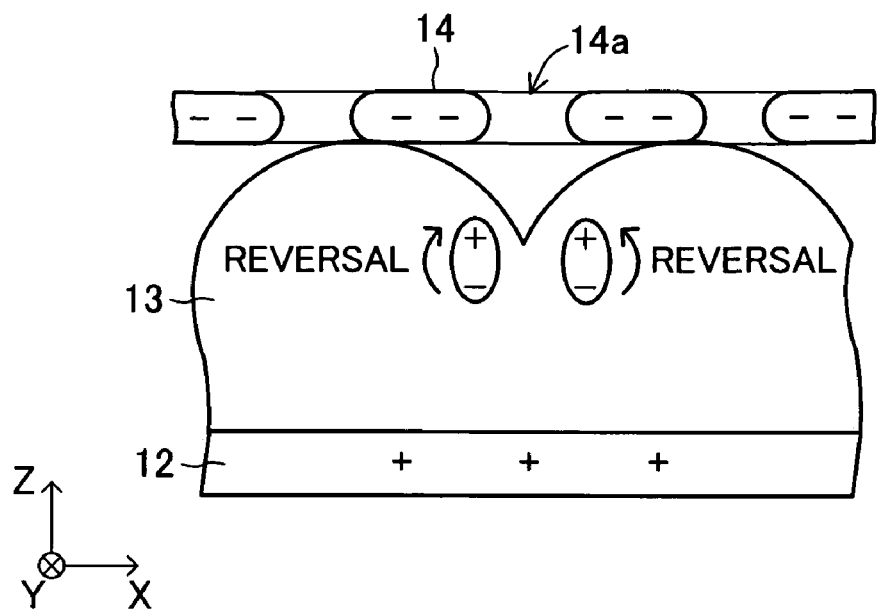
FIG. 14 is a diagram showing the electron-emitting device shown in FIG. 1 in another state.

In this state, the drive voltage applying circuit 21 decreases the drive voltage Vin toward a first voltage Vm which is a predetermined negative voltage. Thus, the element voltage Vka decreases toward the point p3 by way of the point p2 in FIG. 13. When the element voltage Vka reaches a voltage in the vicinity of the negative coercive field voltage Va shown in FIG. 13, the direction of the dipoles of the emitter section 13 starts to reverse. That is, as shown in FIG. 14, polarization reversal (negative polarization reversal) starts to occur.

Figure 15:
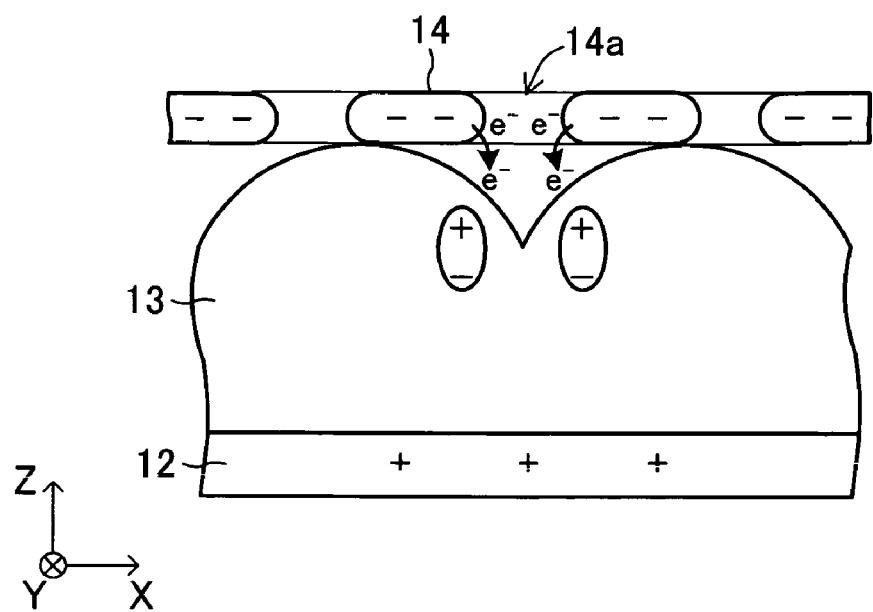
FIG. 15 is a diagram showing the electron-emitting device shown in FIG. 1 in another state.

Because of the polarization reversal, the electric field increases, i.e., the electric field concentrates, at the peripheral portion (edge) of a through-hole 14a of the upper electrode 14 as well as at a contact site (triple junction) among the upper surfaces of the upper electrode 14 and the emitter section 13, and the medium (vacuum in this case) surrounding these. Thus, as shown in FIG. 15, electrons start to be supplied from the upper electrode 14 toward the emitter section 13.

The supplied electrons are mainly accumulated on the upper side of the emitter section 13 in the vicinity beneath the peripheral portion of the through-hole 14a of the upper electrode 14 (hereinafter, also referred to as "in the vicinity beneath the through-hole 14a"). Then, after a predetermined time, when the negative polarization reversal is completed, the element voltage Vka rapidly changes toward the predetermined voltage Vm. As described above, electrons are accumulated. This state corresponds to the state of the point p4 in FIG. 13.

Figure 16:
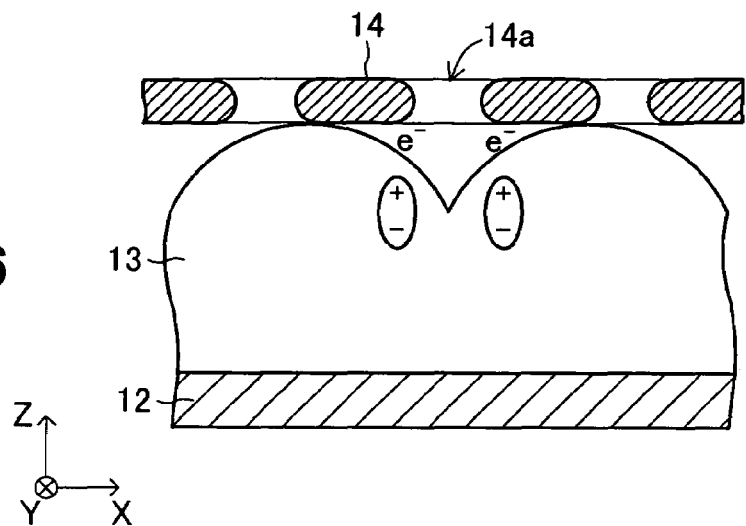
FIG. 16 is a diagram showing the electron-emitting device shown in FIG. 1 in another state.
Figure 17:
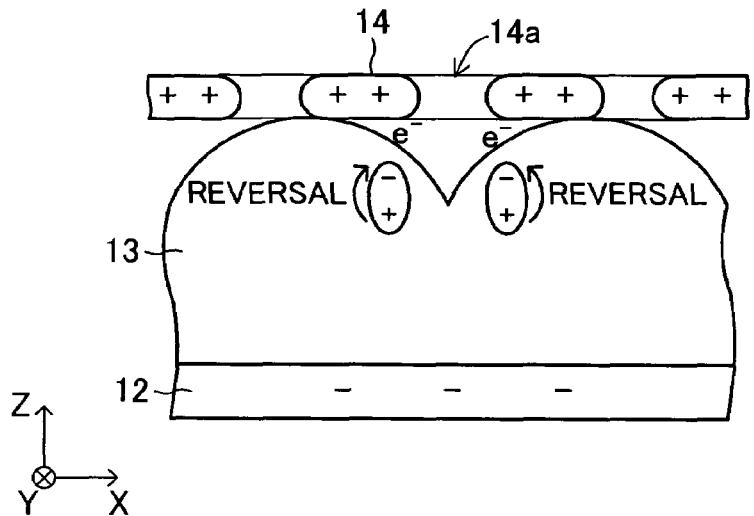
FIG. 17 is a diagram showing the electron-emitting device shown in FIG. 1 in another state.

Subsequently, the drive voltage applying circuit 21 changes the drive voltage Vin to a second voltage Vp which is a predetermined positive voltage. Thus, the element voltage Vka starts to increase. In this stage, until the element voltage Vka reaches a voltage Vb (point p6) that is lower than a positive coercive field voltage Vd corresponding to the point p5 in FIG. 13, the state of electrification on the emitter section 13 is maintained, as shown in FIG. 16. Then, the element voltage Vka reaches a voltage close to the positive coercive field voltage Vd. Thereby, the electrons accumulated in the vicinity beneath the through-hole 14a are attracted to the upper electrode 14 because of the electric potential applied to the upper electrode 14, and almost at the same time, the negative poles of the dipoles start to be directed toward the upper surface of the emitter section 13. That is, as shown in FIG. 17, the polarization is reversed again (i.e., positive polarization reversal starts to occur). This state corresponds to the state in the vicinity of the point p5 in FIG. 13.

Figure 18:
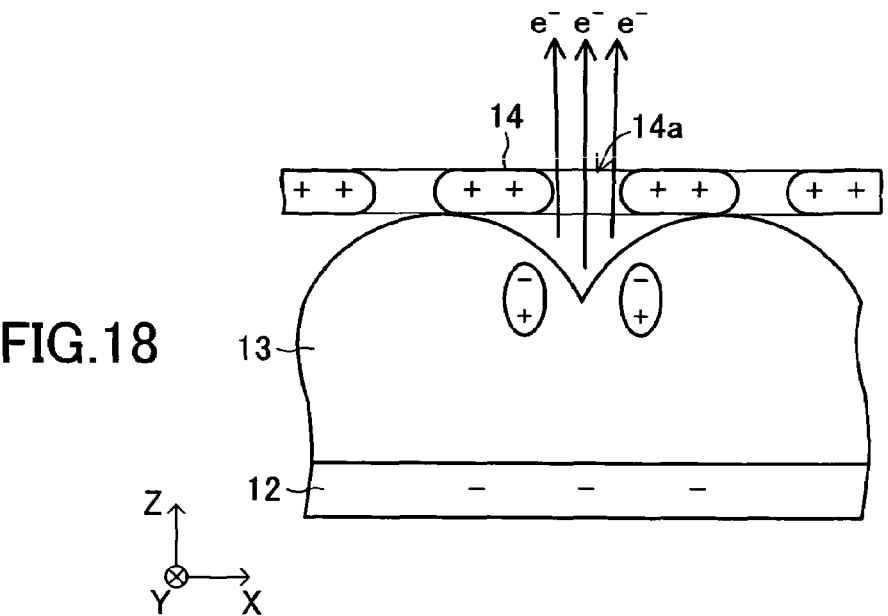
FIG. 18 is a diagram showing the electron-emitting device shown in FIG. 1 in another state.

In such a state, electrons accumulated in the vicinity beneath the through-hole 14a are affected by Coulomb repulsion from the dipoles whose negative poles have been turned toward the upper side of the emitter section 13 and at the same time, are attracted by the upper electrode 14 due to the potential applied to the upper electrode 14. As a result, as shown in FIG. 18, the electrons accumulated in the vicinity beneath the through-hole 14a are emitted upward (in the positive Z-axis direction) through the through-hole 14a.

When the positive polarization reversal is completed, the element voltage VKa rapidly starts to increase and electrons are actively emitted. Subsequently, the emission of electrons is completed, and the element voltage Vka reaches the second voltage Vp. As a result, the state of the emitter section 13 returns to the original state shown in FIG. 12 (the state of the point p1 in FIG. 13). What has been described above is the principle of a series of operation with respect to accumulation of electrons (turning off of light) and emission of electrons (turning on of light/emission of light).

When a plurality of elements are present, the drive voltage applying circuit 21 changes the drive voltage Vin to the first voltage Vm to accumulate electrons only for the upper electrodes 14 of the elements which are required to emit electrons, maintains the voltage Vin to be the value "0" for the upper electrodes 14 which are not required to emit electrons, and then changes the drive voltage Vin to the second voltage Vp all at once (simultaneously) for all the upper electrodes 14. Thereby, electrons are emitted only from the upper electrodes 14 (through-holes 14a) of the elements in which electrons have been accumulated on the upper side of the emitter section 13. Consequently, polarization reversal does not occur in the emitter section 13 in the vicinity of the upper electrodes 14 which are not required to emit electrons.

Figure 19:
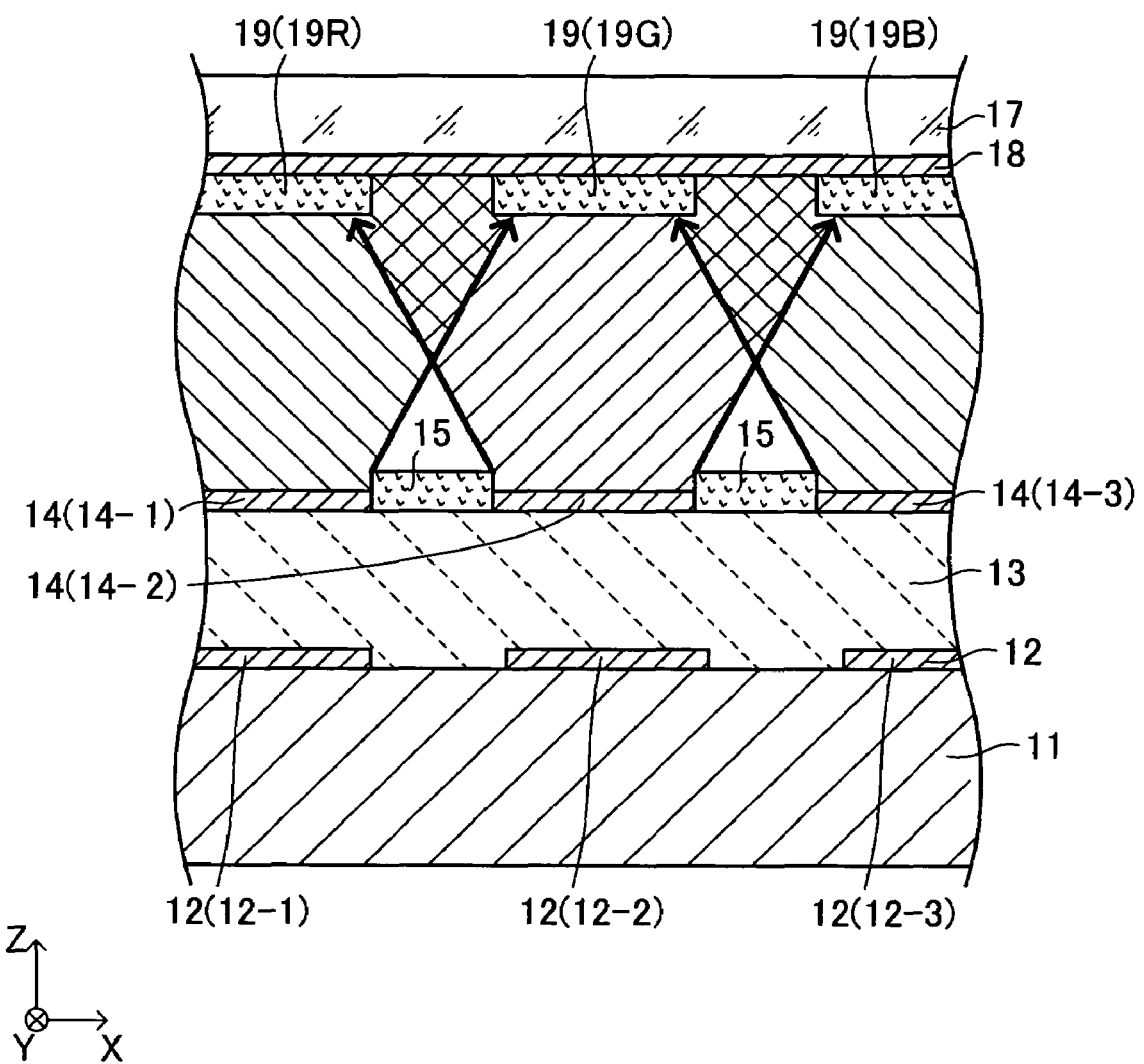
FIG. 19 is a diagram showing the state in which electrons are emitted from an electron-emitting device not provided with a focusing electrode.

When electrons are emitted through through-holes 14a of upper electrodes 14, as shown in FIG. 19, the electrons move in the positive Z-axis direction while gradually spreading (in a cone shape). As a result, in a conventional device, in some cases, electrons emitted from an upper electrode 14 (e.g. second upper electrode 14-2) may reach not only a phosphor (e.g., green phosphor 19G) directly above the upper electrode 14 but also its adjacent phosphors (red phosphor 19R and blue phosphor 19B). If this occurs, color purity decreases and the clarity of the image degrades.

Figure 20:
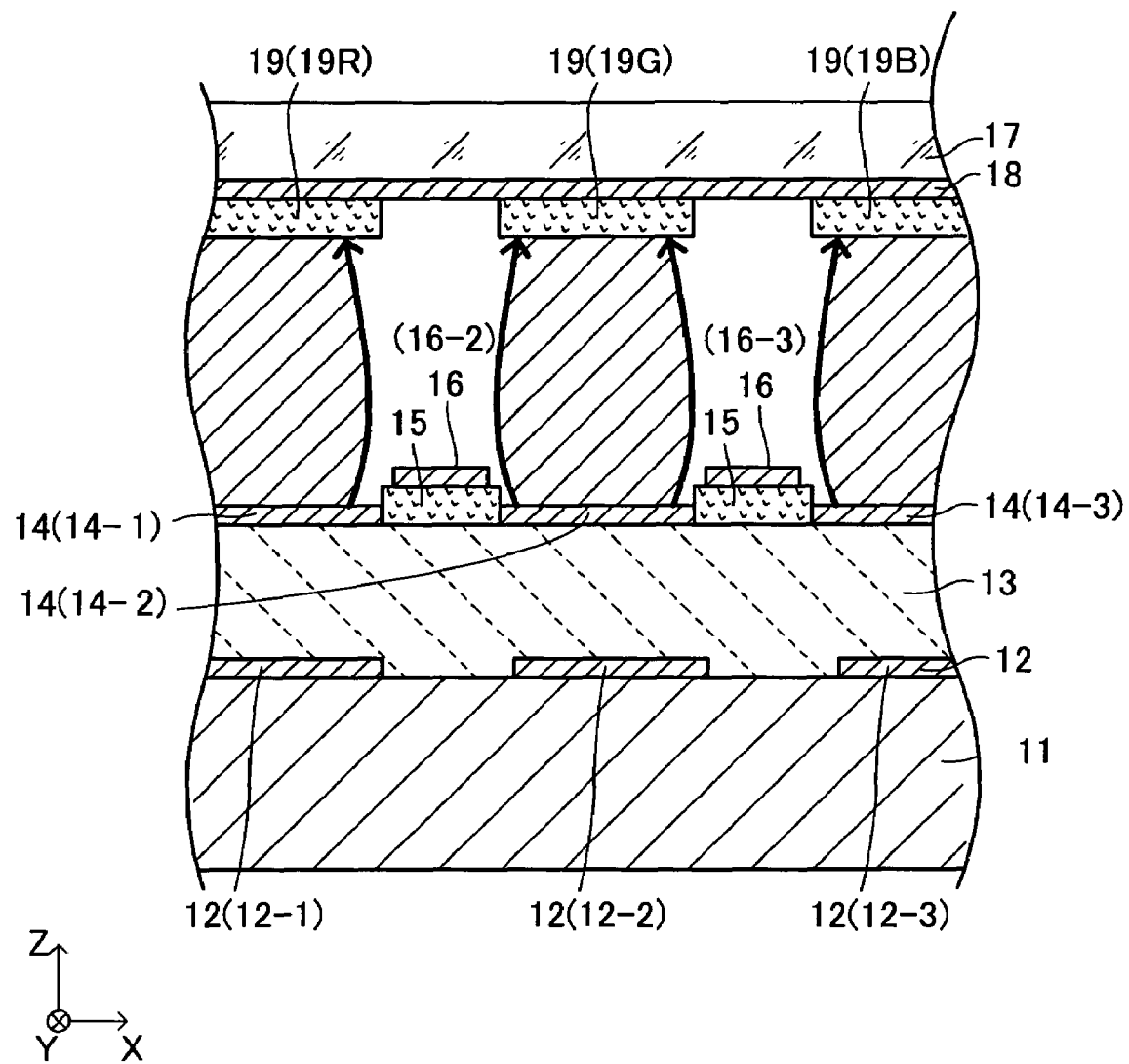
FIG. 20 is a diagram showing the state in which electrons are emitted from the electron-emitting device shown in FIG. 1.

In contrast, in the electron-emitting device 10 according to this embodiment, focusing electrodes 16 to which a negative potential is applied are provided. Each of the focusing electrodes 16 is disposed between two adjacent upper electrodes 14 (between the upper electrodes of two adjacent elements) and slightly above (in the positive Z-axis direction) the upper electrodes 14. Consequently, as shown in FIG. 20, electrons emitted from the through-hole 14a of the upper electrode 14 are emitted substantially directly upward without spreading due to the electric fields caused by the focusing electrodes 16.

As a result, the electrons emitted from the first upper electrode 14-1 reach the red phosphor 19R only, the electrons emitted from the second upper electrode 14-2 reach the green phosphor 19G only; and the electrons emitted from the third upper electrode 14-3 reach the blue phosphor 19B only. Consequently, the color purity of the display does not decrease and a clearer image can be obtained.

Furthermore, a predetermined positive voltage Vc is applied to the collector electrode 18 by the collector voltage applying circuit 23. Thereby, the electrons emitted from the emitter section 13 move upward above the upper electrodes 14 while being accelerated (being given high energy) by the electric field formed by the collector electrode 18. Consequently, the phosphors 19 are irradiated with electrons with high energy, and thus high luminance can be achieved.

<Examples of Materials for the Individual Constituent Members and Examples of Manufacturing Methods>

Materials for the constituent members of the electron-emitting device and manufacturing methods will now be described below.

(Lower Electrode 12)

The lower electrode 12 is composed of an electrically conductive material. The lower electrode 12 can be formed by any of various film forming methods. For example, the lower electrode 12 may be formed by an appropriate method selected from thick-film formation methods, such as screen printing, spray coating, and dip coating, and thin-film formation methods, such as an ion beam method, sputtering, vacuum evaporation, ion plating, CVD, and plating. Examples of materials suitable for the lower electrode 12 will be listed below.

(1) Conductor having resistance to high-temperature oxidizing Atmosphere (such as elemental metal or alloy)

Examples include high-melting-point noble metals, such as platinum, iridium, palladium, rhodium, and molybdenum, and conductors including, as major components, alloys, such as silver-palladium, silver-platinum, and platinum-palladium.

(2) Mixture of insulating ceramic and elemental metal having resistance to high-temperature oxidizing atmosphere Examples include cermet materials consisting of platinum and ceramic materials (3) Mixture of insulating ceramic and alloy having resistance to high-temperature oxidizing atmosphere (4) Carbon-based or graphite-based material (5) Conductive film composed of gold, silver, copper, aluminum, chromium, molybdenum, tungsten, nickel, or the like formed by a thin-film formation method, such as sputtering (6) Gold resinate film, silver resinate film, or platinum resinate film formed by printing When a ceramic material is added to an electrode material, the content of the ceramic material to be added is preferably about 5% to 30% by volume. Furthermore, the lower electrode 12 may be formed using the same material as that for the upper electrode 14, which will be described below. The thickness of the lower electrode is preferably 20 µm or less, and more preferably 5 µm or less.

(Emitter Section 13)

As the dielectric material constituting the emitter section 13, a dielectric material having a relatively high relative dielectric constant (for example, a relative dielectric constant of 1,000 or more) can be used. Examples of materials suitable for the emitter section 13 will be listed below.

(1) Barium titanate, lead zirconate, lead magnesium niobate, lead nickel niobate, lead zinc niobate, lead manganese niobate; lead magnesium tantalate, lead nickel tantalate, lead antimony stannate, lead titanate, lead magnesium tungstenate, lead cobalt niobate, etc.

(2) Ceramics containing a combination of any of the materials described in item (1)

(3) Ceramics described in item (2) to which an oxide of lanthanum, calcium, strontium, molybdenum, tungsten, barium, niobium, zinc, nickel, manganese, or the like is added, ceramics described in item (2) to which a material combined with any of these oxides is added, or materials obtained by further adding another compound to these (4) Material whose main component contains 50% or more of any of the materials described in item (1)

For example, with respect to a binary nPMN-mPT material (wherein n and m represent molar ratios) including lead magnesium niobate (PMN) and lead titanate (PT), by increasing the molar ratio of PMN, the Curie point is decreased and the relative dielectric constant at room temperature can be increased. In particular, nPMN-mPT in which n=0.85 to 1.0 and m=1.0−n has a relative dielectric constant of 3,000 or more, thus being significantly preferable as the material for the emitter section. For example, nPMN-mPT in which n=0.91 and m=0.09 has a relative dielectric constant of 15,000 at room temperature, and nPMN-mPT in which n=0.95 and m=0.05 has a relative dielectric constant of 20,000.

Furthermore, with respect to a ternary PMN-PT-PZ material including lead magnesium niobate (PMN), lead titanate (PT), and lead zirconate (PZ), by increasing the molar ratio of PMN, the relative dielectric constant can be increased. Further, in this tertiary system, by achieving a composition close to a morphotropic phase boundary (MPB) between a tetragonal phase and a quasi-cubic phase or a tetragonal phase and a rhombohedral phase, the relative dielectric constant can be increased.

For example, when PMN:PT:PZ=0.375:0.375:0.25, the relative dielectric constant is 5,500, or when PMN:PT:PZ=0.5:0.375:0.125, the relative dielectric constant is 4,500. PMN-PT-PZ with such a composition is particularly preferable as the material for the emitter section.

Furthermore, it is preferable to increase the relative dielectric constant by incorporating a metal, such as platinum, into any of these dielectric materials within a range that ensures the insulating property. In such a case, for example, 20% by weight of platinum may be incorporated into the dielectric material.

The emitter section may be in the form of a piezoelectric/electrostrictive layer, an antiferroelectric layer, or the like. When a piezoelectric/electrostrictive layer is used for the emitter section, the piezoelectric/electrostrictive layer may be composed of a ceramic. Examples of the ceramic include lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstenate, lead cobalt niobate, etc. and a combination of any of these materials.

The emitter section may contain a main component including 50% by weight or more of any of the compounds described above. Among the ceramics described above, ceramics containing lead zirconate are most often used as the constituent material for the piezoelectric/electrostrictive layer constituting the emitter section.

When the piezoelectric/electrostrictive layer is composed of a ceramic, an oxide of lanthanum, calcium, strontium, molybdenum, tungsten, barium, niobium, zinc, nickel, manganese, or the like, or a combination of any of these materials, or any of other compounds may be added to the ceramic, as desired. Alternatively, a ceramic produced by appropriately adding $SiO_2$, $CeO_2$, $Pb_5Ge_3O_{11}$, or a combination of any of these compounds to any of the ceramics described above may be used. Specifically, a material produced by adding 0.2% by weight of $SiO_2$, 0.1% by weight of $CeO_2$, or 1% to 2% by weight of $Pb_5Ge_3O_{11}$ to a PT-PZ-PMN-based piezoelectric material is preferable.

More specifically, for example, use of ceramics including lead magnesium niobate, lead zirconate, and lead titanate as main components and further including lanthanum and strontium is preferable.

The piezoelectric/electrostrictive layer may be dense or porous. If the piezoelectric/electrostrictive layer is porous, the porosity thereof is preferably 40% or less.

When an antiferroelectric layer is used for the emitter section 13, preferably, the antiferroelectric layer is composed of a material including lead zirconate as a main component, a material including lead zirconate and lead stannate as main components, lead zirconate to which lanthanum oxide is added, or a material including lead zirconate and lead stannate to which lead niobate is added.

The antiferroelectric layer may be porous. If the antiferroelectric layer is porous, the porosity thereof is preferably 30% or less.

Furthermore, strontium tantalate bismuthate ($SrBi_2Ta_2O_9$) is suitable for the emitter section because of its small polarization reversal fatigue. Such a material whose polarization reversal fatigue is small is a laminar ferroelectric compound and represented by general formula $(BiO_2)^{2+}(A_{m-1}B_mO_{3m+1})^{2-}$. Examples of ions of the metal A include $Ca^{2+}$, $Sr^{2+}$, $Ba^{2+}$, $Pb^{2+}$, $Bi^{3+}$, $La^{3+}$, etc., and examples of the ions of the metal B include $Ti^{4+}$, $Ta^{5+}$, $Nb^{5+}$, etc. Furthermore, an additive may be added to a barium titanate-based, lead zirconate-based, or PZT-based piezoelectric ceramic to convert it into a semiconductor. In such a case, a nonuniform electric field distribution can be caused in the emitter section 13 to concentrate an electric field in the vicinity of the interface with the upper electrode which contributes to the emission of electrons.

The firing temperature of the emitter section 13 can be decreased by adding a glass component, such as lead borosilicate glass, or other low-melting-point compounds (e.g., bismuth oxide) to the piezoelectric/electrostrictive/antiferroelectric ceramics.

When the emitter section is composed of piezoelectric/electrostrictive/antiferroelectric ceramics, the emitter section may be a sheet-like molded body, a sheet-like laminated body, or either one of such bodies stacked or bonded to another supporting substrate.

If the emitter section is composed of a material having a high melting point or a high evaporation temperature, for example, by using a non-lead-based material, it is possible to obtain an emitter section which is not easily damaged by collision of electrons or ions.

The emitter section can be formed by any of various thick-film formation methods, such as screen printing, dipping, coating, electrophoresis, precipitation, and aerosol deposition, or any of various thin-film formation methods, such as an ion beam method, sputtering, vacuum evaporation, ion plating, chemical vapor deposition (CVD), plating, etc. In particular, by using a method in which a powdered piezoelectric/electrostrictive material is formed into an emitter section and the resulting compact is impregnated with low-melting-point glass or sol particles, it is possible to form a film at a low temperature of 700° C. or 600° C. or lower.

(Upper Electrode 14)

In order to form the upper electrode 14 in a predetermined shape, for example, any of the following techniques may be used.

(1) Technique of performing patterning by screen printing, photolithography, or the like (2) Technique of performing patterning in which unnecessary portions are removed by laser machining using excimer laser, YAG laser, or the like, or by machining, such as slicing, ultrasonic machining, or the like Furthermore, in order to form the fine through-holes described above in the upper electrode 14, for example, photolithography, electron beam or X-ray lithography, or machining using excimer laser, YAG laser, focused ion beam (FIG), or the like may be employed. As will be described in detail, a process may also be employed in which an organometallic compound is applied to or allowed to extend on the upper surface of a material for forming the emitter section 13 by a thick-film formation method, such as screen printing, spray coating, dip coating, or the like and then firing is performed by heating at a predetermined temperature. The process of forming the upper electrode 14 by heating/firing does not require expensive manufacturing facilities, and the upper electrode 14 can be formed in air, and thus this process is advantageous in forming the upper electrode 14 provided with fine through-holes.

The process of forming the upper electrode 14 by heating/firing will be described in detail below.

(A: Case in which Organometallic Compound Containing Two or More Metals is Used)

The upper electrode 14 is formed by allowing an "organometallic compound containing two or more metals" selected from the group consisting of silver (Ag), gold (Au), iridium (Ir), rhodium (Rh), ruthenium (Ru), platinum (Pt), palladium (Pd), aluminum (Al), copper (Cu), nickel (Ni), chromium (Cr), molybdenum (Mo), tungsten (W), titanium (Ti), etc. to extend on the upper side of a material forming the emitter section 13 such that the organometallic compound is in the shape of a film, followed by firing at a predetermined temperature. If the organometallic compound containing two or more metals is fired at a proper temperature, the upper electrode 14 provided with through-holes having an extremely fine average diameter (10 nm or more and less than 100 nm) can be formed easily compared with a case in which an organometallic compound containing one metal only is fired. Furthermore, by using lithium (Li) as the metal, the same effect can be achieved. Such an organometallic compound may contain one or more metal and boron (B).

Here, the "organometallic compound containing two or more metals" may be any one of a mixture of two or more organometallic compounds, each containing only one metal; one organometallic compound containing two or more metals; and a mixture of one organometallic compound containing two or more metals and another organometallic compound. Preferably, the "organometallic compound containing two or more metals" contains at least a noble metal. More preferably, as the noble metal, platinum (Pt), gold (Au), or iridium (Ir) is used.

Furthermore, with respect to the material for forming the upper electrode 14, an oxide electrode for suppressing polarization reversal fatigue or a material in which an oxide electrode for suppressing polarization reversal fatigue is mixed may be used as the "organometallic compound containing two or more metals". Examples of the oxide electrode for suppressing polarization reversal fatigue include ruthenium oxide ($RuO_2$), iridium oxide ($IrO_2$), strontium ruthenate ($SrRuO_3$), $La_{1-x}Sr_xCoO_3$ (e.g., x=0.3 or 0.5), $La_{1-x}Ca_xMnO_3$ (e.g., x=0.2), $La_{1-x}Ca_xMn_{1-y}Co_yO_3$ (e.g., x=0.2, y=0.05), etc.

In order to form a plurality of through-holes having an average diameter of 10 nm or more and less than 100 nm in the upper electrode 14, as will be described below, it is taken into consideration whether the "organometallic compound containing two or more metals" is fired in a single-phase state or in a mixed-phase sate.

(A-1) Example of Manufacturing Method in which Firing is Performed in a Single-phase State (Manufacturing Method Example 1)

Step 1: An organometallic compound containing one predetermined metal serving as a base material (e.g., Pt with a melting point of 1,770° C.) and an organometallic compound containing one metal having a higher melting point than that of the predetermined metal (Pt) (e.g., Ir with a melting point of 2,410° C.) are mixed at a metal weight ratio that allows both metals to be present in a single-phase state at the vicinity of the firing temperature (about 700° C. in this example), and stirring is preformed. Here, Pt:Ir=97:3 (percent by weight). Note that, when a Pt organometallic compound and an Ir organometallic compound are mixed, if Pt:Ir=90:10 to 100:0 (percent by weight), i.e., in the presence of 10% or less of Ir, both metals can be present in a single-phase state at the vicinity of the firing temperature (about 700° C. in this example).

Step 2: The organometallic compound (mixed organometallic compound) in the form of a paste obtained by mixing in Step 1 is allowed to extend on a material forming the emitter section 13 by screen printing such that the organometallic compound is in the shape of a film, and then drying is performed at 100° C.

Step 3: Using an electric furnace, heating/temperature raising is performed to 700° C. at a temperature rise rate of 47° C./min, and this state is maintained for 30 minutes to fire (heat-treat) the organometallic compound.

Steps 2 and 3 correspond to the step of forming the upper electrode by allowing an organometallic compound containing two or more metals to extend on the upper side of a material forming the emitter section such that the organometallic compound is in the shape of a film, and subsequently raising the temperature to a predetermined temperature at a predetermined temperature rise rate to fire the organometallic compound.

Figure 21:
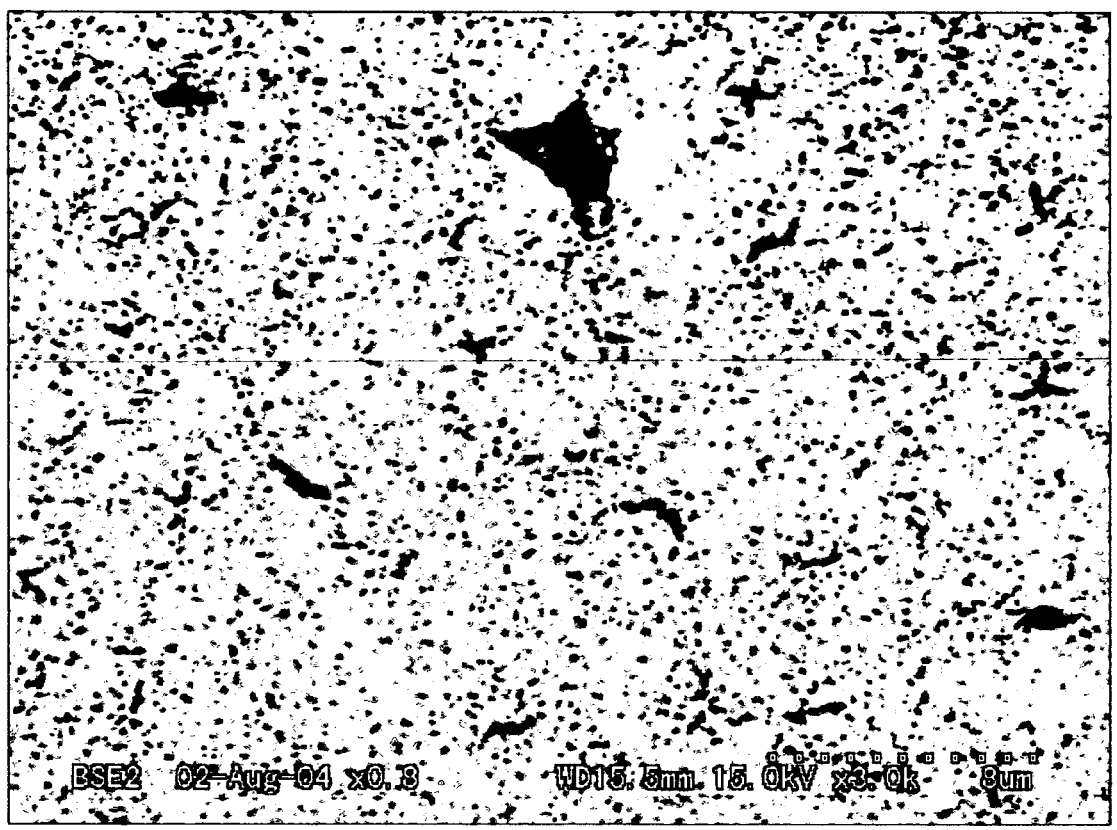
FIG. 21 is an enlarged photograph of a surface of an upper electrode of an electron-emitting device manufactured according to Manufacturing Method Example 1 of the present invention.

In an electron-emitting device manufactured according to Manufacturing Method Example 1, the amount of electron emission was larger compared with a case in which an organometallic compound containing only the predetermined metal (Pt) serving as a base metal was heated to 700° C. at 47° C./min and fired at 700° C. The reason for this is believed to be that, because of the presence of a metal having a high melting point (Ir, in this case), grain growth of Ir and Pt in a single phase is suppressed, and as shown in FIG. 21 which is an enlarged photograph of the actual surface of the upper electrode, an upper electrode provided with through-holes having fine average diameter of 10 nm or more and less than 100 nm (50 nm or less in the example of Pt and Ir) was easily formed.

Figure 22:
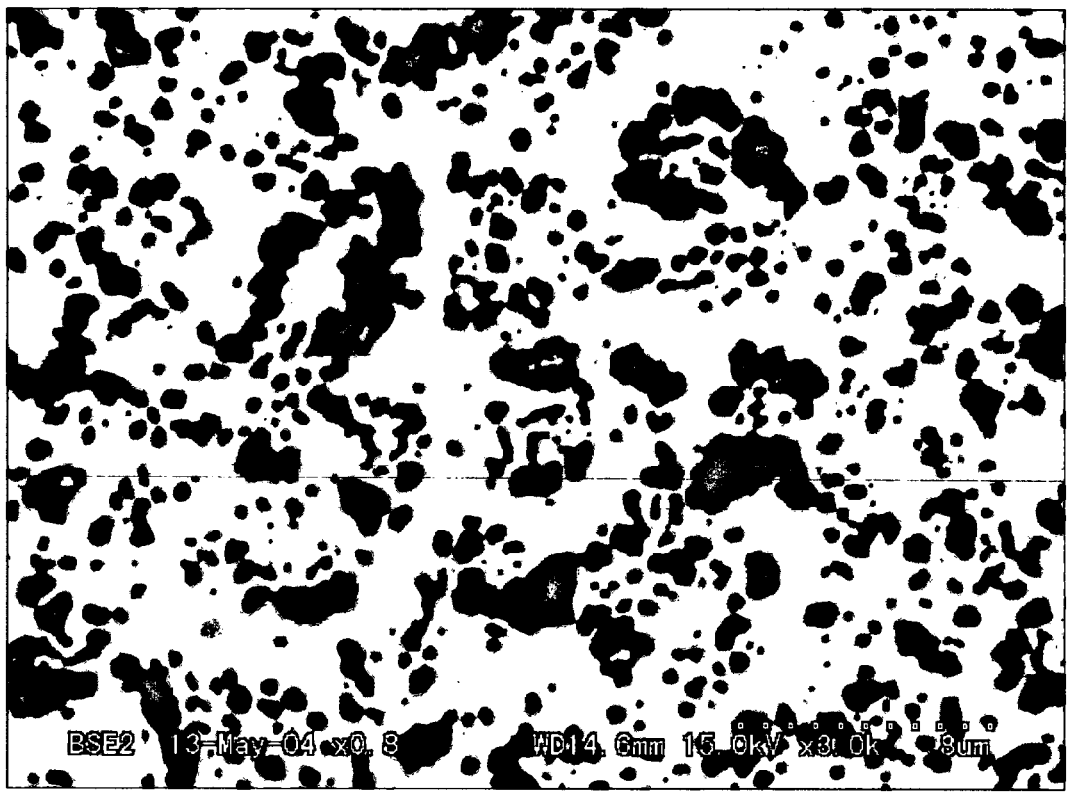
FIG. 22 is an enlarged photograph of a surface of an upper electrode of an electron-emitting device manufactured by a manufacturing method to which the present invention is not applied.

FIG. 22 is an enlarged photograph of the surface of an upper electrode formed by a conventional method in which only an organometallic compound containing Pt only was fired under the conditions described above (firing temperature 700° C., temperature rise rate 47° C./min). As is also known from FIG. 22, the average diameter of the through-holes of the upper electrode formed by the conventional method is relatively large at 100 to 5,000 nm. Therefore, it is understood that according to Manufacturing Method Example 1, through-holes having extremely small average diameter compared with the conventional case can be easily formed.

Figure 28:
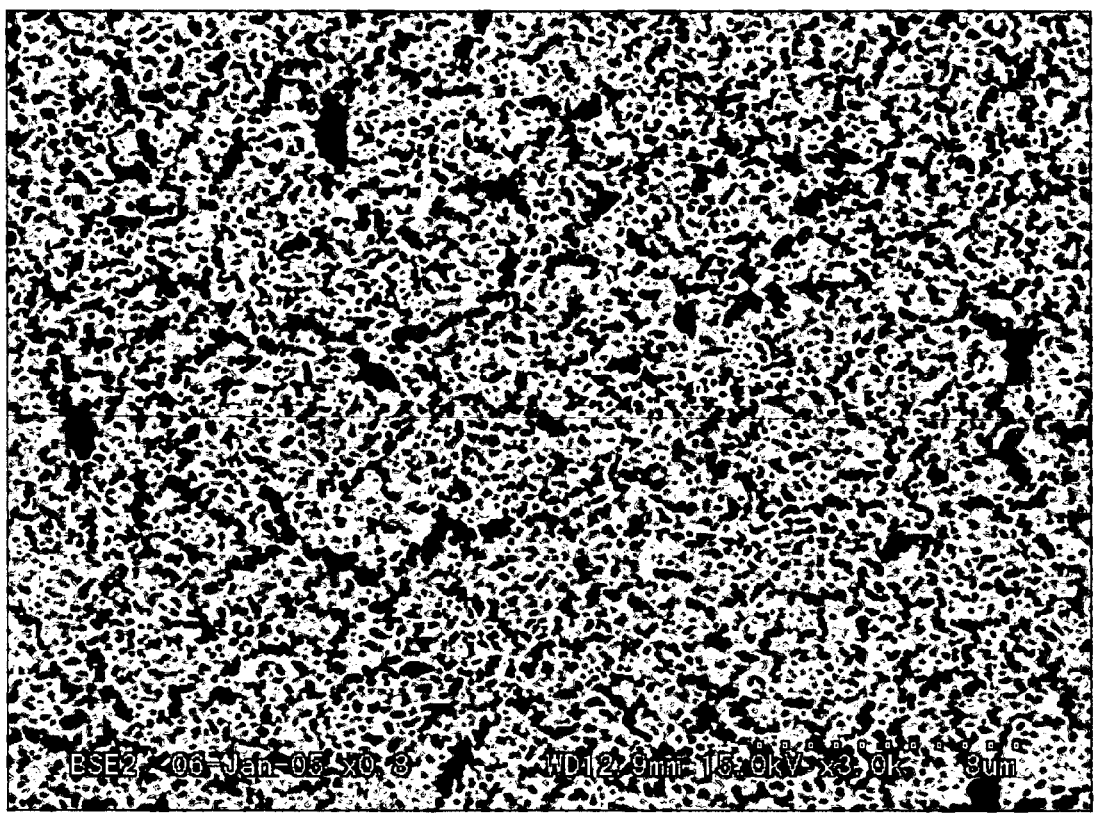
FIG. 28 is an enlarged photograph of a surface of an upper electrode of an electron-emitting device manufactured according to Manufacturing Method Example 4 of the present invention.
Figure 29:
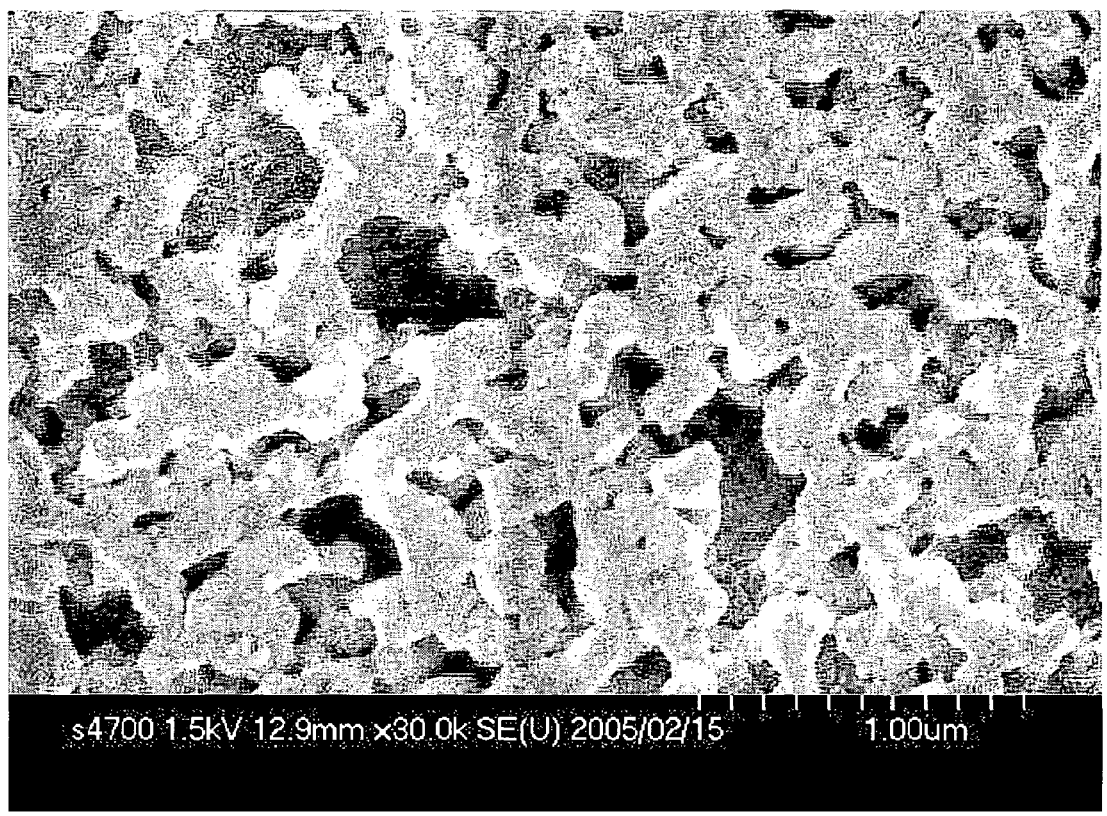
FIG. 29 is a further enlarged photograph of the surface of the upper electrode of the electron-emitting device manufactured according to Manufacturing Method Example 4 of the present invention.

Note that FIGS. 21 to 24, 28, 33, and 34 are each an enlarged photograph of a surface of an upper electrode formed by each manufacturing method, the photographs being taken at the same magnification. FIG. 29 is an enlarged photograph of the surface of the upper electrode shown in FIG. 28, the photograph being taken at a higher magnification than that of FIG. 28.

(A-2) Example of Manufacturing Method in which Firing is Performed in a Mixed-phase State (Manufacturing Method Example 2)

Step 1: An organometallic compound containing only one predetermined metal serving as a base material (e.g., Pt with a melting point of 1,770° C.) and an organometallic compound containing another metal having a lower melting point than that of the predetermined metal (Pt) (e.g., Au having a melting point of 1,064° C.) are mixed at a metal weight ratio that allows both metals to be present in a mixed-phase state at the vicinity of the firing temperature (about 650° C. in this example), and stirring is preformed. Here, Pt:Au=95:5 (percent by weight). Note that, when a Pt organometallic compound and an Au organometallic compound are mixed, if Pt:Au=22:78 to 97:3 (percent by weight), i.e., in the presence of 3% to 78% of Au, both metals can be present in a mixed-phase state at the vicinity of the firing temperature (about 650° C. in this example).

Step 2: The organometallic compound (mixed organometallic compound) in the form of a paste obtained by mixing in Step 1 is allowed to extend on a material forming the emitter section 13 by screen printing such that the organometallic compound is in the shape of a film, and then drying is performed at 100° C.

Step 3: Using an electric furnace, heating/temperature raising is performed to 650° C. at a temperature rise rate of 43° C./min, and this state is maintained for 30 minutes to fire (heat-treat) the organometallic compound.

Steps 2 and 3 correspond to the step of forming the upper electrode by allowing an organometallic compound containing two or more metals to extend on the upper side of a material forming the emitter section such that the organometallic compound is in the shape of a film, and subsequently raising the temperature to a predetermined temperature at a predetermined temperature rise rate to fire the organometallic compound.

In an electron-emitting device manufactured according to Manufacturing Method Example 2, the amount of electron emission was larger compared with a case in which an organometallic compound containing only the predetermined metal (Pt) serving as a base metal was heated to 700° C. at 47° C./min and fired at 700° C. If an organometallic compound containing two or more metals is fired such that the individual metals are present in a mixed-phase state, since Pt and Au form two or more different phases, grain growths of the metals constituting the individual phases are inhibited (suppressed) by each other. As a result, it is possible to form an upper electrode having through-holes with a fine diameter of 10 nm or more and less than 100 nm.

Figure 23:
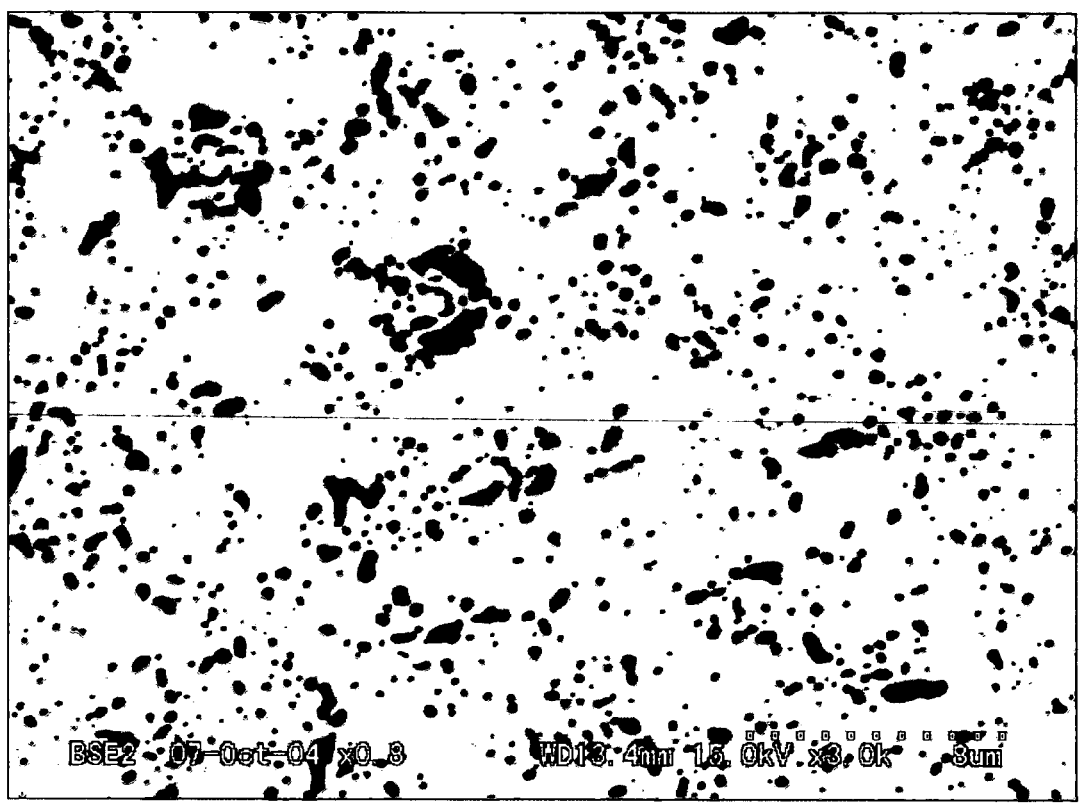
FIG. 23 is an enlarged photograph of a surface of an upper electrode of an electron-emitting device manufactured according to Manufacturing Method Example 2 of the present invention.

FIG. 23 is an enlarged photograph of a surface of an upper electrode formed according to Manufacturing Method Example 2. As is evident from comparison between FIG. 23 and FIG. 22 which is an enlarged photograph of the surface of the upper electrode formed according to the conventional manufacturing method, it is possible by Manufacturing Method Example 2 to easily form through-holes having an extremely small average diameter compared with the conventional case.

It is also possible to form an upper electrode provided with through-holes having a fine average diameter, compared with the case in which a single organometallic compound containing only one metal is fired, by a method in which an organometallic compound containing two metals is synthesized in advance and the organometallic compound is fired by the same process as that described above. Examples of the organometallic compound by such synthesis include a Pt—Au organometallic compound containing about 5% by weight of Au, which is a material capable of forming through-holes with a fine diameter.

(A-3) First Example of Manufacturing Method in which Three Organometallic Compounds are Used (Manufacturing Method Example 3)

Step 1: An organometallic compound containing one predetermined metal serving as a base material (e.g., Pt with a melting point of 1,770° C.), an organometallic compound containing one metal having a lower melting point than that of the predetermined metal (Pt) (e.g., Au with a melting point of 1,064° C.), and an organometallic compound containing one metal having a higher melting point than that of the predetermined metal (Pt) (e.g., Ir with a melting point of 2,410° C.) are mixed at a predetermined metal weight ratio, followed by stirring. Here, Pt:Au:Ir=93:4.5:2.5 in terms of percent by weight. In this way, Pt and Ir are in a single-phase state and the single-phase components are present in a mixed-phase state with Au at the vicinity of the firing temperature (about 700° C. in this example).

Step 2: The organometallic compound (mixed organometallic compound) in the form of a paste obtained by mixing in Step 1 is allowed to extend on a material forming the emitter section 13 by screen printing such that the organometallic compound is in the shape of a film, and then drying is performed at 100° C.

Step 3: Using an electric furnace, heating/temperature raising is performed to 700° C. at a temperature rise rate of 47° C./min, and this state is maintained for 30 minutes to fire (heat-treat) the organometallic compound.

Steps 2 and 3 correspond to the step of forming the upper electrode by allowing an organometallic compound containing two or more metals to extend on the upper side of a material forming the emitter section such that the organometallic compound is in the shape of a film, and subsequently raising the temperature to a predetermined temperature at a predetermined temperature rise rate to fire the organometallic compound.

Figure 24:
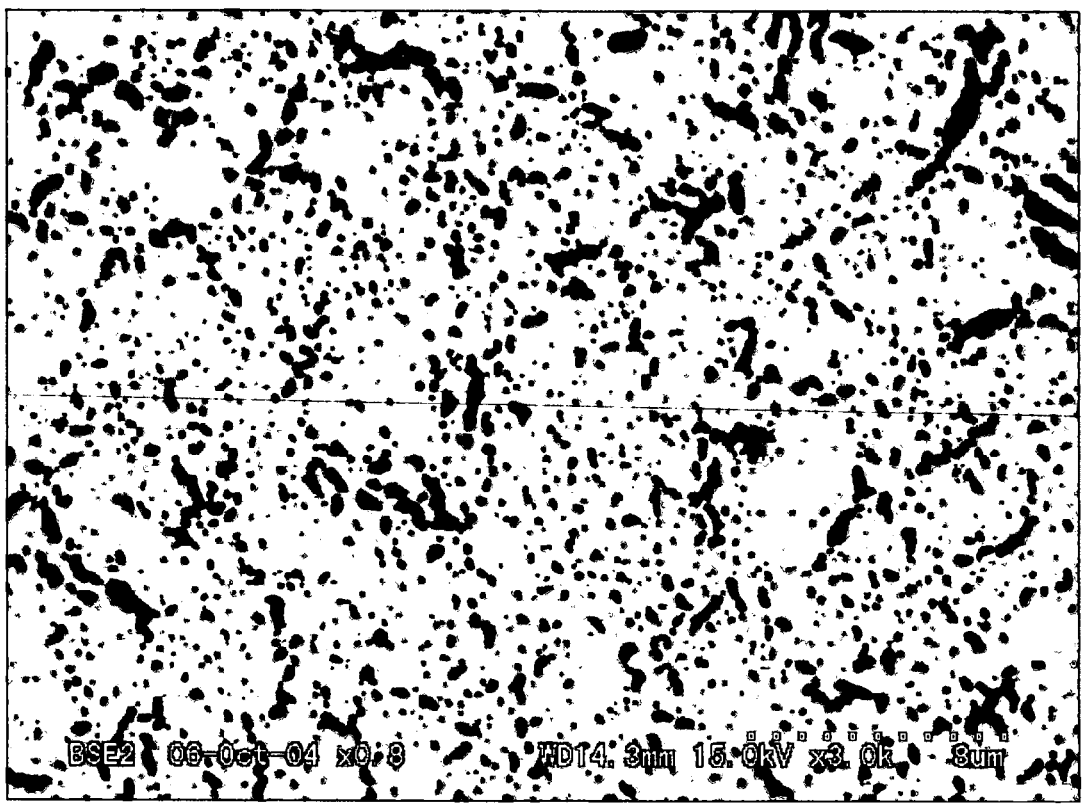
FIG. 24 is an enlarged photograph of a surface of an upper electrode of an electron-emitting device manufactured according to Manufacturing Method Example 3 of the present invention.

As shown in FIG. 24, which is an actual enlarged photograph, an electron-emitting device manufactured according to Manufacturing Method Example 3 is provided with an upper electrode having through-holes with a fine average diameter of 10 nm or more and less than 100 nm (50 nm or less in the example of Pt and Ir). Consequently, in the electron-emitting device manufactured according to Manufacturing Method Example 3, the amount of electron emission was larger compared with a case in which an organometallic compound containing only the predetermined metal (Pt) serving as a base metal was heated to 700° C. at 47° C./min and fired at 700° C. (refer to FIG. 22).

Furthermore, in the electron-emitting device manufactured according to Manufacturing Method Example 3, the amount of electron emission was larger than that according to Manufacturing Method Example 1 or 2.

Figure 25:
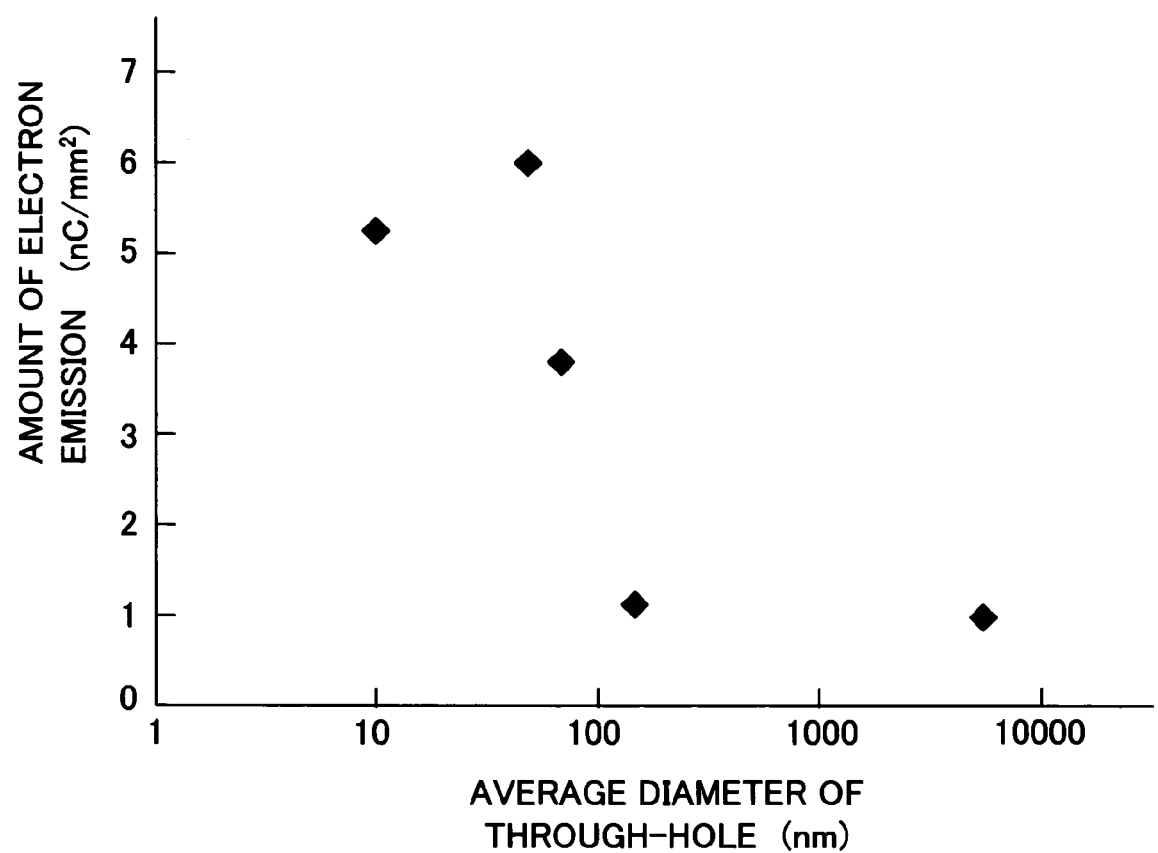
FIG. 25 is a graph showing a relationship between the average diameter of through-holes of an upper electrode and the amount of electron emission.

Any of the electron-emitting devices thus manufactured includes the upper electrode 14 having through-holes with an average diameter of 10 nm or more and less than 100 nm. Thereby, as shown in FIG. 25, the amount of electrons emitted from a single through-hole is significantly increased. Consequently, the electron-emitting device can emit more electrons with a less amount of power consumption.

Figure 49:
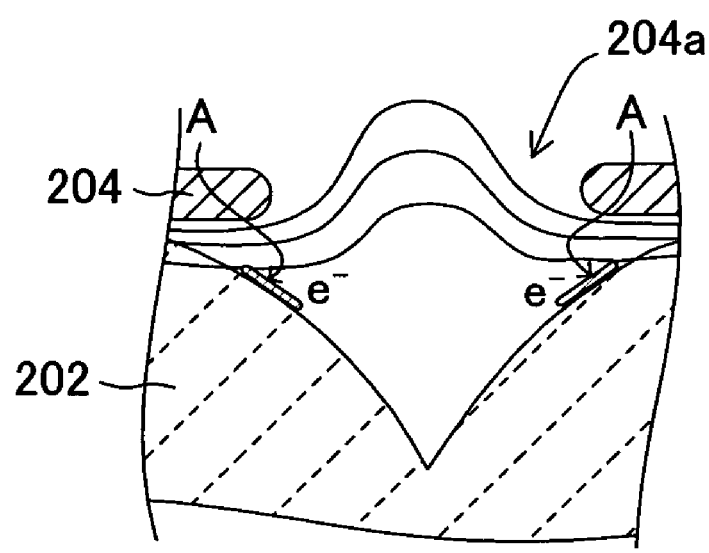
FIG. 49 is a diagram showing an electric field formed when electrons are accumulated in a conventional electron-emitting device.

The reason for such a phenomenon is believed to be as follows. First, as understood from equipotential lines shown in FIG. 49, if the average diameter of through-holes 204a is 100 nm or more, electrons are not easily accumulated in the vicinity of a region beneath the center of the through-hole 204a where the intensity of the electric field is weak, although electrons are easily supplied from the peripheral portion of the through-hole 204a. As a result, electrons are mainly accumulated beneath the peripheral portion of the through-hole 204a (region indicated by symbol A in FIG. 49).

In contrast, in any of the electron-emitting devices according to the embodiments of the present invention described above, since the diameter of a through-hole 14a of an upper electrode 14 is less than 100 nm, thus, as is understood from equipotential lines shown in FIG. 26, the equipotential lines do not easily bulge out of the through hole 14a. Consequently, as indicated by symbol B in FIG. 26, since the intensity of the electric field becomes stronger and uniform in a wider range on the upper surface of an emitter section 13 beneath the through-hole 14a, electrons can be accumulated in a wider range. As a result, the amount of electrons that can be emitted per unit area from one through-hole 14a can be increased.

Figure 27A:
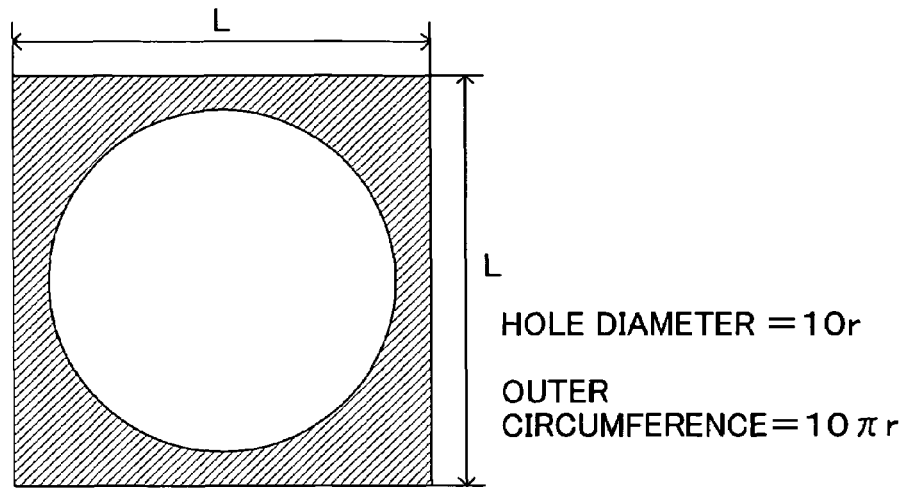
FIG. 27A is a diagram used for describing the length of a peripheral portion of a through-hole having a large diameter.
Figure 27B:
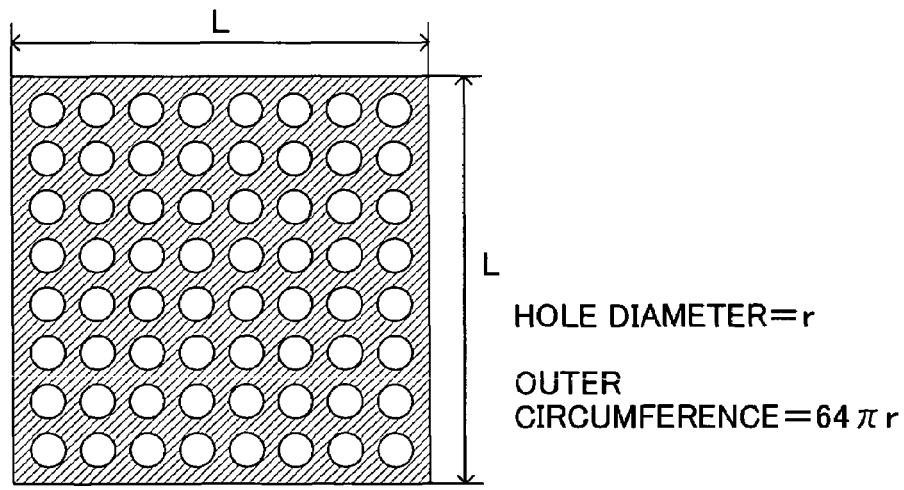
FIG. 27B is a diagram used for describing the length of peripheral portions of through-holes having a small diameter.

Furthermore, as described above, since electrons are tend to be accumulated beneath the peripheral portion of the through-hole, as the total of the lengths of the peripheral portions of the through holes (distance of circumferences) increases, more electrons are accumulated and emitted. For example, as shown in FIG. 27A, if the diameter of a through-hole is 10r, the length of the peripheral portion of the through hole per a certain area $L^2$ is $10\pi r$. In contrast, if the diameter of the through-hole is r, for example, as shown in FIG. 27B, 64 through-holes can be formed per the certain area $L^2$, and thus the total of the lengths of the peripheral portions is $64\pi r$.

As is also evident from the above, in the electron-emitting device 10 according to the embodiments of the present invention, since the diameter of the trough-hole 14a of the upper electrode 14 is extremely small at 10 nm or more and less than 100 nm, more through-holes can be formed per unit area on the upper surface of the electron-emitting device. Consequently, more electrons can be accumulated and emitted per unit area.

On the other hand, in the electron-emitting device 10 according to the embodiments of the present invention, the average diameter of the through-holes 14a of the upper electrode 14 is 10 nm or more. If the average diameter of the through-holes is less than 10 nm, there is a possibility that the amount of electrons emitted may be decreased for the assumed reasons described below.

That is, the region for accumulating electrons on the upper surface of the emitter section 13 becomes excessively small, resulting in a decrease in the amount of electrons accumulated. The electrons that collide with the upper electrode increase in the process of electron emission, and the percentage of electrons that are trapped by the upper electrode increases.

Consequently, in the electron-emitting device 10 including the upper electrode provided with through-holes having an average diameter of 10 nm or more and less than 100 nm, electrons can be emitted at high efficiency. Furthermore, in the electron-emitting device 10, since the through-holes 14a are fine, the electrons emitted do not spread. That is, the electron-emitting device 10 can emit electrons accurately in a direction orthogonal to the planes of the emitter section 13 and the upper electrodes 14.

Another method for manufacturing an upper electrode having such fine through-holes will be described below.

(A-4) Second Example of Manufacturing Method in which Three Organometallic Compounds are Used (Manufacturing Method Example 4)

Step 1: As in Manufacturing Method Example 3 in which firing is performed both in a single-phase state and in a mixed-phase state, an organometallic compound containing one predetermined metal serving as a base material (e.g., Pt with a melting point of 1,770° C.), an organometallic compound containing one metal having a lower melting point than that of the predetermined metal (Pt) (e.g., Au with a melting point of 1,064° C.), and an organometallic compound containing one metal having a higher melting point than that of the predetermined metal (Pt) (e.g., Ir with a melting point of 2,410° C.) are mixed at a predetermined metal weight ratio, followed by stirring. Here, Pt:Au:Ir=93:4.5:2.5 in terms of percent by weight. In this way, Pt and Ir are in a single-phase state and the single-phase components are present in a mixed-phase state with Au at the vicinity of the firing temperature (about 700° C. in this example).

Step 2: The organometallic compound (mixed organometallic compound) in the form of a paste obtained by mixing in Step 1 is allowed to extend on a material forming the emitter section 13 by screen printing such that the organometallic compound is in the shape of a film, and then drying is performed at 100° C.

Step 3: Using an infrared heating furnace, heating/temperature raising is performed to 700° C. at a temperature rise rate of 23° C./sec (i.e., 1,400° C./min), and this state is maintained for 30 minutes to fire (heat-treat) the organometallic compound.

Steps 2 and 3 correspond to the step of forming the upper electrode by allowing an organometallic compound containing two or more metals to extend on the upper side of a material forming the emitter section such that the organometallic compound is in the shape of a film, and subsequently raising the temperature to a predetermined temperature at a predetermined temperature rise rate (1,400° C./min) to fire the organometallic compound. As will be described below, the predetermined temperature rise rate is preferably higher than 10° C./min.

In an electron-emitting device manufactured according to Manufacturing Method Example 4, the amount of electron emission was extremely larger compared with the electron-emitting device manufactured according to "First example of manufacturing method in which firing is performed in single-phase and mixed-phase states (Manufacturing Method Example 3)". The reason for this is assumed to be that, as shown in FIG. 28 which is an actual enlarged photograph and FIG. 29 which is an enlarged photograph taken at a higher magnification than that of FIG. 28, a large amount of fine through-holes having a diameter of 10 to 100 nm is formed and the flatness of the upper electrode is improved to increase the distance d shown in FIG. 50. The reason for the formation of a large amount of fine through-holes is assumed to be that, since the temperature rise rate is high, the thermal decomposition of the organometallic compound rapidly occurs, and in this process, all the organic metals are transformed into metallic grains substantially simultaneously. As a result, the size of the metallic grains becomes small and uniform.

Figure 30:
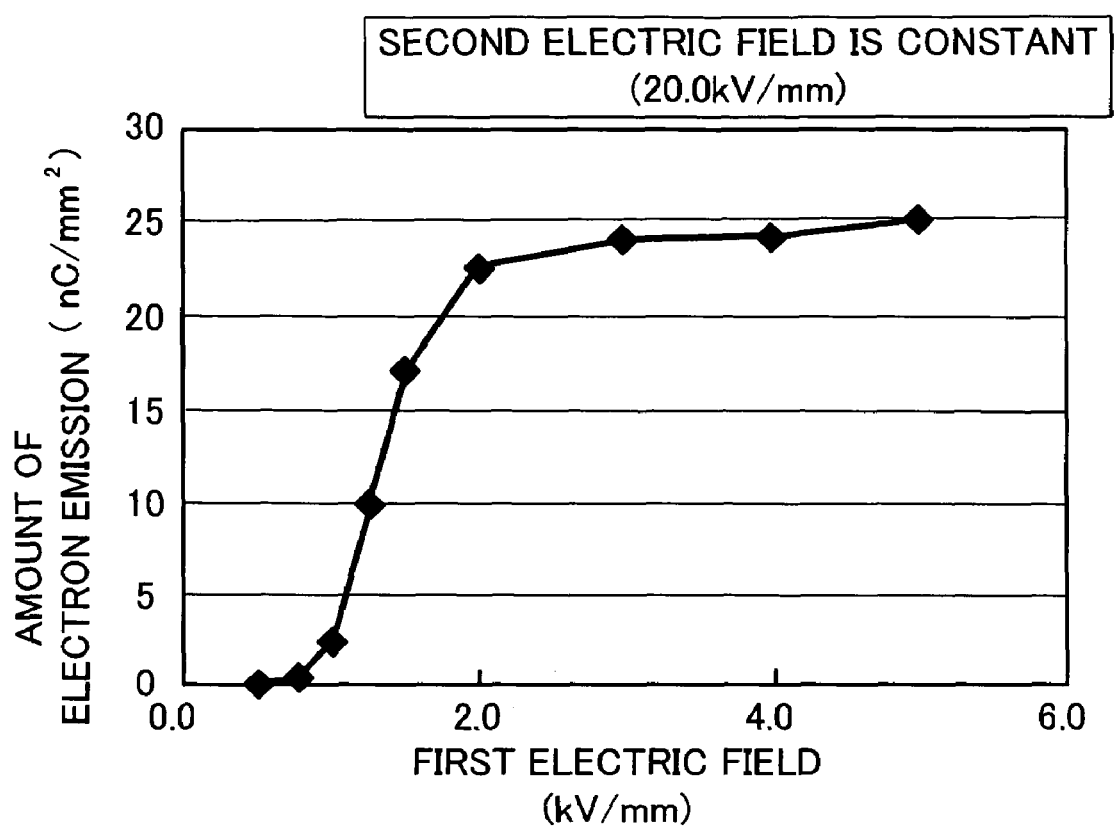
FIG. 30 is a graph showing electron emission characteristics of an electron-emitting device manufactured according to Manufacturing Method Example 4 of the present invention.
Figure 31:
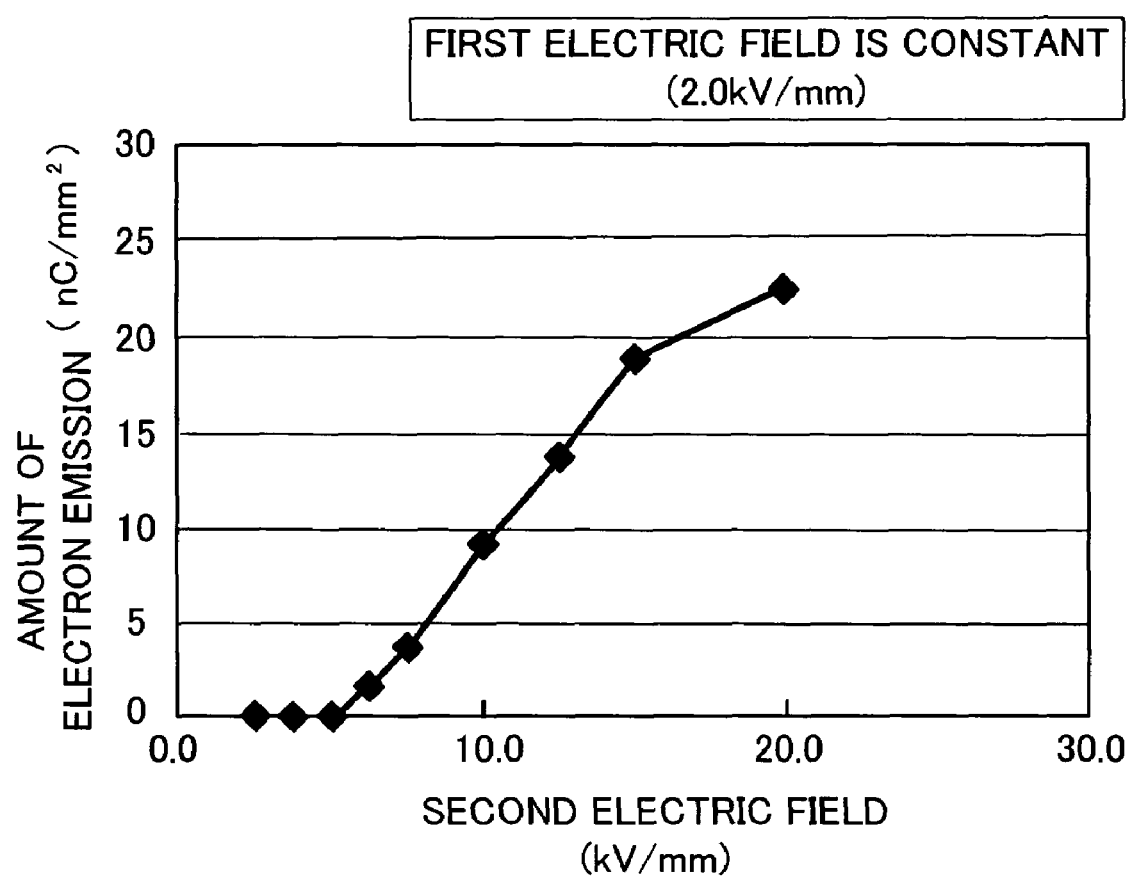
FIG. 31 is a graph showing electron emission characteristics of an electron-emitting device manufactured according to Manufacturing Method Example 4 of the present invention.

FIGS. 30 and 31 are graphs each showing electron emission characteristics of an electron-emitting device manufactured according to Manufacturing Method Example 4. In the graph of FIG. 30, the amount of electron emission is plotted relative to the predetermined negative voltage Vm (first voltage) described with reference to FIG. 13 when the predetermined positive voltage Vp (second voltage) described with reference to FIG. 13 is set to be constant. In FIG. 30, the predetermined negative voltage Vm is represented by the electric field obtained by dividing the predetermined negative voltage Vm by the thickness (film thickness) of the emitter section 13. On the other hand, in the graph of FIG. 31, the amount of electron emission is plotted relative to the predetermined positive voltage Vp (second voltage) when the predetermined negative voltage Vm (first voltage) is set to be constant. In FIG. 31, the predetermined positive voltage Vp is represented by the electric field obtained by dividing the predetermined positive voltage Vp by the thickness (film thickness) of the emitter section 13.

Figure 32:
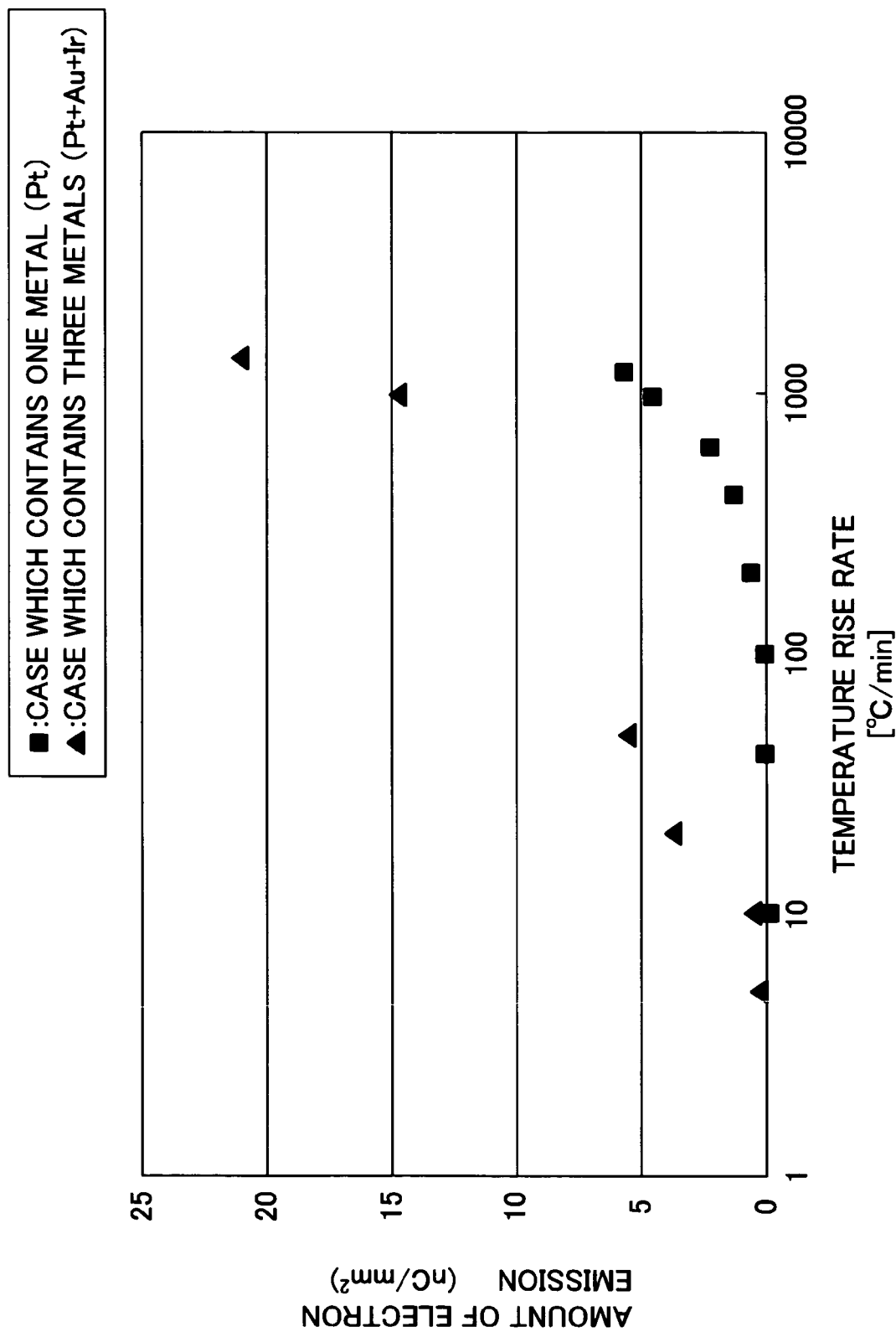
FIG. 32 is a graph showing a relationship between the temperature rise rate and the amount of electron emission of electron-emitting devices including upper electrodes manufactured at varied temperature rise rates.

FIG. 32 is a graph in which triangles plot the amount of electron emission measured of electron-emitting devices including upper electrodes manufactured at varied temperature rise rates in step 3 of Manufacturing Method Example 4. As is evident from FIG. 32, by increasing the temperature rise rate to more than 10° C./min, the amount of electron emission increases. It has been confirmed that this tendency applies not only to the case in which the upper electrode is formed using a mixture of organometallic compounds containing three metals (e.g., Pt, Au, and Ir) as in Manufacturing Method Example 4 but also to the case in which the upper electrode is formed using the "organometallic compound containing two metals" as in Manufacturing Method Example 1 or 2.

Figure 33:
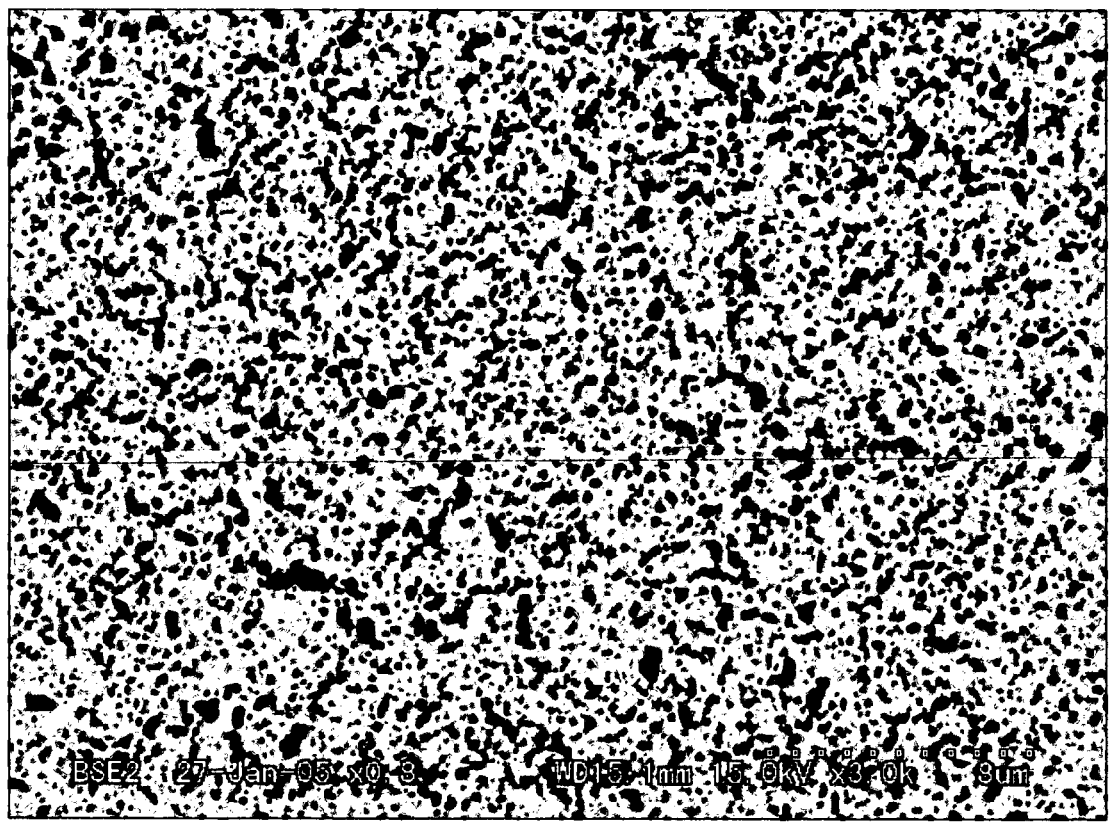
FIG. 33 is an enlarged photograph of a surface of an upper electrode of an electron-emitting device manufactured according to another manufacturing method example of the present invention.

FIG. 33 is an enlarged photograph of a surface of an upper electrode manufactured (fired) by a method in which Pt and Ir were mixed so as to satisfy Pt:Ir=97:3 in terms of percent by weight, followed by stirring, the resulting mixture was printed onto a material forming the emitter section 13 as in the manufacturing method described above, drying was performed at 100° C., the temperature was raised to 700° C. at a temperature rise rate of 1,400° C./min, and this state was maintained for 30 minutes. As is also understood from FIG. 33, by using the "organometallic compound containing two or more metals" and by increasing the temperature rise rate, a large amount of extremely fine through-holes is formed compared with the case in which the temperature rise rate is low.

(B: Case in which Only Organometallic Compound Containing One Metal is Used)

The upper electrode 14 can also be formed by firing only an organometallic compound containing one metal, such as silver (Ag), gold (Au), iridium (Ir), rhodium (Rh), ruthenium (Ru), platinum (Pt), palladium (Pd), aluminum (Al), copper (Cu), nickel (Ni), chromium (Cr), molybdenum (Mo), tungsten (W), or titanium (Ti). With respect to metals other than noble metals, preferably, reduction is performed before firing.

Figure 51:
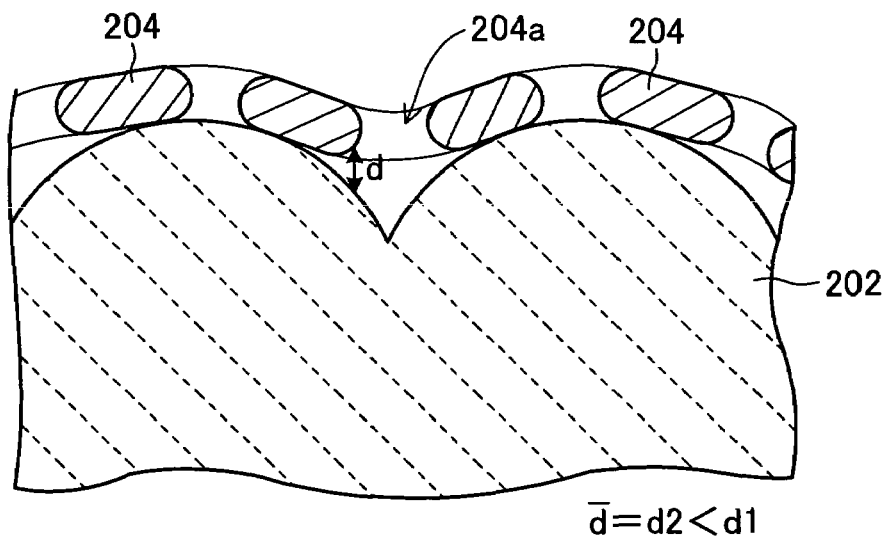
FIG. 51 is an enlarged partial cross-sectional view of an upper electrode having unsatisfactory flatness.

However, in such a case, if heating/firing is performed at a relatively low temperature rise rate using an ordinary electric furnace, as shown in FIG. 22, it is not possible to form through-holes with a fine diameter. If firing is performed at a decreased temperature (e.g., 600° C.) to suppress grain growth of Pt, the average diameter of the through-holes can be decreased. However, the flatness of the upper electrode degrades, resulting in such a structure as that shown in FIG. 51. Consequently, the amount of electron emission decreases. Therefore, in the present invention, using an infrared heating furnace, heating/firing is performed at an extremely high temperature rise rate. Thereby, it is possible to easily form an upper electrode 14 having satisfactory flatness and provided with many through-holes having an extremely fine average diameter (10 nm or more and less than 100 nm). A specific example of the manufacturing method will be described below.

(B-1) Example of Manufacturing Method in which Organometallic Compound Containing One Metal is Used (Manufacturing Method Example 5)

Step 1: An organometallic compound containing one predetermined metal (Pt in this example) in the form of a paste is allowed to extend on a material forming the emitter section 13 by screen printing such that the organometallic compound is in the shape of a film, and then drying is performed at 100° C.

Step 2: Using an infrared heating furnace, heating/temperature raising is performed to 600° C. at a temperature rise rate of 20° C./sec (i.e., 1,200° C./min), and this state is maintained for 30 minutes to fire (heat-treat) the organometallic compound.

Steps 1 and 2 correspond to the step of forming the upper electrode by allowing an organometallic compound containing one metal to extend on the upper side of a material forming the emitter section such that the organometallic compound is in the shape of a film, and subsequently raising the temperature to a predetermined temperature at a predetermined temperature rise rate (1,200° C./min in this example) to fire the organometallic compound. As will be described below, the predetermined temperature rise rate is preferably higher than 100° C./min.

Figure 34:
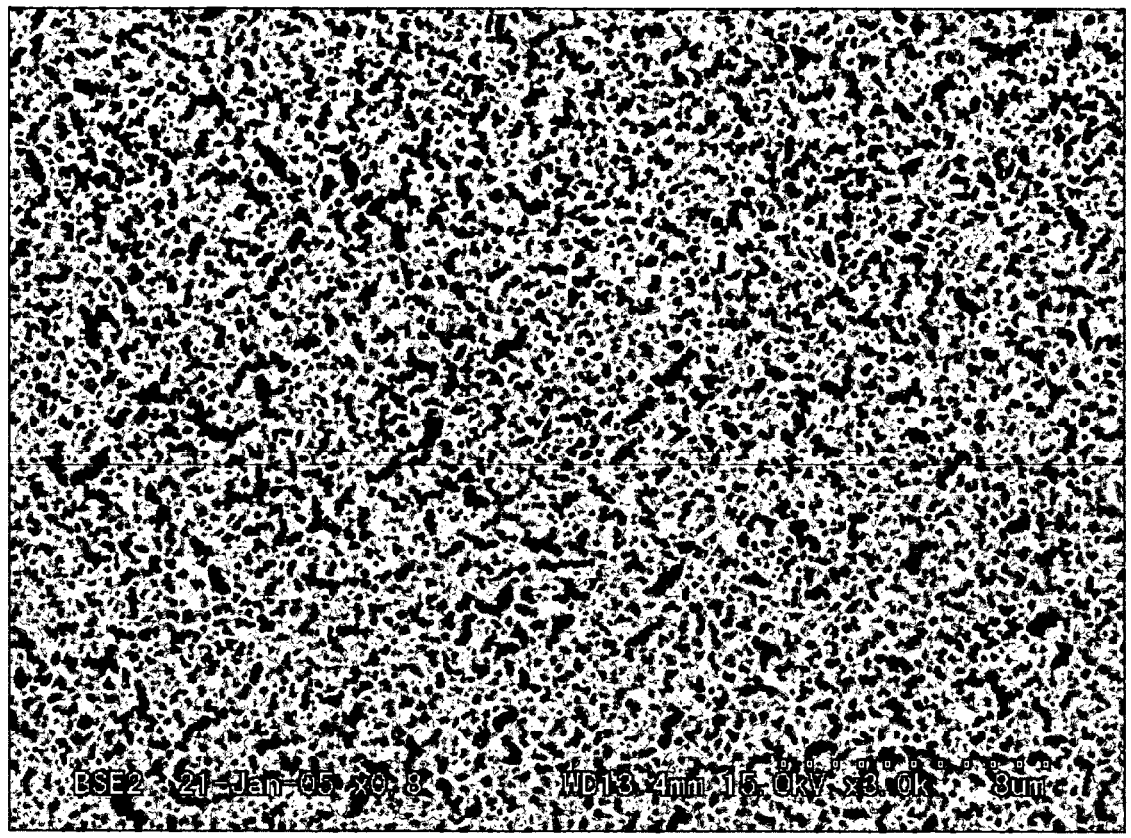
FIG. 34 is an enlarged photograph of a surface of an upper electrode of an electron-emitting device manufactured according to Manufacturing Method Example 5 of the present invention.

FIG. 34 is an enlarged photograph of a surface of an upper electrode formed according Manufacturing Method Example 5. As understood from comparison between FIGS. 34 and 22, when an organometallic compound containing Pt only is used, by significantly increasing the temperature rise rate from 47° C./min to 20° C./sec, through-holes with an extremely small average diameter are easily formed.

Figure 50:
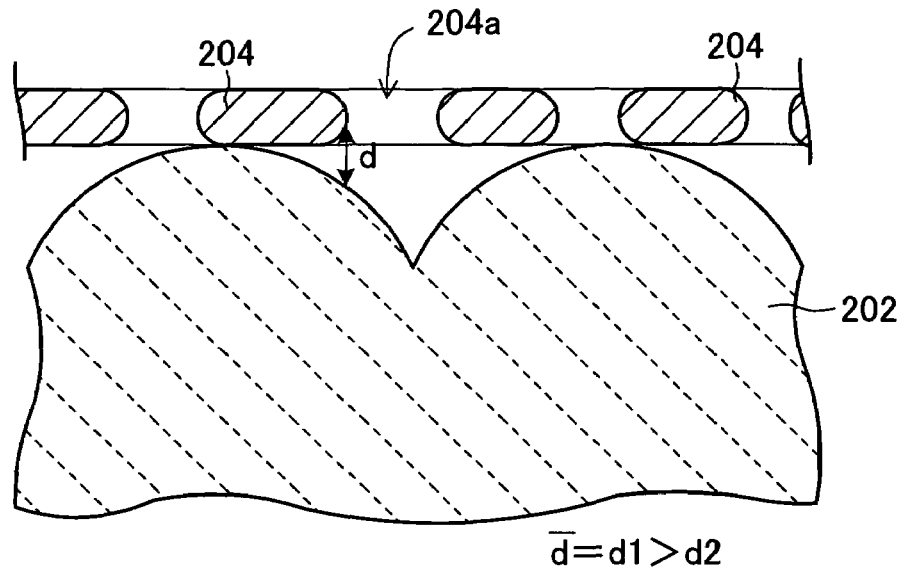
FIG. 50 is an enlarged partial cross-sectional view of an upper electrode having satisfactory flatness.

In Manufacturing Method Example 5, it is also possible to manufacture an electron-emitting device which emits a large amount of electrons because many fine though-holes with a diameter of 10 to 100 nm are formed and the flatness of the upper electrode is improved to increase the distance d shown in FIG. 50, and for other reasons. The reason for the formation of a large amount of fine through-holes is assumed to be that, as described above, since the temperature rise rate is high, the thermal decomposition of the organometallic compound rapidly occurs, and in this process, all the organic metals are transformed into metallic grains substantially simultaneously. As a result, the diameter of metal grains becomes small and uniform.

Furthermore, in FIG. 32, squares plot the amount of electron emission measured of electron-emitting devices including upper electrodes manufactured at varied temperature rise rates in step 2 of Manufacturing Method Example 5. As is evident from FIG. 32, when an organometallic compound containing only one metal (Pt in this example) is used, by increasing the temperature rise rate to more than 100° C./min, the amount of electron emission increases. Consequently, when an upper electrode is formed using an organometallic compound containing only one metal, the temperature rise rate should be set at 100° C./min or more.

<Thermal Decomposition of Organometallic Compound>

Figure 35:
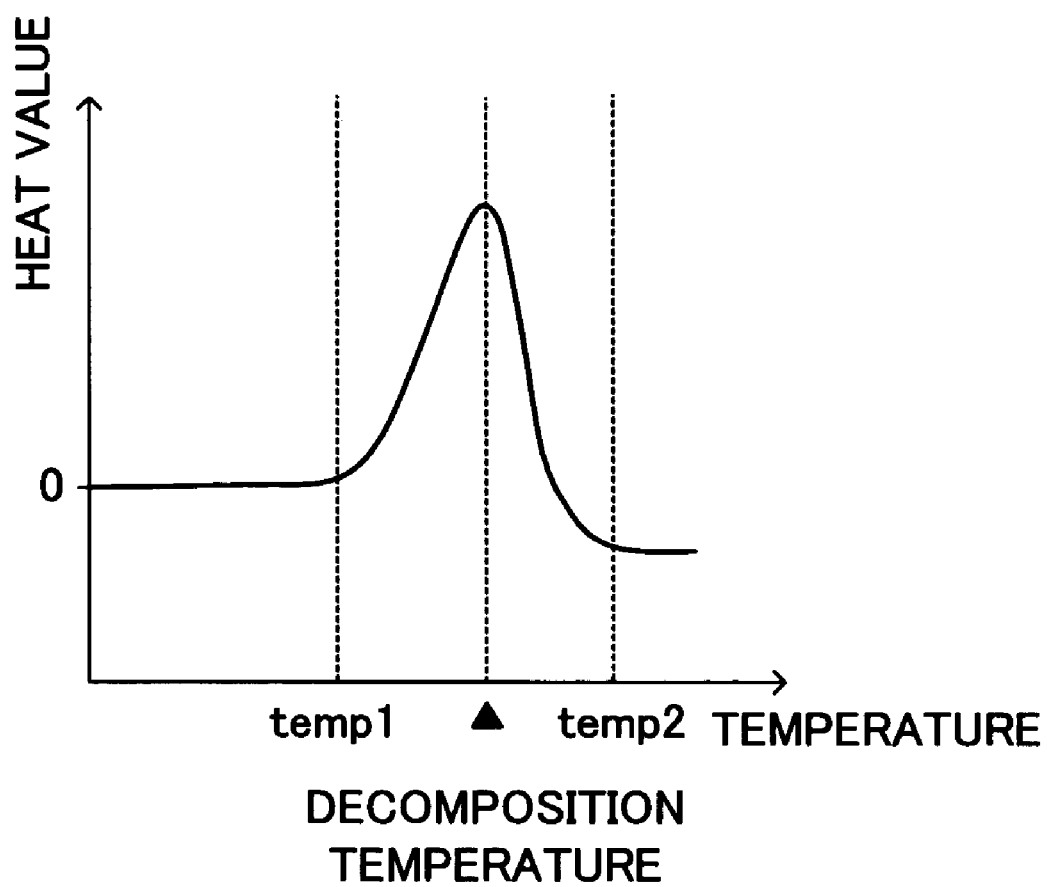
FIG. 35 is a graph showing the relationship between the heat value when an organometallic compound is heated and the temperature of the organometallic compound.

During heating of the organometallic compound in the step of forming (heat-treating, firing) the upper electrode, the organometallic compound is thermally decomposed. In the thermal decomposition, the organic component is burnt out and the metal component finally remains. When the organic component is burnt out, heat is generated. FIG. 35 is a graph showing the results of measurement of the relationship between such a heat value generated and the temperature of the organometallic compound.

As is evident from FIG. 35, the heat value generated has a certain width and a peak. The temperature at the peak is defined as a decomposition temperature. Depending on the types of the organometallic compound, two or more peaks may appear (i.e., there may be two or more decomposition temperatures). The decomposition process (thermal decomposition process) refers to a process in which heat generation occurs in a temperature range from the peak start temperature temp1 to the peak end temperature temp2.

The temperature-raising step in each of Manufacturing Method Example 4 and Manufacturing Method Example 5 includes at least the decomposition process. In other words, in the temperature-raising step, the temperature of the organometallic compound passes through the temperature range of the decomposition process. If there are two or more peaks, during the temperature-raising step in each of Manufacturing Method Example 4 and Manufacturing Method Example 5, the temperature of the organometallic compound passes through the temperature range from the maximum peak start temperature temp1 to the maximum peak end temperature temp2. Additionally, a peak may appear for the reason other than the thermal decomposition of the organometallic compound although it is an extremely small value.

<Structure of Upper Electrode>

Figure 36:
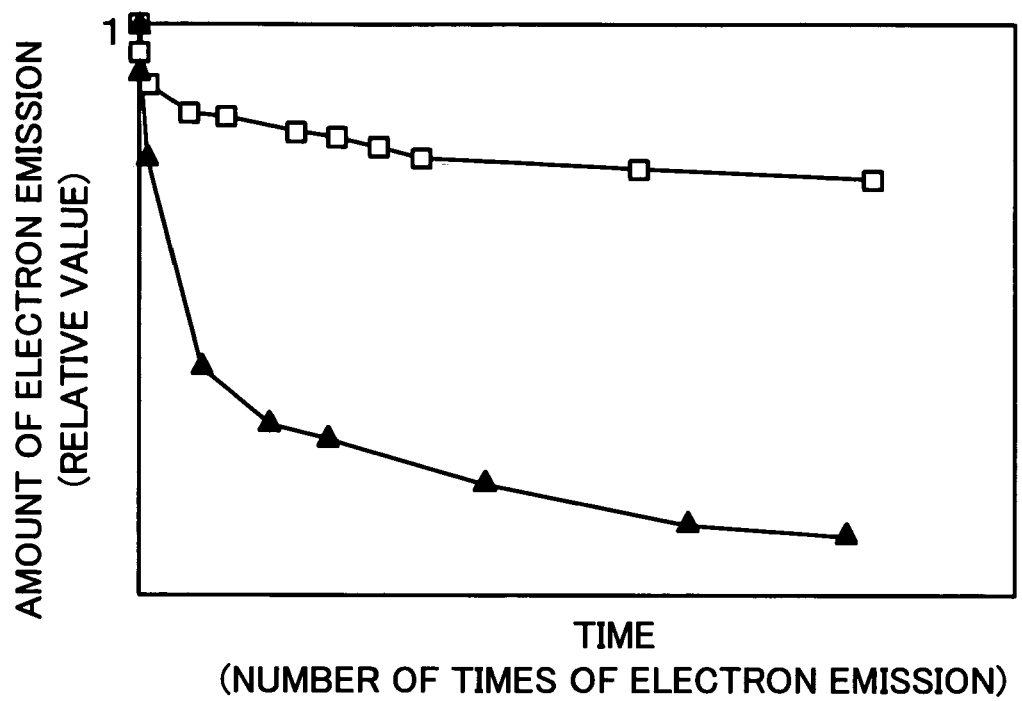
FIG. 36 is a graph showing changes in the amount of electron emission depending on the number of times of electron emission with respect to an electron-emitting device including an upper electrode fired at a low temperature rise rate and an electron-emitting device including an upper electrode fired at a high temperature rise rate.

With respect to the electron-emitting device provided with the upper electrode shown in FIG. 24 (Pt:Au:Ir=93:4.5:2.5, temperature rise rate: 47° C./min, maintained at 700° C. for 30 minutes) and the electron-emitting device provided with the upper electrode shown in FIG. 33 (Pt:Ir=97:3, temperature rise rate: 1,400° C./min, maintained at 700° C. for 30 minutes), the changes in the amount of electron emission depending on the number of times of electron emission were examined. FIG. 36 is a graph showing the results thereof. In FIG. 36, the amount of electron emission is represented by the relative value. Triangles plot the characteristics of the electron-emitting device provided with the upper electrode shown in FIG. 24, and squares plot the characteristics of the electron-emitting device provided with the upper electrode shown in FIG. 33.

In this comparison, the upper electrode shown in FIG. 24 is a typical upper electrode which uses an organometallic compound containing two or more metals and is fired at a relatively low temperature rise rate. Hereinafter, such an upper electrode is referred to as an "upper electrode fired at low temperature rise rate". Examples of the upper electrode fired at low temperature rise rate include the upper electrodes shown in FIGS. 21, 22, and 23. On the other hand, the upper electrode shown in FIG. 33 is a typical upper electrode which uses an organometallic compound containing two or more metals and is fired at an extremely high temperature rise rate. Hereinafter, such an upper electrode is referred to as an "upper electrode fired at high temperature rise rate". Examples of the upper electrode fired at high temperature rise rate include the upper electrodes shown in FIGS. 28 and 33, and also include the upper electrode, which uses an organometallic compound containing one metal, shown in FIG. 34.

As is evident from FIG. 36, when electrons are emitted repeatedly, in the upper electrode shown in FIG. 33 (i.e., upper electrode fired at high temperature rise rate), the decrease in the amount of electron emission is smaller and higher durability is exhibited compared with the upper electrode shown in FIG. 24 (i.e. upper electrode fired at low temperature rise rate). The reason for this is believed to be as follows.

Figure 37:
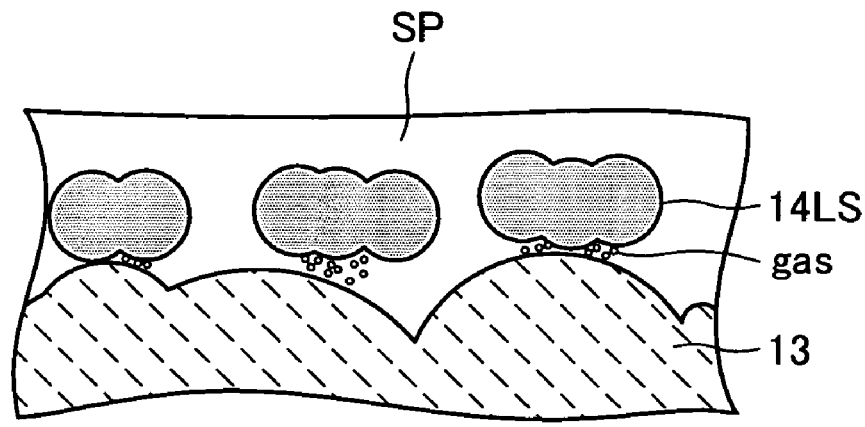
FIG. 37 is a partial cross-sectional view of an upper electrode and its vicinity, the upper electrode being fired at a low temperature rise rate.

As shown in FIG. 37 which is a partial cross-sectional view of "an upper electrode fired at low temperature rise rate 14LS", the upper electrode 14LS is formed by bonding of metallic grains having a relatively large grain size. Consequently, in one aggregated portion resulting from bonding of grains, it is difficult to form pores that communicate a space between an emitter section 13 and the upper electrode 14LS with an upper space SP (the enclosed space described above) above the upper electrode 14LS.

As a result, when the electron-emitting device is manufactured, even if the pressure of the upper space SP is decreased so that the upper space SP becomes close to a vacuum, gas molecules (e.g., $H_2O$, $N_2$, $O_2$, $CO_2$, and carbon hydride) denoted by "gas" do not easily reach the upper space SP, although they move over the lower surface of the upper electrode 14LS and the upper surface of the emitter section 13.

Consequently, the gas molecules gas remain in the space between the emitter section 13 and the upper electrode 14LS. Such gas molecules gas are ionized and gradually adsorb to the upper electrode 14LS during the electron emission operation (accumulation and emission of electrons). The adsorbed ions inhibit the supply of electrons from the upper electrode 14LS to the emitter section 13 and also inhibit the emission of electrons through the through-holes of the upper electrode 14LS. As a result, in the electron-emitting device provided with the upper electrode fired at low temperature rise rate, the amount of electron emission is believed to decrease at the relatively early stage.

Figure 38:
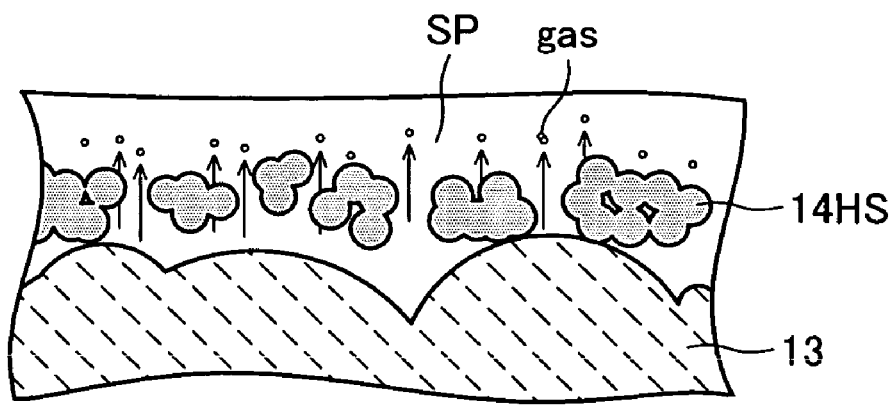
FIG. 38 is a partial cross-sectional view of an upper electrode and its vicinity, the upper electrode being fired at a high temperature rise rate.

In contrast, as shown in FIG. 38 which is a partial cross-sectional view of an upper electrode fired at high temperature rise rate 14HS, the upper electrode 14HS is formed by bonding of metallic grains having a smaller grain size than the metallic grains constituting the upper electrodes fired at low temperature rise rate 14LS. Consequently, in one aggregated portion resulting from bonding of grains, many pores are formed, the pores communicating a space between an emitter section 13 and the upper electrode 14HS with an upper space SP above the upper electrode 14HS.

That is, the upper electrode 14HS is an electrode having a three-dimensional network structure formed by bonding of grains (e.g., spherical metallic grains). In other words, the upper electrode 14HS is a porous body formed by chemical bonding of two or more metallic grains in the thickness direction. Furthermore, the upper electrode 14HS can be referred to as an electrode which is a bulky electrode formed by bonding of metallic grains in an integrated manner and which is provided with pores (open pores that are different from through-holes for electron emission) passing trough the electrode in the thickness direction (in a direction orthogonal to the plane of the upper electrode, i.e., in the Z-axis direction).

Consequently, when the electron-emitting device is manufactured, if the pressure of the upper space SP is decreased so that the upper space SP becomes close to a vacuum, gas molecules gas between the emitter section 13 and the upper electrode 14HS easily move to the upper space SP through pores formed in the upper electrode 14HS. As a result, the number of gas molecules gas remaining in the space between the emitter section 13 and the upper electrode 14HS decreases. Therefore, even if the number times of electron emission is increased, such gas molecules gas do not inhibit the supply of electrons from the upper electrode 14HS to the emitter section 13 and also do not inhibit the emission of electrons through the through-holes of the upper electrode 14HS. This is believed to be the reason for the fact that if an upper electrode fired at high temperature rise rate is provided for an electron-emitting device, the amount of electron emission does not easily decrease even after repeated emission of electrons.

<Average Aperture Ratio of Upper Electrode>

With respect to the various upper electrodes (upper electrodes allowing a large amount of electron emission) provided for the electron-emitting devices according to the present invention, the average aperture ratio (porosity) was measured. The average aperture rate is defined by a rate of the area of the pores communicating the upper surface with the lower surface of the upper electrode 14 (not only the through-holes 14$a$ that directly expose the emitter section 13 to the upper space but also holes communicating the upper surface of the emitter section 13 with the upper surface of the upper electrode 14) to the area of the upper electrode 14.

As a result of measurement, the average aperture ratio of the upper electrodes was 5% to 60%. In such a case, the average aperture ratio is more preferably 10% to 60%, and still more preferably 20% to 60%. If the average aperture ratio is less than 5%, the area of through-holes 14$a$ for emitting electrons decreases excessively and the amount of electron emission decreases to an extent that is insufficient for the electron-emitting device. If the average aperture ratio exceeds 60%, the conducting portion functioning as the electrode decreases, and it becomes difficult to cause polarization reversal in the emitter section 13. As a result, the amount of electron emission decreases to an extent that is insufficient for the electron-emitting device, and the strength of the upper electrode 14 decreases (i.e., the upper electrode becomes fragile).

<Infrared Heating Furnace>

The infrared heating furnace used in the method for forming the upper electrode described above will be briefly described below. Usually, when an upper electrode is formed by firing an organometallic compound, an electric furnace is used. In the electric furnace, air is heated by a heater, and a specimen is heated with the heat of the air. Consequently, the temperature rise rate by the electric heater is about 50° C./min at a maximum.

Figure 39B:
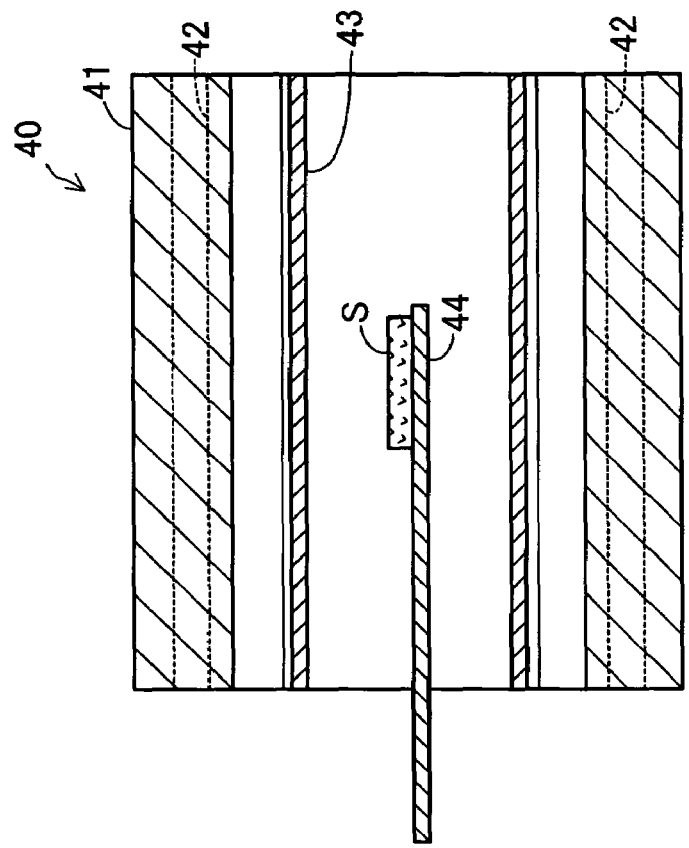
FIGS. 39A and 39B are a front view and a cross-sectional view, respectively, of an infrared heating furnace.
Figure 39A:
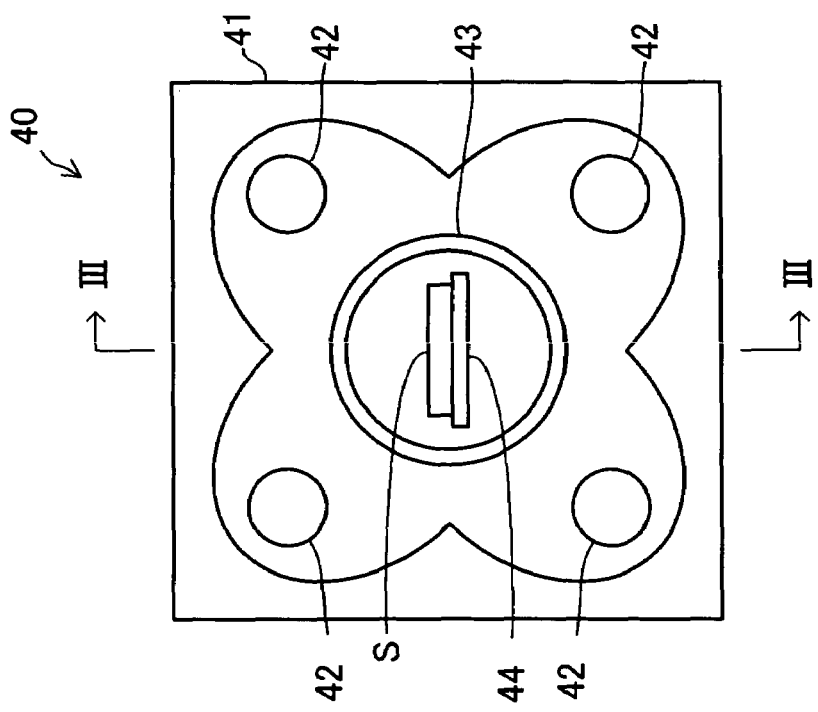

In contrast, for example, as shown in FIG. 39A which is a front view of an infrared heating furnace 40 and FIG. 39B which is a cross-sectional view taken along the line III-III of FIG. 39A, the infrared heating furnace 40 includes a body 41 provided with a heat reflector plate on the inside thereof, infrared lamps 42 placed at four corners, and a hollow cylindrical quartz tube 43 placed in the center. A specimen S to be heated is fixed on a table 44 and placed together with the table 44 in the center of the body 41.

The infrared heating furnace 40 directly heats the specimen S by radiation heat from the infrared lamps 42. Consequently, the temperature rise rate by the infrared heating furnace 40 is about 6,000° C./min at a maximum. The infrared heating furnace 40 has a characteristic in that it is difficult to raise the temperature of an object that easily transmits infrared light. Therefore, when glass or the like is used as a substrate of an electron-emitting device, the infrared heating furnace 40 can fire electrodes, etc., while suppressing the increase in the substrate temperature, which is advantageous. Since the infrared heating furnace 40 can heat the specimen S at an extremely high temperature rise rate as described above, the infrared heating furnace 40 is suitable for use in the method for forming the upper electrode, such as Manufacturing Method Example 4 or 5.

Examples of the process for heating the specimen S at a high temperature rise rate include, in addition to infrared heating, an electromagnetic irradiation process using microwaves or millimeter waves, a plasma process using discharge plasma or thermal plasma, a laser irradiation process, and an induction heating process, or the like. Any of these processes can be used in Manufacturing Method Examples 4 and 5.

Figure 40:
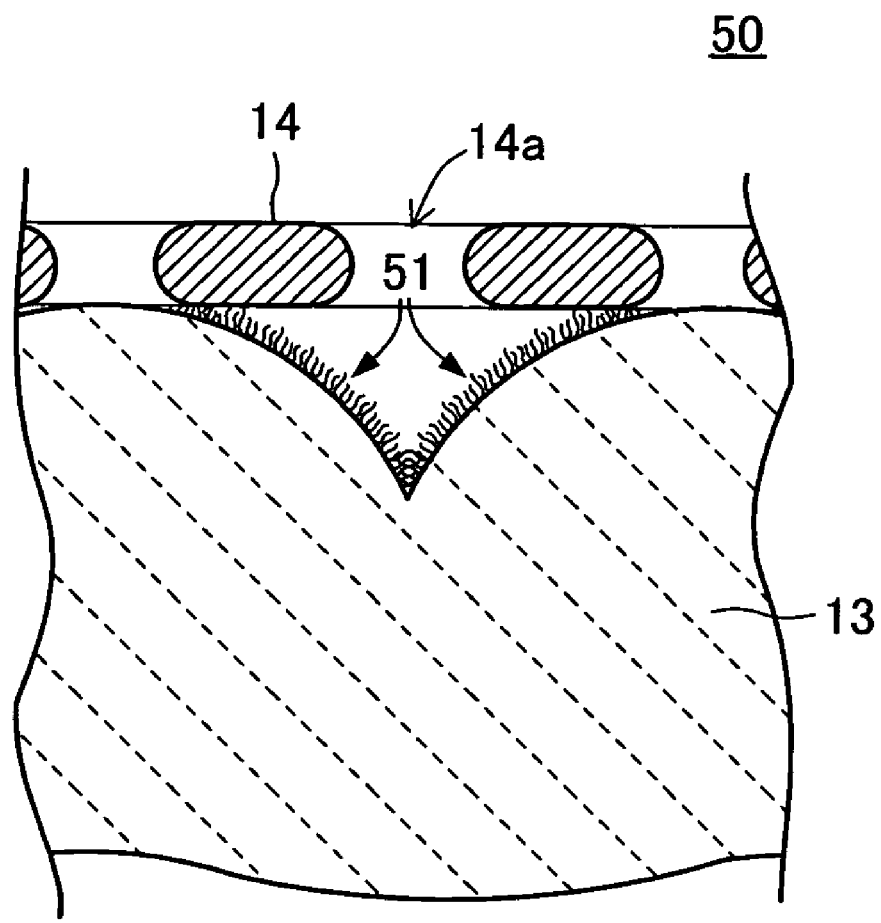
FIG. 40 is an enlarged partial cross-sectional view of an electron-emitting device according to another embodiment of the present invention.

An electron-emitting device 50 according to another embodiment of the present invention will be described below with reference to FIG. 40. The electron-emitting device 50 has the same structure of that of the electron-emitting device 10. The electron-emitting device 50 further includes an electron emission-enhancing layer 51 for increasing the amount of electrons to be emitted, the electron emission-enhancing layer 51 being disposed on the upper surface of an emitter section 13 in a region separated at a predetermined distance from an upper electrode 14 and/or on the upper surface of the emitter section 13 in a region exposed to outside through a through-hole 14$a$.

For example, the electron emission-enhancing layer 51 may be composed of a compound containing silicon (Si) and is a fibrous (filamentous) layer. The electron emission-enhancing layer 51 may be any one of an insulator, a semiconductor, and a conductor, each having the advantages described below.

(Advantages in the Case in which the Electron Emission-enhancing Layer is Composed of an Insulator)

When electrons are emitted due to the polarization reversal in the emitter section 13, some electrons on the surface of the emitter section 13 move along an upper portion of the emitter section 13 (a portion of the emitter section 13 in which surface resistance occurs) and are recaptured (recovered) by the upper electrode 14 at a portion in which the emitter section 13 and the upper electrode 14 are in contact with each other. If the electron emission-enhancing layer 51 is an insulator, the resistivity (surface resistivity) increases in a direction along the upper surface in the vicinity of the upper surface of the emitter section 13, and therefore, the percentage of the electrons recovered by the upper electrode 14 is decreased. As a result, the amount of electron emission increases.

Furthermore, if the electron emission-enhancing layer 51 is an insulator and is fibrous, the surface area of the upper surface of the emitter section 13 increases. As a result, the amount of electrons that can be accumulated increases and the amount of electron emission increases.

(Advantages in the Case in which the Electron Emission-enhancing Layer is Composed of a Semiconductor or a Conductor)

The affinity between the electron emission-enhancing layer 51 composed of a semiconductor or a conductor and the electrons accumulated in the emitter section 13 is smaller than the affinity between the emitter section 13 in the absence of the electron emission-enhancing layer 51 composed of a semiconductor or a conductor and the electrons accumulated in the emitter section 13. Consequently, when electrons are emitted due to the polarization reversal of the emitter section 13, the energy given to the electrons increases. As a result, the percentage of electrons that are recovered by the upper electrode 14 decreases when the electrons pass through the through-holes 14, and thus the amount of electron emission increases.

Furthermore, if the electron emission-enhancing layer 51 is composed of a semiconductor or a conductor and is fibrous, the electric field is concentrated at the electron emission-enhancing layer (in particular, at the fiber tips). Consequently, among the electrons accumulated on the upper side of the emitter section 13, the percentage of electrons emitted due to the polarization reversal increases. As a result, the amount of electron emission increases. In such a case, if the electron emission-enhancing layer 51 is composed of a conductor having a low work function or a semiconductor having a low electron affinity, the amount of electron emission can be effectively increased.

It is also advantageous to form the electron emission-enhancing layer 51 on the surface of the upper electrode 14 in order to increase the amount of electron emission. In such a case, if the electron emission-enhancing layer 51 is an insulator, it is possible to inhibit ionic substances remaining in the enclosed space from attacking the upper electrode 14. As a result, the durability of the upper electrode 51 can be improved.

Furthermore, if the electron emission-enhancing layer 51 is composed of a conductor having a lower work function than the member constituting the upper electrode 14 or a semiconductor having a lower affinity with electrons (electron affinity) than the member constituting the upper electrode 14, the amount of electrons supplied from the upper electrode 14 to the emitter section 13 during the accumulation of electrons onto the emitter section 13 can be increased. As a result, electrons accumulated on the upper portion of the emitter section 13 increase and thus, the amount of electron emission increases. If the electron emission-enhancing layer 51 is a fibrous semiconductor or conductor, the intensity of electric field concentration at the tips of fiber enhances during the accumulation of electron onto the emitter section 13. As a result, electrons accumulated on the upper portion of the emitter section 13 increase and thus, the amount of electron emission increases. In such a case, preferably, the conductor has a low work function, and the semiconductor has a low electron affinity.

Even in the electron-emitting device including the electron emission-enhancing layer 51, the average diameter of the through-holes 14a of the upper electrode 14 is preferably 10 nm or more and less than 100 nm. Such an electron emission-enhancing layer 51 can be formed by increasing the temperature rise rate (setting the temperature rise rate such that the decomposition process of the organometallic compound occurs in the temperature-raising step) using an infrared heating furnace as in Manufacturing Method Example 4 or 5.

Table 1 below shows the results of measurement with respect to the difference in the amount of electron emission between the presence and absence of an electron emission-enhancing layer 51. As is evident from the results, it is possible to obtain an extremely large amount of electron emission by providing the electron emission-enhancing layer 51.

TABLE 1

| Electron emission-enhancing layer | |
|---|---|
| Absent | Present |
| 1.9 nC/mm$^2$ | 7.5 nC/mm$^2$ |

Change in amount of electron emission depending on presence and absense of electron emission-enhancing layer (Electrode containing two metals: Pt + Ir)

(Specific Example of Drive Voltage Applying Circuit)

A specific structure and operation of the drive voltage applying circuit 21 described above will be described below.

Figure 41:
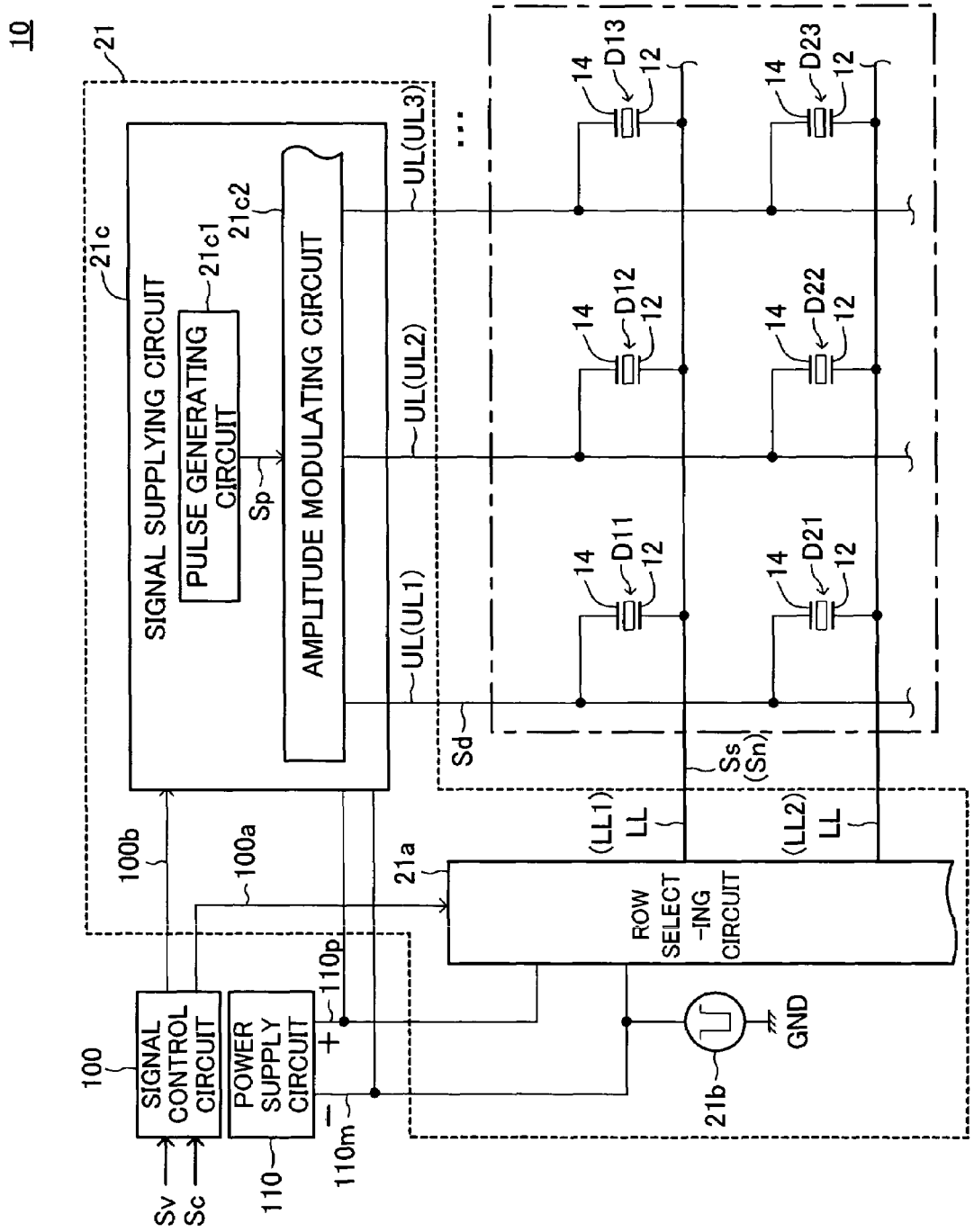
FIG. 41 is a circuit diagram of a drive voltage applying circuit shown in FIG. 1.

As shown in FIG. 41, the drive voltage applying circuit 21 includes a row selecting circuit 21a, a pulse source 21b, and a signal supplying circuit 21c. In FIG. 41, the individual elements (electron-emitting elements each having a structure in which the upper electrode 14 and the lower electrode 12 are superposed on each other) are represented by reference numerals D11, D12, . . . D22, D23, etc. An electron-emitting device 10 in this example includes n number of elements arrayed in the row direction and m number of elements arrayed in the column direction.

The row selecting circuit 21a is connected to a control signal line 100a of a signal control circuit 100, and a positive terminal line 110p and a negative terminal line 110m of a power supply circuit 110. The row selecting circuit 21a is further connected to a plurality of row selecting lines LL. Each of the row selecting lines LL is connected to lower electrodes 12 of a group of a plurality of elements (elements on the same row). For example, the row selecting line LL1 is connected to the lower electrodes 12 of the elements D11, D12, D13, . . . D1m in the first row, and the row selecting line LL2 is connected to the lower electrodes 12 of the elements D21, D22, D23, . . . D2m in the second row.

During the charge accumulation period Td for accumulating electrons on the emitter sections 13 of the individual elements, the row selecting circuit 21a outputs a selection signal Ss (a voltage signal of 50 V, in this example) to one of the row selecting lines LL for a predetermined period (row selection period) Ts in response to a control signal from the signal control circuit 100, and outputs a non-selection signal Sn (a voltage signal of 0 V in this example) to the remaining row selecting lines LL. The row selecting circuit 21*a* sequentially changes the row selecting line LL to which the selection signal Ss is output every predetermined row selection period Ts.

The pulse source 21*b* generates a reference voltage (0 V in this example) during the charge accumulation period Td and generates a predetermined constant voltage (−400 V in this example) during the light emission period (lighting period, electron emission period) Th. The pulse source 21*b* is connected between the negative terminal line 110*m* and a ground (GND).

The signal supplying circuit 21*c* is connected to a control signal line 100*b* of the signal control circuit 100, and the positive terminal line 110*p* and the negative terminal line 110*m* of the power supply circuit 110. The signal supplying circuit 21*c* includes a pulse generating circuit 21*c*1 and an amplitude modulating circuit 21*c*2.

The pulse generating circuit 21*c*1 outputs a pulse signal Sp having a constant pulse period and a constant amplitude (50 V, in this example) during the charge accumulation period Td, and outputs a reference voltage (0 V, in this example) during the light emission period Th.

The amplitude modulating circuit 21*c*2 is connected to the pulse generating circuit 21*c*1 so that the pulse signal Sp is input from the pulse generating circuit 21*c*1. The amplitude modulating circuit 21*c*2 is also connected to a plurality of pixel signal lines UL. Each of the pixel signal lines UL is connected to upper electrodes 14 of a group of a plurality of elements (elements on the same column). For example, the pixel signal line UL1 is connected to the upper electrodes 14 of the elements D11, D21, . . . Dn1 in the first column, the pixel signal line UL2 is connected to the upper electrodes 14 of the elements D12, D22, . . . Dn2 in the second column, and the pixel signal line UL3 is connected to the upper electrodes 14 of the elements D13, D23, . . . Dn3.

During the charge accumulation period Td, the amplitude modulating circuit 21*c*2 modulates the amplitude of the pulse signal Sp according to the luminance levels of the pixels of the selected row, and outputs the signal of which amplitude is modulated (any one of 0 V, 30 V, and 50 V, in this example) as a pixel signal Sd to a plurality of pixel signal lines UL (UL1, UL2, . . . ULm). Furthermore, during the light emission period Th, the amplitude modulating circuit 21*c*2 outputs the reference voltage (0 V) from the pulse generating circuit 21*c*1 as it is.

A video signal Sv and a synchronizing signal Sc are input to the signal control circuit 100, and based on these input signals, the signal control circuit 100 outputs a signal for controlling the row selecting circuit 21*a* and a signal for controlling the signal supplying circuit 21*c* respectively to the signal line 100*a* and the signal line 100*b*.

The power supply circuit 110 outputs voltage signals for setting the potential of the positive terminal line 110*p* to be higher than the potential of the negative terminal line 110*m* by a predetermined voltage (50 V in this example) to the positive terminal line 110*p* and the negative terminal line 110*m*.

The operation of the circuit thus configured will be described below. First, at a start of the charge accumulation period Td, the row selecting circuit 21*a* outputs a selection signal Ss (50 V) to the row selecting line LL1 in the first row in response to a control signal from the signal control circuit 100 and outputs a non-selection signal Sn (0 V) to the other row selecting lines LL.

Thereby, the potential of the lower electrodes 12 of the elements D11, D12, D13, . . . D1*m* in the first row is set to be the voltage (50 V) of the selection signal Ss. The potential of the lower electrodes 12 of the other elements (e.g., elements D21 . . . D2*m* in the second row, elements D31 . . . D3*m* in the third row) is set to be the voltage (0 V) of the non-selection signal Sn.

At this stage, on the basis of a control signal from the signal control circuit 100, the signal supplying circuit 21*c* outputs a pixel signal Sd (any voltage signal of 0 V, 30 V, and 50 V, in this example) to a plurality of pixel signal lines UL (UL1, UL2, . . . ULm), the pixel signal Sd depending on the luminance levels of the pixels composed of the elements of the selected row (i.e., elements D11, D12, D13, . . . D1*m* in the first row). The potential difference between the pixel signal Sd and the selection signal Ss corresponds to a drive voltage Vin.

In this case, for example, supposing a pixel signal Sd of 0 V is applied to the pixel signal line UL1, the element voltage Vka (D11), which is the potential difference between the upper electrode 14 and the lower electrode 12 of the element D11, results in a predetermined negative voltage Vm, i.e., −50 V (=0 V−50 V). Thereby, a very large number of electrons are accumulated on the emitter section 13 in the vicinity of the upper electron 14 of the element D11.

Supposing a pixel signal Sd of 30 V is applied to the pixel signal line UL2, the element voltage Vka (D12) results in −20 V (=30 V−50 V). Thereby, a smaller number of electrons compared with the element D11 are accumulated on the emitter section 13 in the vicinity of the upper electrode 14 of the element D12.

Furthermore, supposing a pixel signal Sd of 50 V is applied to the pixel signal line UL3, the element voltage Vka (D13) results in 0 V (=50 V−50 V). Thereby, no electrons are accumulated on the emitter section 13 of the element D13. That is, polarization reversal does not occur in the emitter section 13 of the element D13.

After the elapse of the row selection period Ts (a period of time sufficient for accumulating electrons on the selected elements), on the basis of a control signal from the signal control circuit 100, the row selecting circuit 21*a* outputs a selection signal Ss to the row selecting line LL2 in the second row and outputs a non-selection signal Sn (0 V) to the other row selecting lines.

Thereby, the potential of the lower electrodes 12 of the elements D21, D22, D23, . . . D2*m* in the second row is set to be the voltage (50 V) of the selection signal Ss. The potential of the lower electrodes 12 of the other elements (e.g., elements D11 . . . D1*m* in the first row, elements D31 . . . D3*m* in the third row) is set to be the voltage (0 V) of the non-selection signal Sn.

On the other hand, on the basis of a control signal from the signal control circuit 100, the signal supplying circuit 21*c* outputs a pixel signal Sd (any voltage signal of 0 V, 30 V, and 50 V) to a plurality of pixel signal lines UL (UL1, UL2, . . . ULm), the pixel signal Sd depending on the luminance levels of the pixels composed of the elements of the selected row (i.e., elements D21, D22, D23, . . . D2*m* in the second row). As a result, electrons are accumulated on the emitter sections of the elements D21, D22, D23, . . . D2*m* in the second row in amounts corresponding to the pixel signals Sd.

The element voltage Vka of the elements in which the voltage (0 V) of the non-selection signal Sn is applied to the lower electrodes is 0 V (in this case, potential of upper electrode=0 V, potential of lower electrode=0 V), 30 V (in this case, potential of upper electrode=30 V, potential of lower electrode=0 V), or 50 V (in this case, potential of upper electrode=50 V, potential of lower electrode=0 V). At such a voltage, in the elements in which electrons have been accumulated, polarization reversal does not occur and electrons are not emitted from the elements.

After the elapse of the row selection period Ts, the row selecting circuit 21a outputs a selection signal Ss to the row selecting line LL3 in the third row (not shown) and outputs a non-selection signal Sn (0 V) to the other row selecting lines. The signal supplying circuit 21c outputs a pixel signal Sd to each of a plurality of pixel signal lines UL, the pixel signal depending on the luminance levels of the pixels composed of the elements in the selected third row. Such an operation is repeated until all the rows are selected after every elapse of the row selection period Ts. As a result, at a predetermined point in time, electrons are accumulated on the emitter sections 13 of all the elements in amounts corresponding to the luminance levels of the pixels composed of the individual elements (amounts including "0"). What has been described is the operation during the charge accumulation period Td.

Subsequently, the row selecting circuit 21a applies a large negative voltage (in this example, −350 V which is a difference between +50 V generated by the power supply circuit 110 and −400 V generated by the pulse source 21b) to all the row selecting lines LL. As a result, the potential of the lower electrodes 12 of all the elements is changed to a large negative voltage (−350 V). At the same time, the signal supplying circuit 21c outputs the reference voltage (0 V) generated by the pulse generating circuit 21c1 as it is to the upper electrodes 14 of all the elements through the amplitude modulating circuit 21c2. Thereby, the potential of the upper electrodes 14 of all the elements is set to be the reference voltage (0 V).

As a result, polarization reversal occurs again, and the electrons accumulated in the emitter sections 13 of the individual elements are emitted all at once by Coulomb repulsion. Consequently, phosphors placed above the individual elements emit light to display an image. Note that in the emitter sections of the elements in which no electrons are accumulated because the drive voltage Vin is set to be "0" during the charge accumulation period Td, polarization reversal does not occur and thus, polarization reversal also does not occur when the drive voltage Vin is increased. Therefore, with respect to the elements that are not required to emit electrons at a certain timing in connection with the image, unnecessary electric power is not consumed.

As described above, during the charge accumulation period Td, the drive voltage applying circuit 21 sequentially changes the drive voltage Vin to each of a plurality of elements to a first voltage Vm which is a predetermined negative voltage. After the electron accumulation operation with respect to all the elements is completed, the drive voltage applying circuit 21 changes the drive voltage Vin to all the elements simultaneously to a second voltage Vp which is a predetermined positive voltage to allow all the elements to emit electrons all at once. Thus, a light emission period Th is started. Furthermore, after the elapse of the predetermined light emission period Th, the drive voltage applying circuit 21 starts a charge accumulation period again.

As described above, in the electron-emitting device of the present invention, since fine through-holes having an average diameter of 10 to 100 nm are formed in the upper electrodes, more electrons can be efficiently emitted. It is to be understood that the present invention is not limited to the embodiments described above. Various variation examples can be employed within the scope of the present invention.

Figure 42:
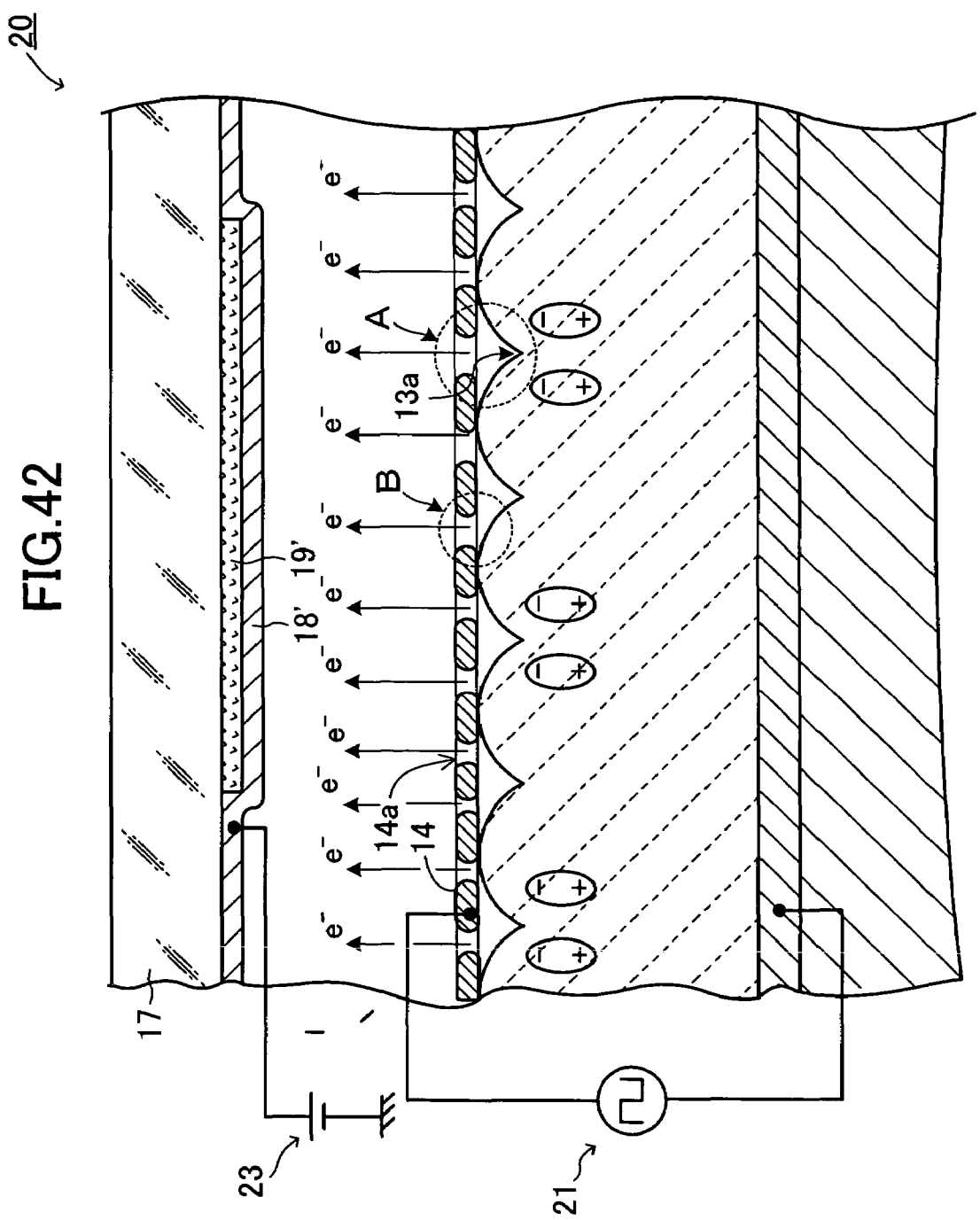
FIG. 42 is a partial cross-sectional view of a variation example of an electron-emitting device according to the present invention.

For example, as shown in FIG. 42, in an electron-emitting device 20 according to a variation example of the present invention, the collector electrode 18 and the phosphor 19 in the electron-emitting device 10 are replaced with a collector electrode 18' and a phosphor 19'.

In the electron-emitting device 20, the phosphor 19' is disposed on a back surface (surface facing the upper electrode 14), and the collector electrode 18' is disposed so as to cover the phosphor 19'. The collector electrode 18' has a thickness that allows electrons emitted from the emitter section 13 through the through-holes 14a to pass through the collector electrode 18'. In such a case, the thickness of the collector electrode 18' is preferably 100 nm or less. The thickness of the collector electrode 18' can be increased as the kinetic energy of the electrons emitted is increased.

Such a structure can be employed for CRTs, etc. The collector electrode 18' functions as a metal back. Electrons emitted from the emitter section 13 through the through-holes 14a of the upper electrode 14 pass through the collector electrode 18' and enter the phosphor 19' to excite the phosphor 19', thus causing light emission. The electron-emitting device 20 has the following advantages.

(a) If the phosphor 19' is not electrically conductive, the phosphor 19' can be prevented from being charged (negatively). As a result, an electric field for accelerating electrons can be maintained.

(b) Since light emitted from the phosphor 19' is reflected by the collector electrode 18', the light can be efficiently discharged toward the transparent plate 17 (light emission surface).

(c) Electrons are prevented from excessively colliding with the phosphor 19', and thus it is possible to prevent the phosphor 19' from being degraded and from generating a gas.

Figure 43:
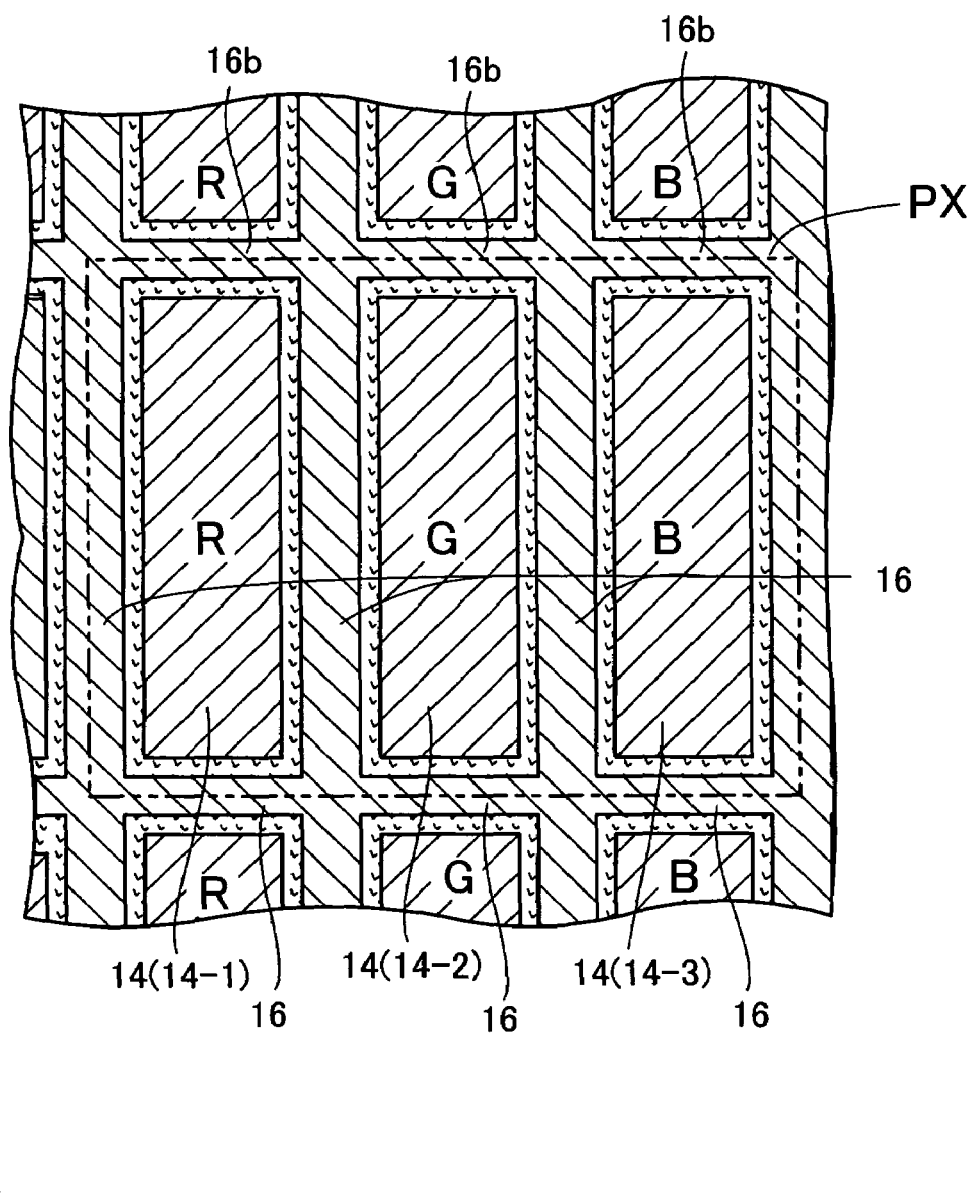
FIG. 43 is a partial plan view of another variation example of an electron-emitting device according to the present invention.

In an electron-emitting device according to another variation example of the present invention, as shown in FIG. 43, the focusing electrode 16 is disposed not only between two adjacent upper electrodes 14 in the X-axis direction but also between two adjacent upper electrodes 14 in the Y-axis direction.

Consequently, electrons emitted from the upper electrode 14 from a certain element do not reach the phosphors above the upper electrodes 14 of the two adjacent elements in the X-axis direction. Therefore, color purity can be maintained satisfactorily. Furthermore, in this example, since the focusing electrode 16 is also formed between the upper electrodes 14 of the two adjacent elements in the Y-axis direction, electrons emitted from the upper electrode from a certain element do not reach the phosphors above the upper electrodes 14 of the two adjacent elements in the Y-axis direction. As a result, blurring of the image can be avoided.

Figure 44:
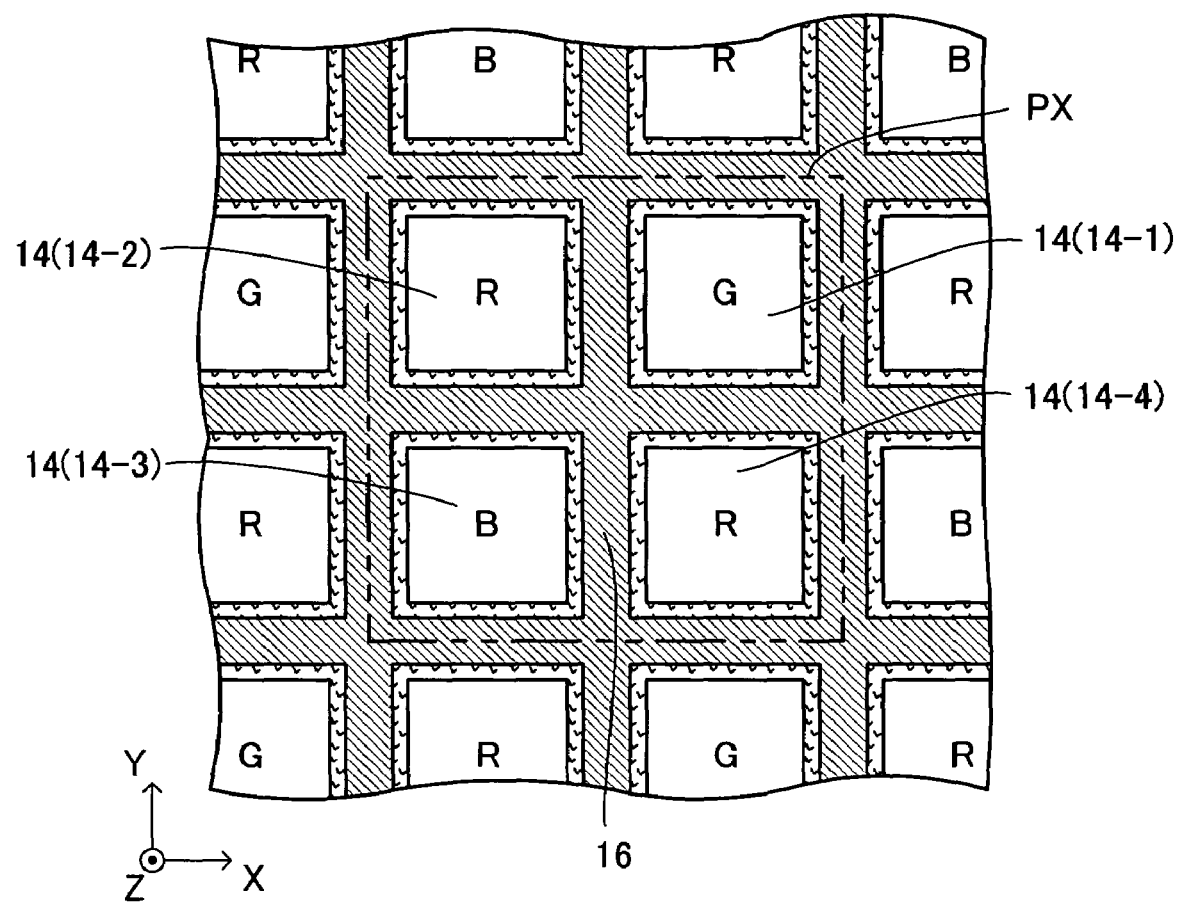
FIG. 44 is a partial plan view of another variation example of an electron-emitting device according to the present invention.
Figure 45:
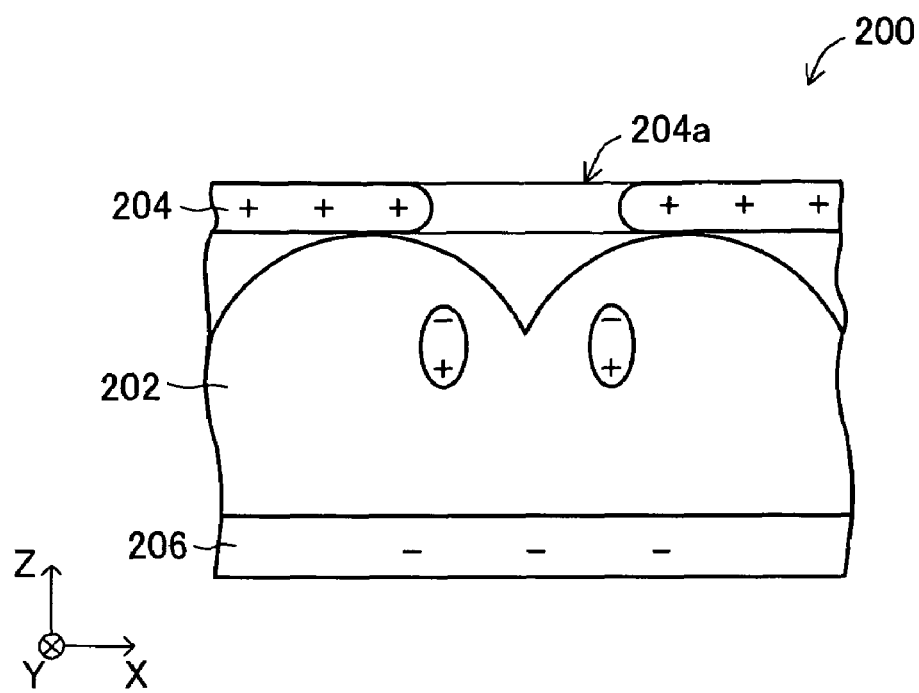
FIG. 45 is a partial cross-sectional view showing an electron-emitting device related to the present invention in one state.
Figure 46:
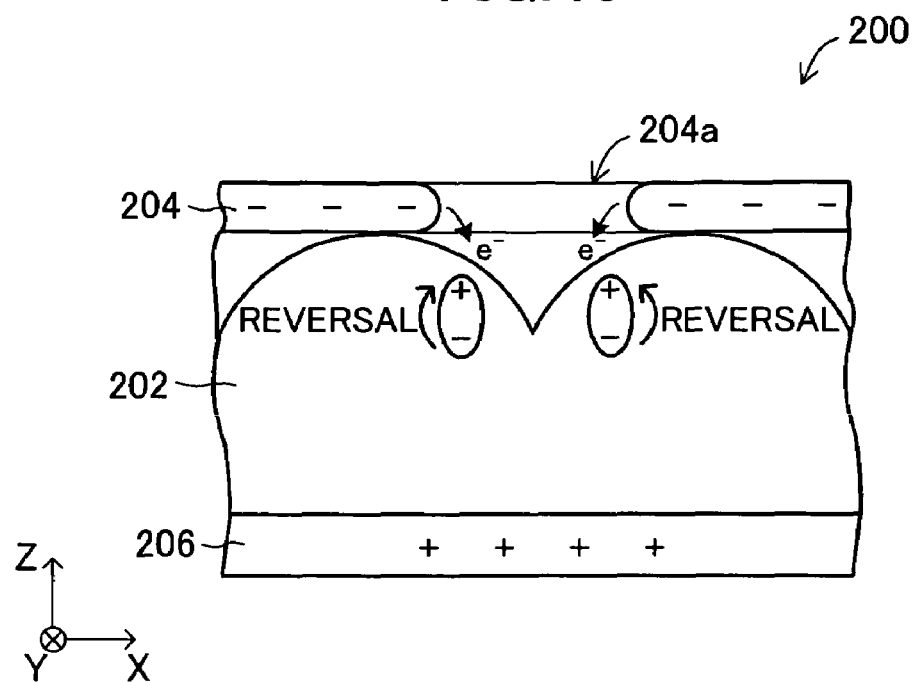
FIG. 46 is a partial cross-sectional view showing an electron-emitting device related to the present invention in another state.
Figure 47:
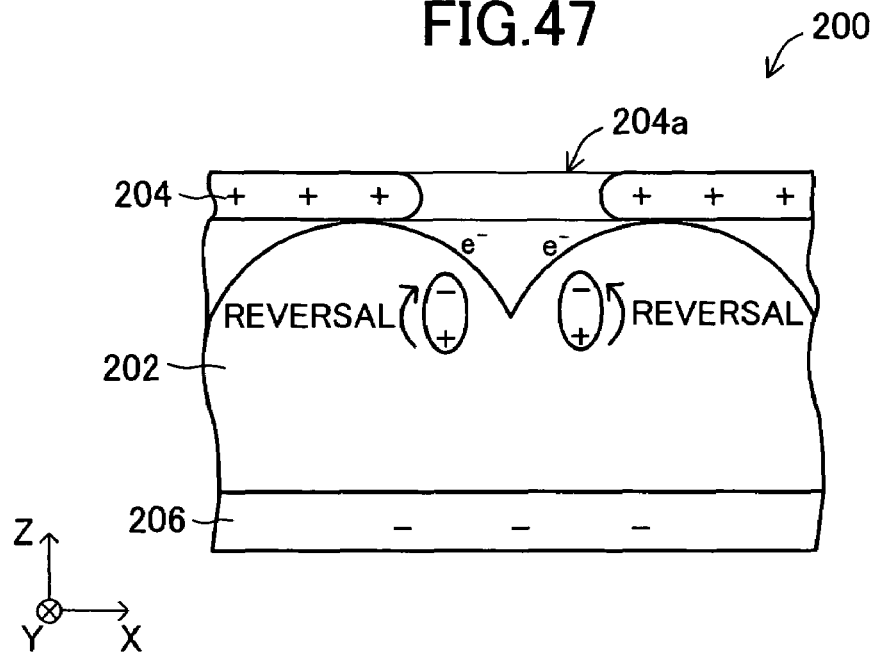
FIG. 47 is a partial cross-sectional view showing an electron-emitting device related to the present invention in another state.
Figure 48:
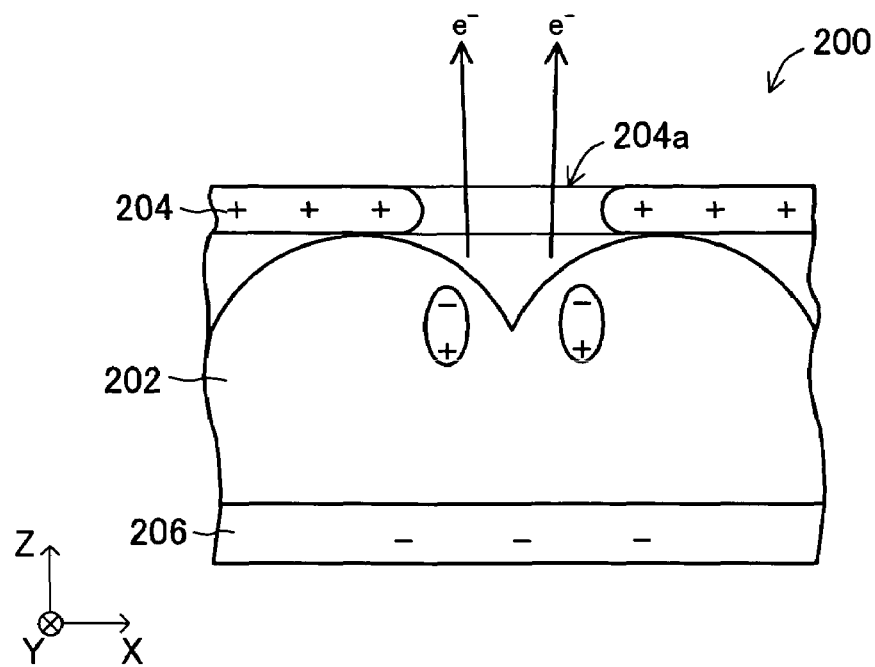
FIG. 48 is a partial cross-sectional view showing an electron-emitting device related to the present invention in another state.

Furthermore, as shown in FIG. 44, the electron-emitting device of the present invention may have a structure in which four elements (hence, four upper electrodes 14, i.e., a first upper electrode 14-1, a second upper electrode 14-2, a third upper electrode 14-3, and a fourth upper electrode 14-4) and a focusing electrode 16 are disposed per substantially square pixel PX. In such a case, for example, a green phosphor (not shown) is placed right above the first upper electrode 14-1, red phosphors (not shown) are placed right above the second upper electrode 14-2 and the fourth upper electrode 14-4, and a blue phosphor (not shown) is placed right above the third upper electrode 14-3. The focusing electrode 16 is disposed so as to surround each upper electrode 14. According to this example, electrons emitted from the upper electrode 14 of a certain element reach only the phosphor placed right above the upper electrode 14, and therefore, color purity can be maintained satisfactorily and blurring of the image can be avoided.

Furthermore, although the electron-emitting device according to the embodiment described above is provided with focusing electrodes and a power source for the focusing electrodes (focusing electrode electric potential applying circuit), these may be omitted. Furthermore, the phosphors provided on the electron-emitting device are not limited to the red phosphor, the green phosphor, and the blue phosphor, and for example, a white phosphor may be used. In addition, although the electron-emitting device according to the embodiment is disclosed as a display provided with the focusing electrode, the collector electrode, the transparent plate, the phosphors, etc., it is not always necessary to provide these. That is, an electron-emitting device according to the present invention may be a single unit of an electron-emitting element which includes an emitter section, an upper electrode, and a lower electrode. Such an electron-emitting device (electron-emitting element) can be used for various applications, such as electron irradiation devices, light sources, substitutes for LEDs, electronic component manufacturing equipment, and electronic circuit components.

As described above, the electron-emitting device according to each embodiment of the present invention includes the upper electrode having through-holes with an average diameter of 10 nm or more and less than 100 nm. Therefore, electrons can be emitted at high efficiency, and excellent rectilinear propagation of electrons is exhibited. Consequently, the electron-emitting device can be suitably used not only for direct-view-type flat-screen televisions, but also for compact displays built in front or rear projectors. For example, if a compact display having three faces corresponding to the three primary colors of RGB is prepared, it is possible to constitute a high-definition television using 0.2 mm pitch pixels that can be formed by thick-film screen printing. In such a case, the electron-emitting device of the present invention can contribute to a decrease in the thickness of the display in comparison with CRT projectors. Another characteristic of the electron-emitting device of the present invention is that a high-power light source is not separately required, compared to a LCD projector or a DMD projector. Consequently, in the electron-emitting device of the present invention, space-saving is enabled, and since replacement of a high-power light source is not required, the electron-emitting device has longer operating life and is maintenance-free, which is also advantageous.

What is claimed is:

1. An electron-emitting device comprising:
   an emitter section composed of a dielectric material;
   a lower electrode disposed on the lower side of the emitter section;
   an upper electrode disposed on the upper side of the emitter section so as to be opposed to the lower electrode with the emitter section therebetween, electrons being emitted from the emitter section through the upper electrode by the application of a drive voltage between the lower electrode and the upper electrode; and
   means for polarizing the dielectric material of the emitter section,
   wherein the upper electrode is provided with a plurality of through-holes that expose the emitter section and have an average diameter that is smaller than the grain size of the dielectric material of the emitter section and that is in a range of 10 nm or more and less than 100 nm, and a peripheral portion of each through-hole facing the emitter section is separated at a predetermined distance from the emitter section.

2. The electron-emitting device according to claim 1, wherein the upper electrode contains a metal, and the through-holes are pores formed by crystal grains of the metal.

3. The electron-emitting device according to claim 1, wherein the upper electrode contains two or more metals.

4. The electron-emitting device according to claim 2, wherein the upper electrode contains two or more metals.

5. The electron-emitting device according to claim 3, wherein the upper electrode contains two or more metals selected from the group consisting of silver, gold, iridium, rhodium, ruthenium, platinum, palladium, aluminum, copper, nickel, chromium, molybdenum, tungsten, and titanium.

6. The electron-emitting device according to claim 4, wherein the upper electrode contains two or more metals selected from the group consisting of silver, gold, iridium, rhodium, ruthenium, platinum, palladium, aluminum, copper, nickel, chromium, molybdenum, tungsten, and titanium.

7. The electron-emitting device according to claim 5, wherein the upper electrode contains platinum as a base material.

8. The electron-emitting device according to claim 6, wherein the upper electrode contains platinum as a base material.

* * * * *